(12) United States Patent
Bran de León et al.

(10) Patent No.: US 8,009,954 B2
(45) Date of Patent: Aug. 30, 2011

(54) FIBER OPTIC SPLICE TRAY

(75) Inventors: Oscar Fernando Bran de León, Belle Plaine, MN (US); James J. Solheid, Lakeville, MN (US); Thomas G. LeBlanc, Westminster, MA (US); Trevor D. Smith, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 83 days.

(21) Appl. No.: 12/425,241

(22) Filed: Apr. 16, 2009

(65) Prior Publication Data

US 2009/0290842 A1 Nov. 26, 2009

Related U.S. Application Data

(60) Provisional application No. 61/046,678, filed on Apr. 21, 2008, provisional application No. 61/058,814, filed on Jun. 4, 2008, provisional application No. 61/147,933, filed on Jan. 28, 2009.

(51) Int. Cl.
*G02B 6/00* (2006.01)

(52) U.S. Cl. ........................................ 385/135; 385/136

(58) Field of Classification Search .................... 385/135
See application file for complete search history.

(56) References Cited

U.S. PATENT DOCUMENTS

| | | | |
|---|---|---|---|
| 4,687,289 A | 8/1987 | DeSanti | |
| 4,792,203 A | 12/1988 | Nelson et al. | |
| 4,840,449 A | 6/1989 | Ghandeharizadeh | |
| 4,911,521 A * | 3/1990 | Ryuto et al. | 385/135 |
| 5,323,478 A * | 6/1994 | Milanowski et al. | 385/135 |
| 5,572,617 A | 11/1996 | Bernhardt et al. | |
| 5,790,741 A | 8/1998 | Vincent et al. | |
| 5,956,449 A | 9/1999 | Otani et al. | |
| 6,269,213 B1 | 7/2001 | Ohta et al. | |
| 6,411,767 B1 | 6/2002 | Burrous et al. | |
| 6,418,266 B1 | 7/2002 | Vitantonio | |
| 6,424,782 B1 | 7/2002 | Ray | |
| 6,434,313 B1 | 8/2002 | Clapp, Jr. et al. | |
| 6,449,418 B1 * | 9/2002 | Brocheton | 385/135 |
| 6,496,640 B1 | 12/2002 | Harvey et al. | |
| 6,504,986 B1 * | 1/2003 | Wambeke et al. | 385/134 |
| 6,504,987 B1 | 1/2003 | Macken et al. | |
| 6,507,691 B1 | 1/2003 | Hunsinger et al. | |

(Continued)

FOREIGN PATENT DOCUMENTS

WO WO 96/10203 4/1996

OTHER PUBLICATIONS

FOSC 400 Fiber Optic Splice Closures, *Tyco Electronics*, 8 pages (Copyright 2005, 2008).

(Continued)

*Primary Examiner* — Rhonda S Peace

(74) *Attorney, Agent, or Firm* — Merchant & Gould P.C.

(57) ABSTRACT

A splice tray includes a splice region and a fiber management region to facilitate splicing together two or more fibers. The splice tray can be pivotally coupled to one or more additional splice trays using pivot linkages to form a splice tray arrangement. A pivot linkage can include first and second laterally spaced coupling sections extending in opposite directions. A magnetic coupling arrangement can releasably secure the splice trays of a splice tray arrangement to one another.

19 Claims, 50 Drawing Sheets

U.S. PATENT DOCUMENTS

| | | |
|---|---|---|
| 6,621,975 B2 | 9/2003 | Laporte et al. |
| 6,721,484 B1 | 4/2004 | Blankenship et al. |
| 6,766,094 B2 | 7/2004 | Smith et al. |
| 6,944,389 B2 | 9/2005 | Giraud et al. |
| 7,045,710 B1 | 5/2006 | Allen et al. |
| 7,072,559 B2 | 7/2006 | Giordano et al. |
| 7,200,316 B2 | 4/2007 | Giraud et al. |
| 7,272,291 B2 | 9/2007 | Bayazit et al. |
| 7,274,852 B1 | 9/2007 | Smrha et al. |
| 7,310,471 B2 | 12/2007 | Bayazit et al. |
| 7,340,145 B2 | 3/2008 | Allen |
| 7,418,184 B1 | 8/2008 | Gonzales et al. |
| 7,421,182 B2 | 9/2008 | Bayazit et al. |
| 7,457,504 B2 | 11/2008 | Smrha et al. |
| 7,613,377 B2 * | 11/2009 | Gonzales et al. ............ 385/135 |
| 2002/0191939 A1 | 12/2002 | Daoud et al. |
| 2005/0249474 A1 | 11/2005 | Tan |
| 2005/0249475 A1 * | 11/2005 | Womack et al. ............ 385/135 |
| 2006/0147173 A1 * | 7/2006 | Womack et al. ............ 385/135 |
| 2006/0283869 A1 * | 12/2006 | Soncini ............ 220/836 |

OTHER PUBLICATIONS

*UCAO Inline Closure with Multi-Function Tray (MFT)*, Corning Cable Systems GmbH & Co. KG, Nov. 2005 (4 pages).

Photographs of an MFT disclosed in the above document from Corning Cable Systems, (5 pages) (subject matter of photographs admitted as prior art as of the Nov. 2005 priority date).

Invitation to Pay Additional Fees with Partial International Search mailed Aug. 27, 2009.

International Search Report and Written Opinion mailed Nov. 4, 2009.

\* cited by examiner

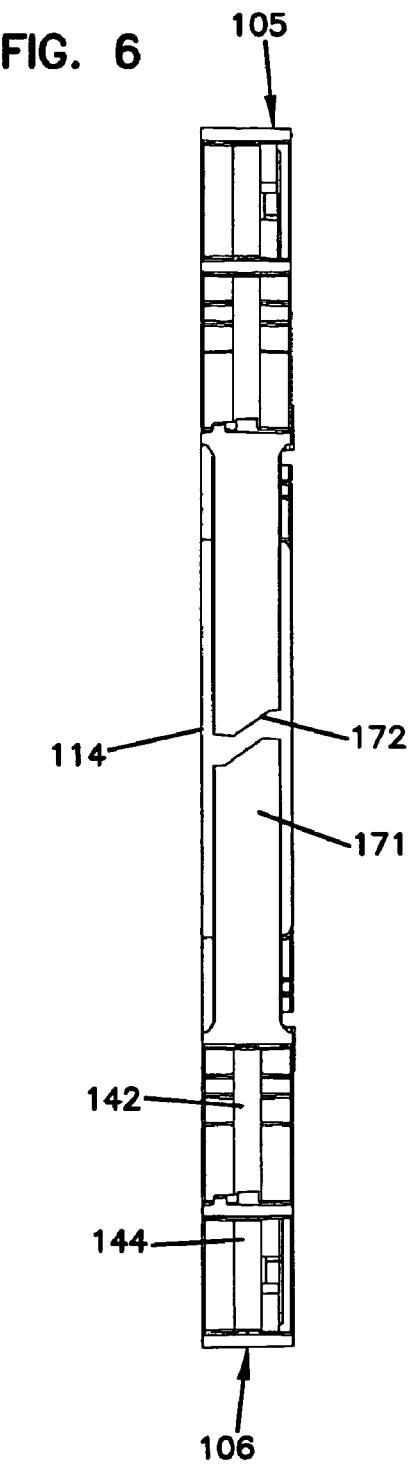
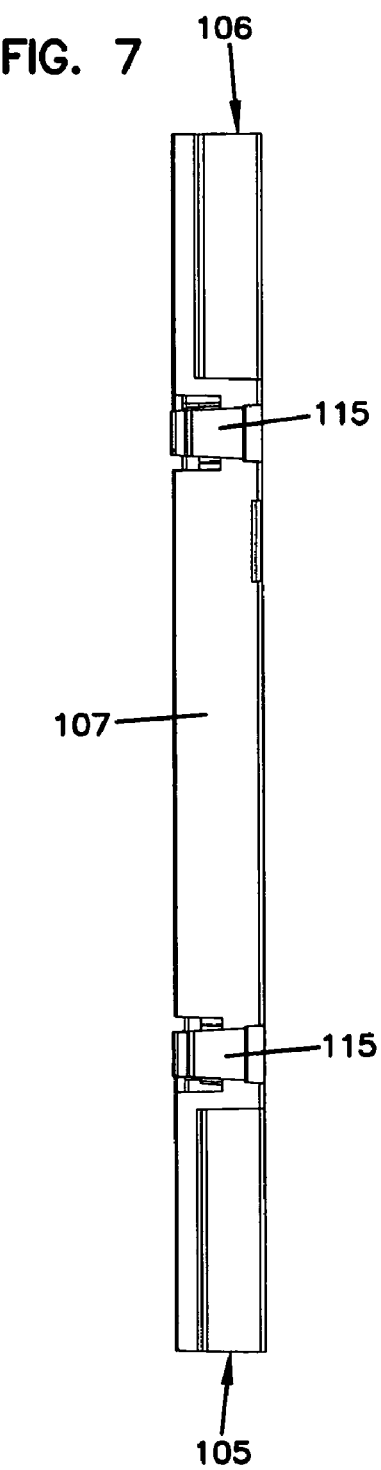

FIG. 37
FIG. 38
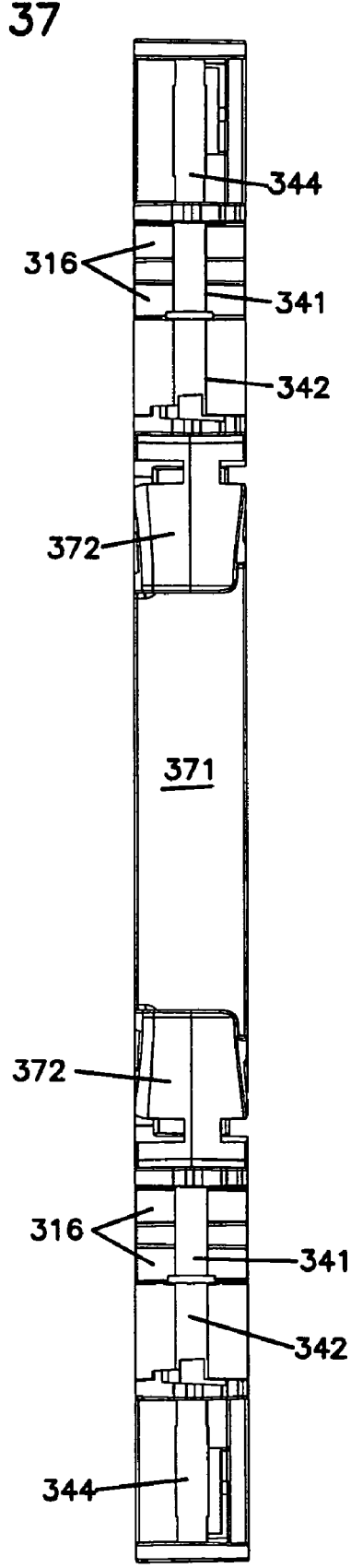
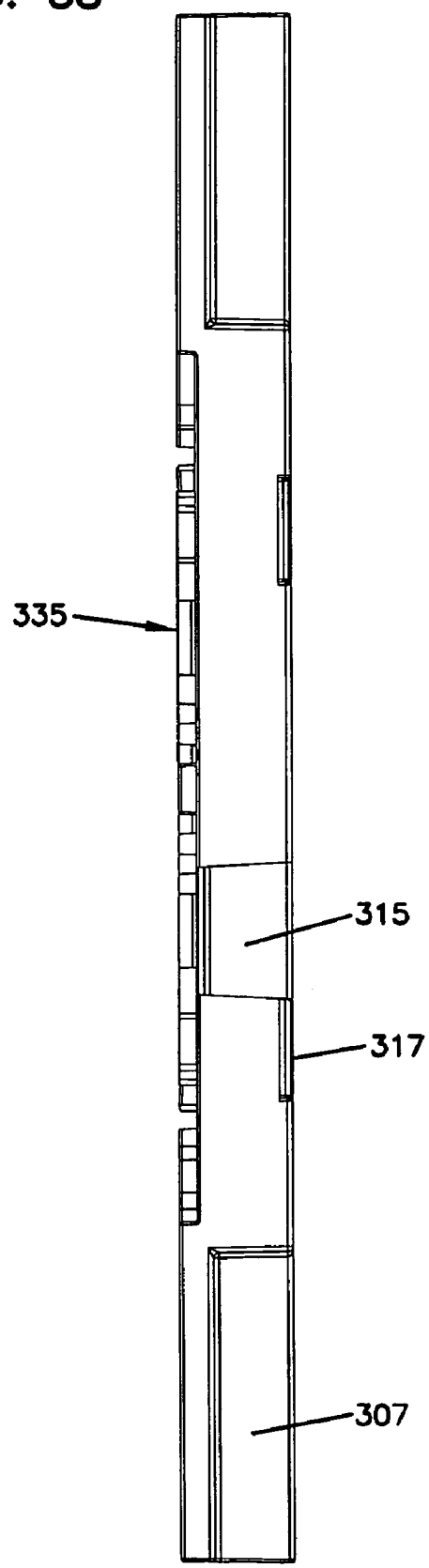

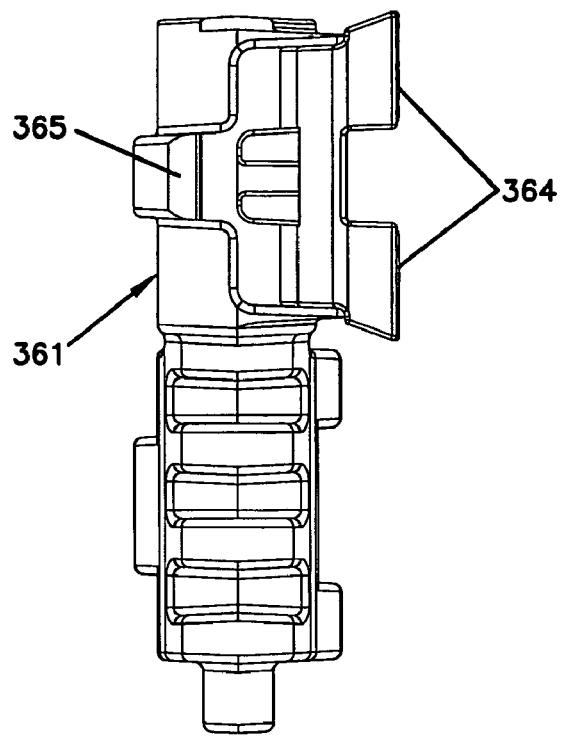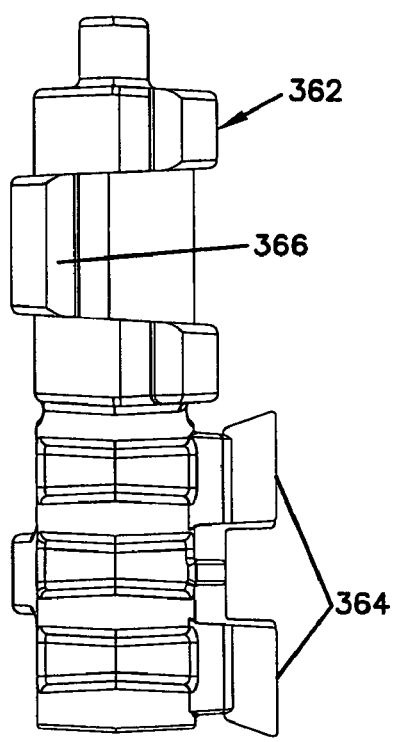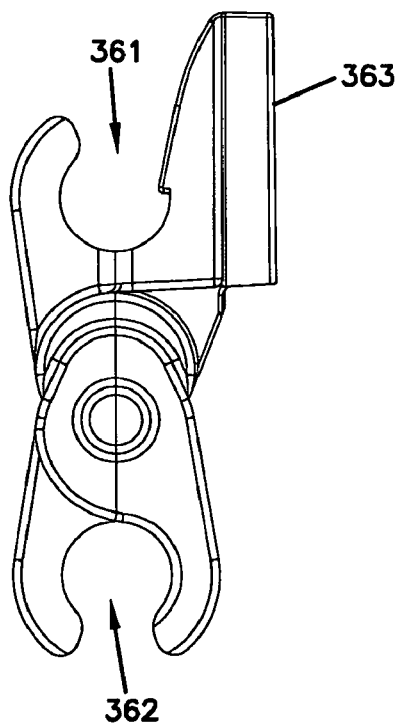

FIBER OPTIC SPLICE TRAY

CROSS REFERENCE TO RELATED APPLICATIONS

This application claims priority from provisional application Ser. No. 61/046,678, filed Apr. 21, 2008; provisional application Ser. No. 61/058,814, filed Jun. 4, 2008; and provisional application Ser. No. 61/147,933, filed Jan. 28, 2009, which applications are incorporated herein by reference.

TECHNICAL FIELD

The present disclosure relates generally to telecommunications components. More particularly, the present disclosure relates to a splice tray arrangement for use in fiber optic telecommunications systems.

BACKGROUND

Passive optical networks are becoming prevalent in part because service providers want to deliver high band width communication capabilities to customers. Passive optical networks are a desirable choice for delivery high-speed communication data because they can not employ active electronic devices, such as amplifiers and repeaters, between a central office and a subscriber termination. The absence of active electronic devices can decrease network complexity and/or costs and can increase network reliability.

Fiber optic telecommunications systems can include a fiber optic network including distribution cables for connecting a central office to a plurality of end subscribers. A distribution cable network often includes a main or trunk cable including a plurality of fibers, and a plurality of branch cables (e.g., drop cables) that are spliced to corresponding fibers of the trunk cable and that are routed to locations such as subscriber locations or drop terminals. Splice trays can be used to protect and manage the region of the distribution cable where the branch cable or cables are spliced to the trunk cable. It is desirable for fiber optic splice trays to be easy to use and to provide effective cable management.

SUMMARY

Certain aspects of the present disclosure relate to fiber optic splice tray arrangements having features such as cable management structures, tray attachment mechanisms designed to facilitate access to individual splice trays, and splice tray links designed to couple together multiple splice trays.

A variety of additional aspects will be set forth in the description that follows. The aspects can relate to individual features and to combinations of features. It is to be understood that both the foregoing general description and the following detailed description are exemplary and explanatory only and are not restrictive of the broad features upon which the embodiments disclosed herein are based.

BRIEF DESCRIPTION OF THE DRAWINGS

FIG. 6 is a rear view of the splice tray of FIG. 1 in accordance with the principles of the present disclosure;

FIG. 7 is a front view of the splice tray of FIG. 1 in accordance with the principles of the present disclosure;

FIG. 37 is a rear view of the splice tray of FIG. 34 in accordance with the principles of the present disclosure;

FIG. 38 is a front view of the splice tray of FIG. 34 in accordance with the principles of the present disclosure;

FIG. 51 is a side elevational view of the pivot linkage of FIG. 49 in accordance with the principles of the present disclosure;

FIG. 52 is a top plan view of the pivot linkage of FIG. 49 in accordance with the principles of the present disclosure;

FIG. 53 is a bottom plan view of the pivot linkage of FIG. 49 in accordance with the principles of the present disclosure;

DETAILED DESCRIPTION

Figure 1:
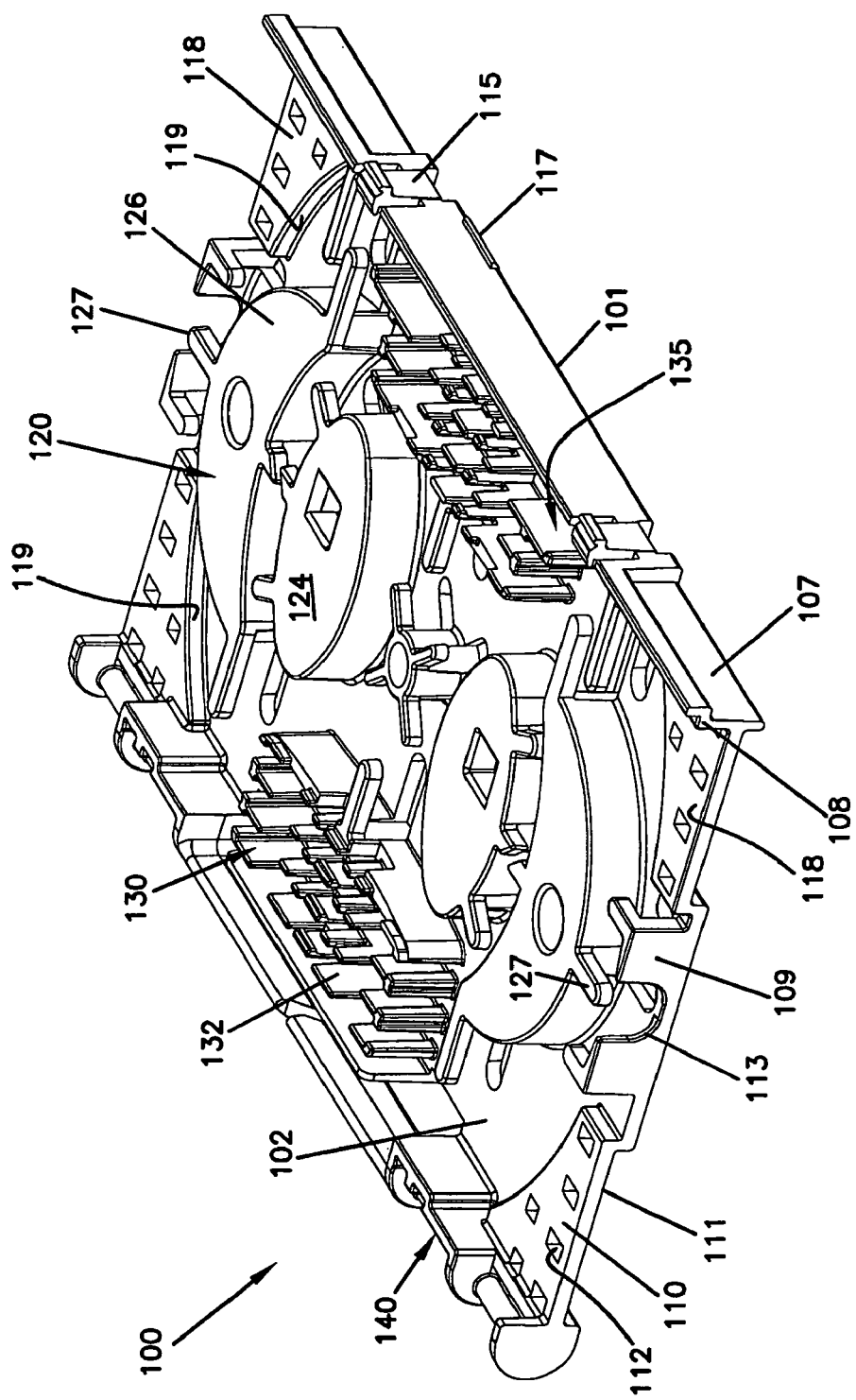
FIG. 1 is a top, front isometric view of an example splice tray having features that are examples of inventive aspects of the principles of the present disclosure.

Optical fibers to be spliced can be arranged on a fiber optic splice tray. The splice tray can be utilized individually or as part of a group of splice trays. When used separately, the splice tray tends to be mounted to a surface, such as a horizontal or vertical panel or wall. When grouped, the splice trays tend to be mounted within an enclosure. In one embodiment, the enclosure includes a base and a cover that cooperate to define an enclosed interior region.

FIGS. 1-8 show an example splice tray 100 including at least a first fiber input/output region 110, a fiber management region 120, and at least a first optical component holding region 130. In the example shown, the splice tray 100 includes four input/output regions 110. In other embodiments, however, a splice tray 100 can include greater or fewer input/output regions 110. In certain embodiment, the splice tray 100 also includes a second optical component holding region 135. In one embodiment, the second optical component holding region 135 is arranged on an opposite side of the tray from the first optical component holding region 130. In other embodiments, the splice tray 100 can include three or more optical component holding regions. In this document, the term "optical component holding region" is used interchangeable with "splice region."

Figure 2:
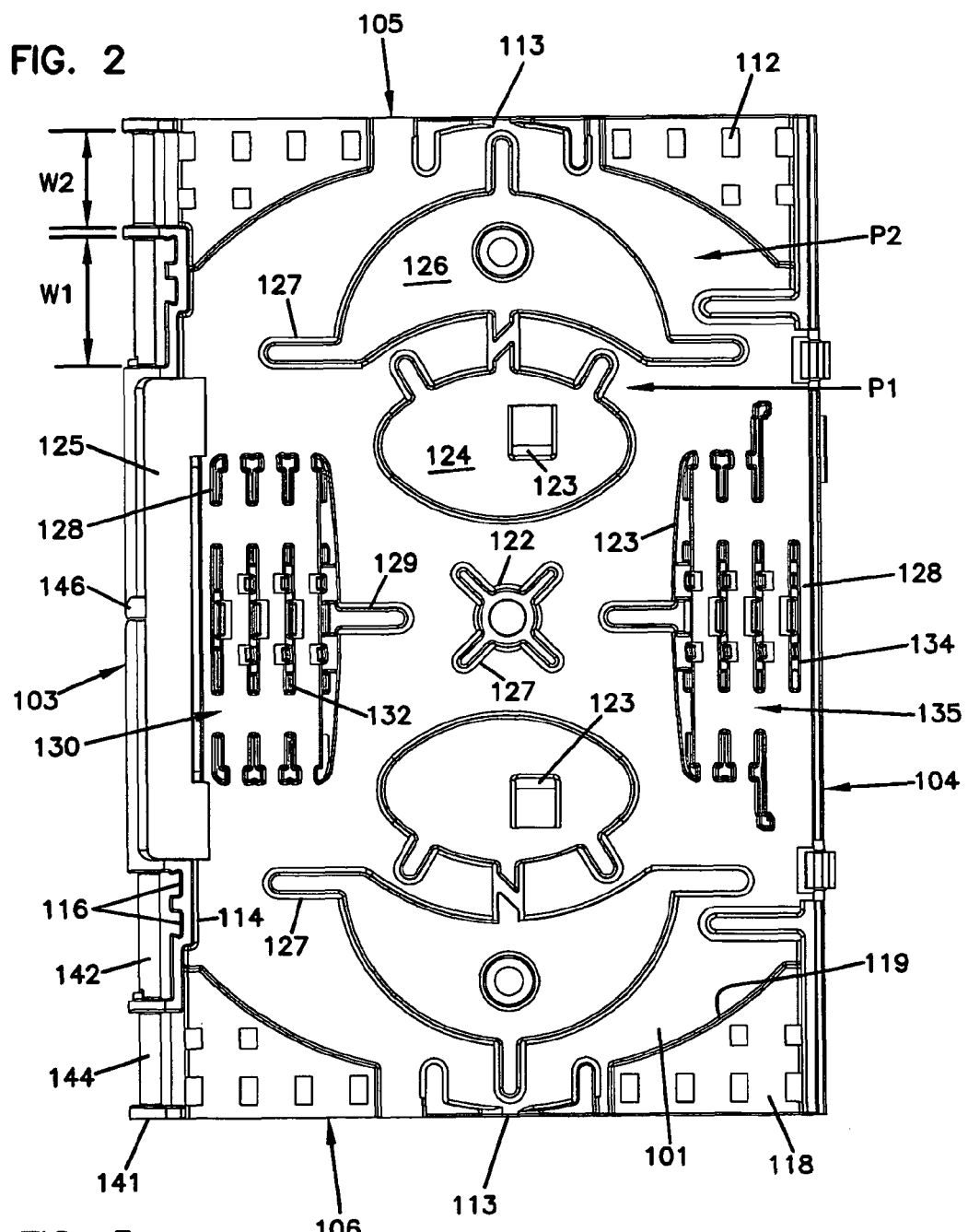
FIG. 2 is a plan view of the splice tray of FIG. 1 in accordance with the principles of the present disclosure.
Figure 8:
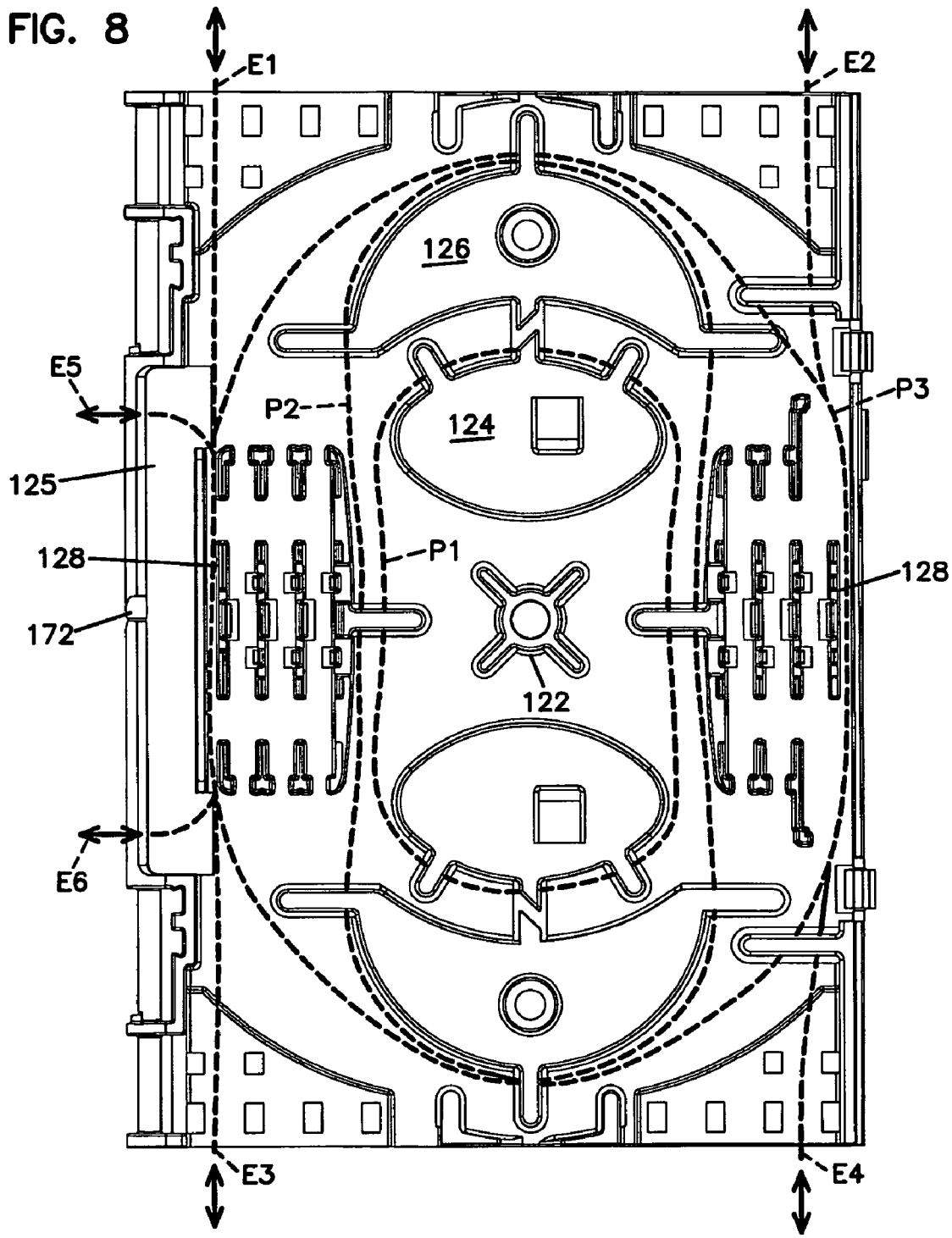
FIG. 8 is a plan view of the splice tray of FIG. 1 illustrating an example fiber routing layout in accordance with the principles of the present disclosure.

Fibers to be spliced can be routed onto the tray 100 at one of the fiber input/output regions 110. For example, in one embodiment, the fibers can be routed on or off the splice tray 100 via any of paths E1, E2, E3, and E4 extending through the input/output regions 110 (FIG. 8). Fibers also can be routed on or off the splice tray 100 through a pass-through opening 125 (FIG. 2). For example, in one embodiment, the fibers can be routed on or off the splice tray 100 via any of paths E5 and E6 extending through the pass-through opening 125 (FIG. 8).

The fibers are optically spliced, protected within a splice cover 230 (FIG. 31), and secured to one of the splice regions 130, 135 of the splice tray 100. Any excess length of the fiber is routed through the fiber management region 120. For example, the excess fiber can be looped around a fiber storage path P1 (FIG. 8) that extends around the interior perimeter of the management region 120, a second fiber storage path P2 (FIG. 8) that extends around an intermediate perimeter of the management region 120, a third fiber storage path P3 (FIG. 8) that extends around an exterior perimeter of the tray 100 including through channel 128, or a combination thereof. The fiber management region 120 also can facilitate reversing the direction of an incoming or outgoing fiber by routing the fiber in a figure-8 pattern or other suitable layout (e.g., using central spool 122 of FIG. 8).

As shown in FIG. 1, the splice tray 100 includes a body 101 including a base panel 102 having opposite sides 103, 104 extending between opposite ends 105, 106 (see FIG. 2). The base panel 102 defines a plane. A first side member 114 (FIG. 2) extends upwardly from the plane of the base panel 102 and along at least a portion of the first side 103. A second side member 107 (FIG. 1) extends upwardly from the plane of the base panel 102 and along at least a portion of the second side 104. The base panel 102, first side member 114, and second side member 107 define an interior of the splice tray 100.

The fiber input/output regions 110 can be arranged at the opposite ends 105, 106 of the tray 100. In the example shown, the four fiber input/output regions 110 are arranged at the outer corners of the body 101. In other embodiments, however, these regions 110, 120, 130 can be arranged in different configurations on the tray 100. At each of the fiber input/output regions 110, a stepped-up section 118 of the tray 100 defines a plane parallel to, but offset from, the plane of the base panel 102. In the example shown, the stepped-up section 118 is offset upwardly from the base panel 102 into the interior of the splice tray 100. The stepped-up section 118 of the tray 100 is connected to the base panel 102 by a shoulder 119 (FIG. 1). The base panel 102 terminates at the shoulder 119 to define a recess 111 beneath the stepped-up section 118 (FIG. 1) of the tray 100. In one embodiment, the recess 111 provides clearance to accommodate a securement arrangement (e.g., one or more cable ties) 250 (see FIG. 31).

The stepped-up section 118 of the tray 100 at each fiber input/output region 110 also defines one or more openings 112 at which the securement arrangement 250 (e.g., see FIG. 31) can be coupled to the splice tray 100. For example, at least one securement arrangement 250 can be positioned within the recess 111 at one of the stepped-up sections 118 to extend through one or more openings 112 defined in the stepped-up section 118. In one embodiment, the securement arrangement 250 is secured to the stepped-up section 118 by threading the securement arrangement 250 through adjacent openings 112 to couple to an incoming and/or outgoing fiber. In certain embodiments, each stepped-up section 118 defines one or more rows of openings 112. In the example shown, each stepped-up section 118 defines two rows of openings 112.

As indicated above, the body 101 of the splice tray 100 can define a pass-through opening 125 along a portion of the first side 103 (see FIG. 2). The pass-through opening 125 facilitates routing fibers into the tray body 101 from beneath or above the tray body 101. For example, the pass-through opening 125 facilitates routing fibers from other trays onto the tray 100. In one embodiment, the pass-through opening 125 facilitates routing fibers to and/or from a splitter arranged in a different tray. In another embodiment, the pass-through opening 125 facilitates routing fibers from cable management structures arranged in a different tray. In the example shown, the pass-through opening 125 extends between the first splice region 130 and the first side 103 of the body 101. In other regions, however, the pass-through opening 125 can be defined in the base panel 102 at any suitable position.

In general, the fiber management region 120 is arranged in a central portion of the interior of the splice tray 100 and the splice regions 130, 135 are arranged on opposite sides of the fiber management region 120. For example, as shown in FIG. 2, the fiber management region 120 can extend upwardly from a central portion of the base panel 102 and the splice regions 130, 135 can extend upwardly from the base panel 102 on either side of the fiber management region 120.

The fiber management region 120 of the splice tray 100 includes one or more fiber management spools protruding upwardly from the base panel 102. In one embodiment, the fiber management region 120 includes a first fiber spool 122 arranged at a generally central location of the tray 100, a pair of intermediate spools 124 arranged on opposite ends of the first fiber spool 122, and a pair of outer spools 126 arranged adjacent the opposite ends 105, 106 of the body 101 of the splice tray 100. In the example shown in FIG. 2, the first fiber spool 122 is relatively narrow in diameter in comparison with the other fiber spools 124, 126. The intermediate fiber spools 124 are full, oval-shaped fiber spools. The outer fiber spools 126 shown in FIG. 2 include fiber half-spools that a larger curvature than the first and intermediate spools 122, 124. In other embodiments, however, the fiber management region 120 can include any suitable arrangement of fiber spools, bend radius limiters, and other fiber management structures. In one embodiment, each fiber management spool 122, 124, 126 includes retention tabs 127 protruding outwardly from the spool.

Figure 29:
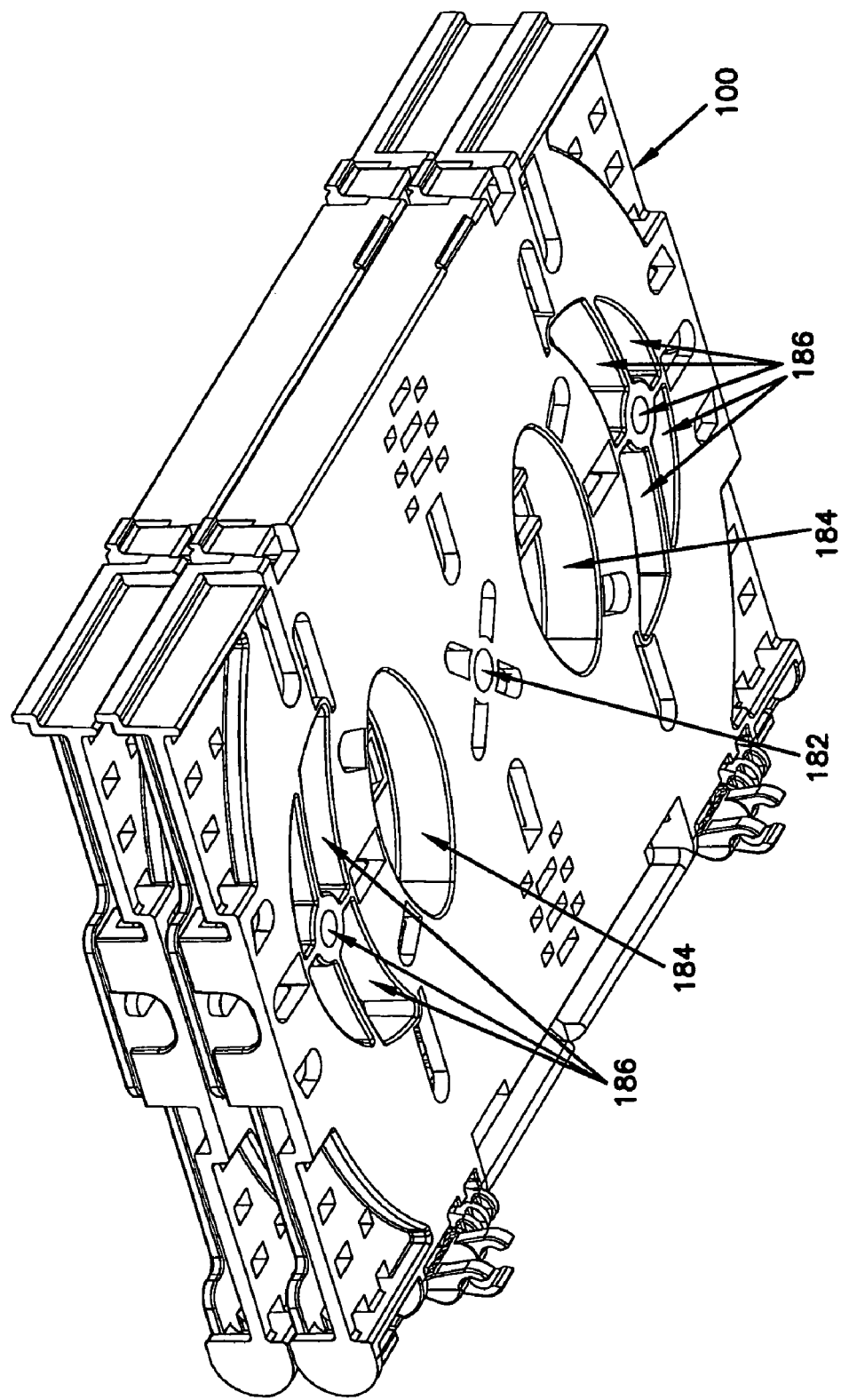
FIG. 29 is a bottom, front isometric view of the splice tray arrangement of FIG. 25 in accordance with the principles of the present disclosure.

In certain embodiments, one or more of the fiber management structures within the fiber management region 120 define cavities (e.g., see cavities 182, 184, 186 of FIGS. 4 and 29) having open ends defined in the base panel 102 of the splice tray 100. One or more fasteners can be inserted through the base panel 102 and through the cavities 182, 184, 186 to fasten the splice tray 100 to a mounting surface (e.g., a wall, a panel, an enclosure, etc.). In one embodiment, a screw-type fastener can be inserted through a cavity 182 defined in the first spool 122. In other embodiments, one or more retention structures extending from a mounting surface can be inserted through one or more of the cavities 182, 184, 186 to secure the splice tray 100 to the mounting surface. For example, in one embodiment, retention tabs can be snap-fit to shoulders 123 (FIG. 2) arranged within the cavities 184 of the intermediate fiber spools 124.

In some embodiments, end walls 109 protrude upwardly from the base panel 102 at the ends 105, 106 of the body 101 of the splice tray 100. In one embodiment, the end walls 109 extend only partially between the sides 103, 104 of the splice tray body 101. For example, the end walls 109 on the second end 106 of the tray 100 shown in FIGS. 1 and 3 do not extend completely between the fiber input/output regions 110. In one embodiment, each end wall 109 defines a notch 113 configured to facilitate routing one or more fibers around the cable management spools. For example, the notch 113 defined in the end wall 109 shown in FIG. 1 facilitates routing of one or more fibers about the half-spool 126 by enabling the fibers to briefly leave the interior of the splice tray 100 to maneuver around the retention tab 127 protruding from the half-spool 126.

The splice regions 130, 135 include retaining structures 132, 134, respectively, that are configured to secure optical splice couplers (e.g., see splice sleeve 230 of FIG. 31) to the tray body 101. In one embodiment, the retaining structures 132, 134 of the splice regions 130, 135 define outer channels 128 that form part of the exterior pathway P3 (FIG. 8) along which excess fiber length can be routed. Inner sides 123 (FIG. 2) of the splice regions 130, 135 form a part of pathways P1 and P2 (FIG. 8) along which excess fiber length can be routed. In one embodiment, fiber retention tabs 129 (FIG. 2) extend inwardly from the inner sides 123 to facilitate routing the fibers through the cable management region 120.

Figure 5:
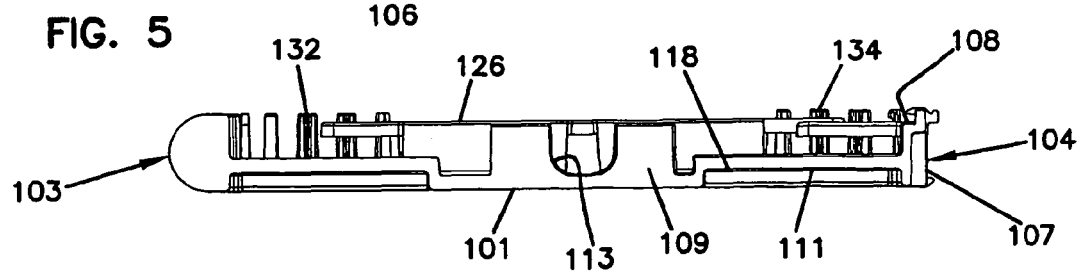
FIG. 5 is an elevational side view of the splice tray of FIG. 1 in accordance with the principles of the present disclosure.
Figure 3:
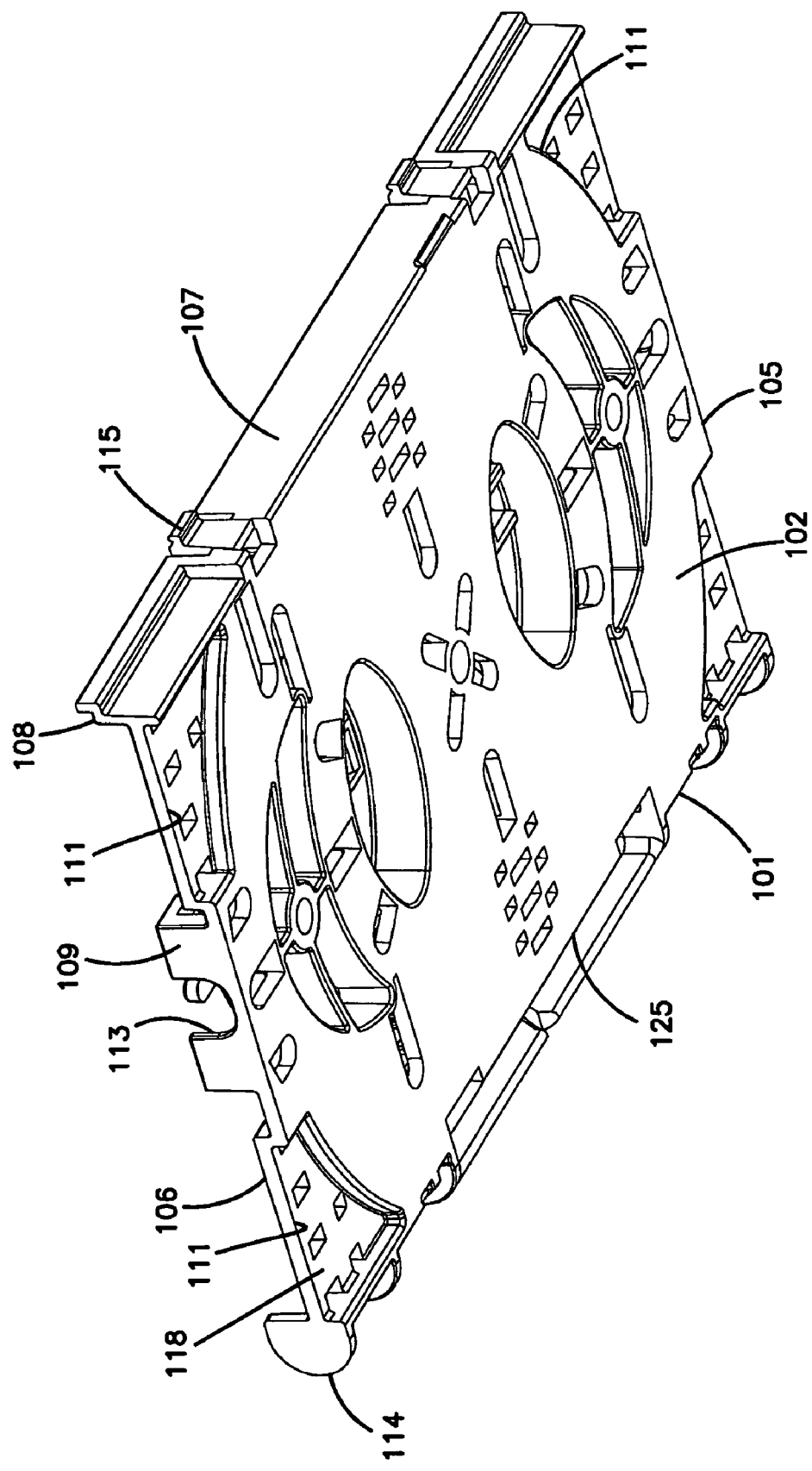
FIG. 3 is a bottom, front isometric view of the splice tray of FIG. 1 in accordance with the principles of the present disclosure.
Figure 4:
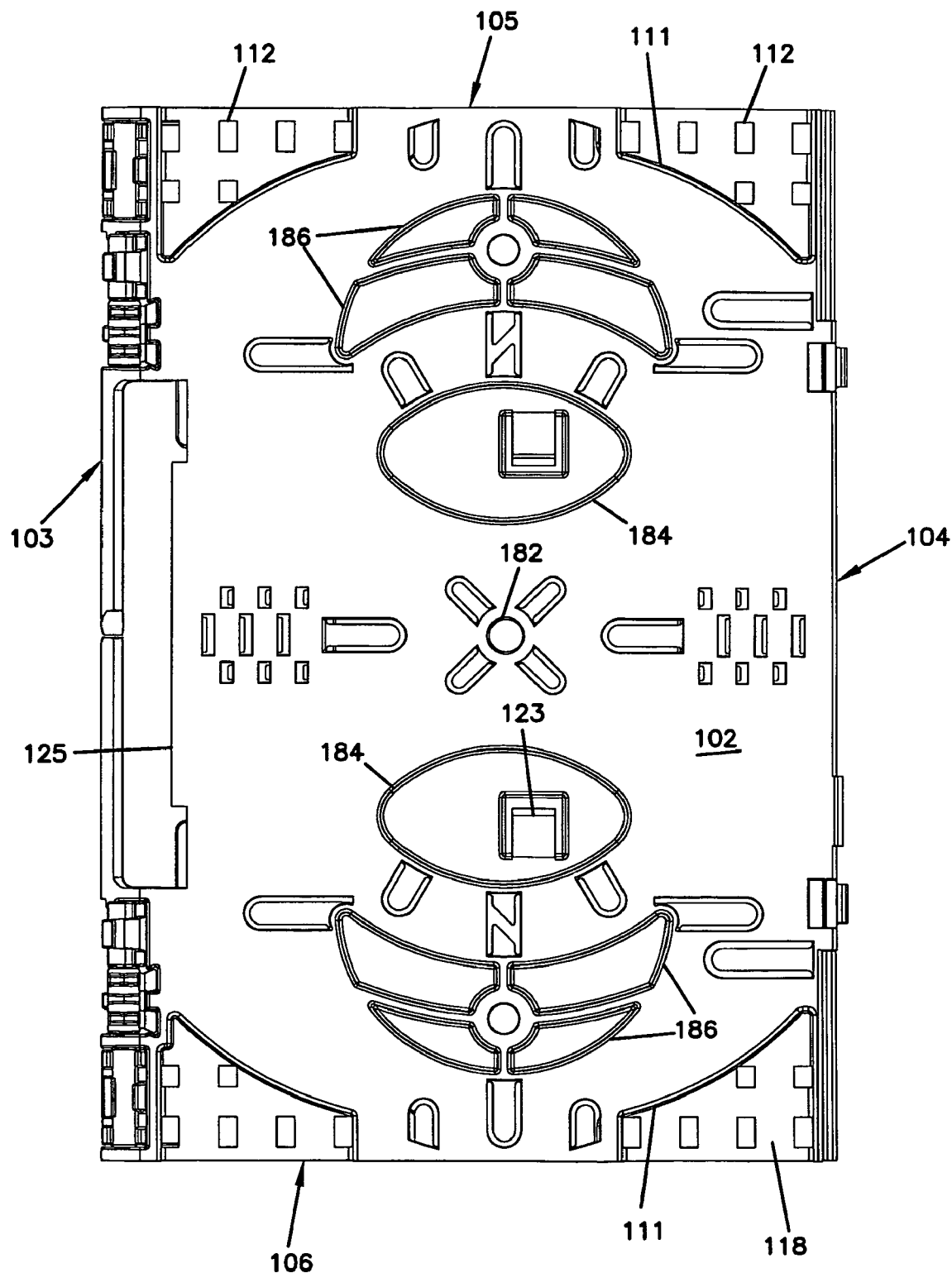
FIG. 4 is a bottom view of the splice tray of FIG. 1 in accordance with the principles of the present disclosure.

In the example shown in FIG. 2, the retaining structures 132, 134 of each splice region 130, 135 are configured to hold about three splice sleeves (not shown). In other embodiments, however, the retaining structures 132, 134 can be configured to hold any suitable number of splice sleeves. As shown in FIG. 5, the tops of the retaining structures 132, 134 of the splice regions 130, 135 are approximately flush with the tops of the first and second side walls 114, 107. The end walls 109 and the cable spools 124, 126 of the cable management region 120 typically do not protrude upwardly as far as the side walls 114, 107.

Figure 9:
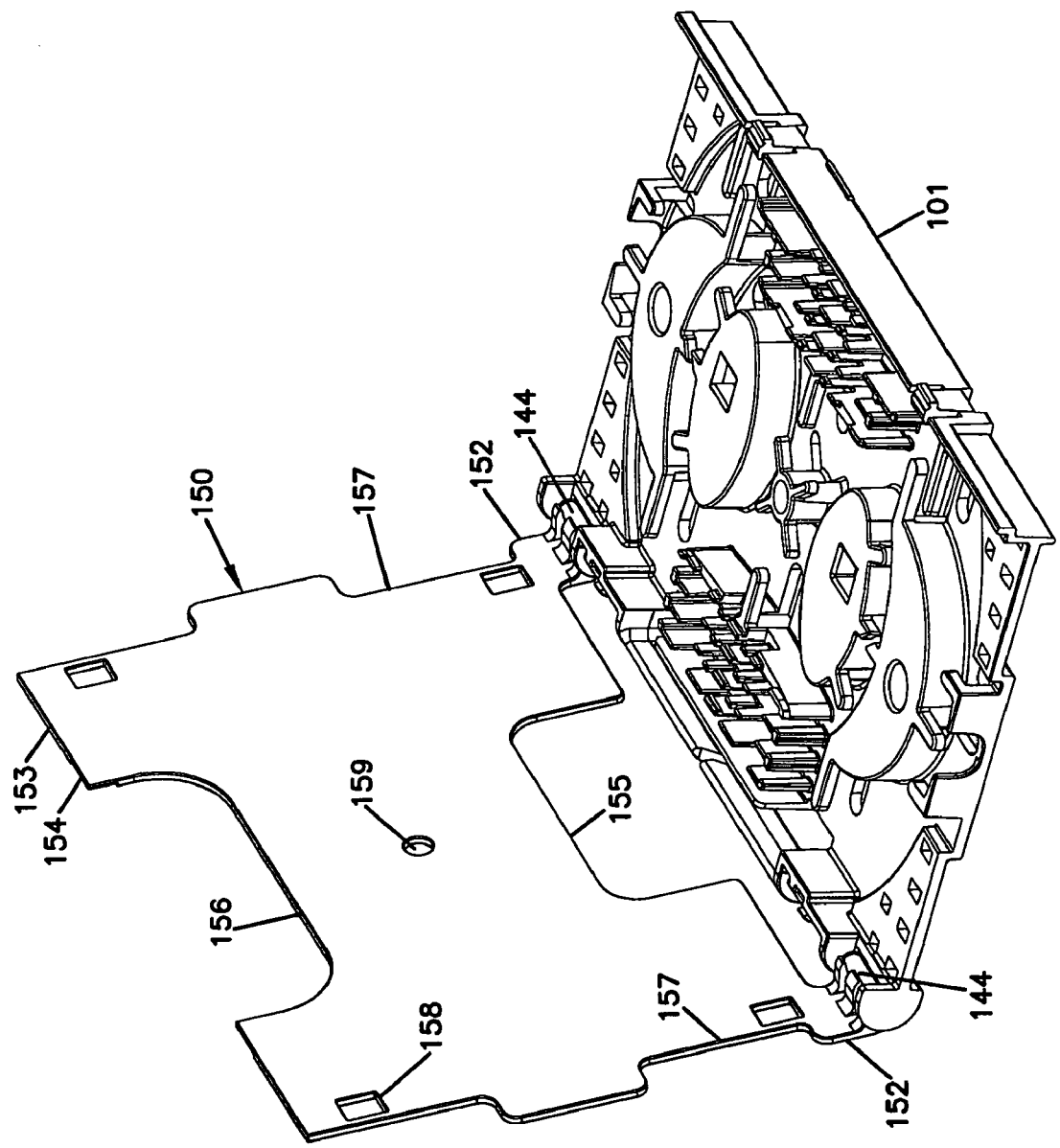
FIG. 9 is a top, front isometric view of a cover pivotally mounted to the splice tray of FIG. 1 and arranged in an open position in accordance with the principles of the present disclosure.
Figure 10:
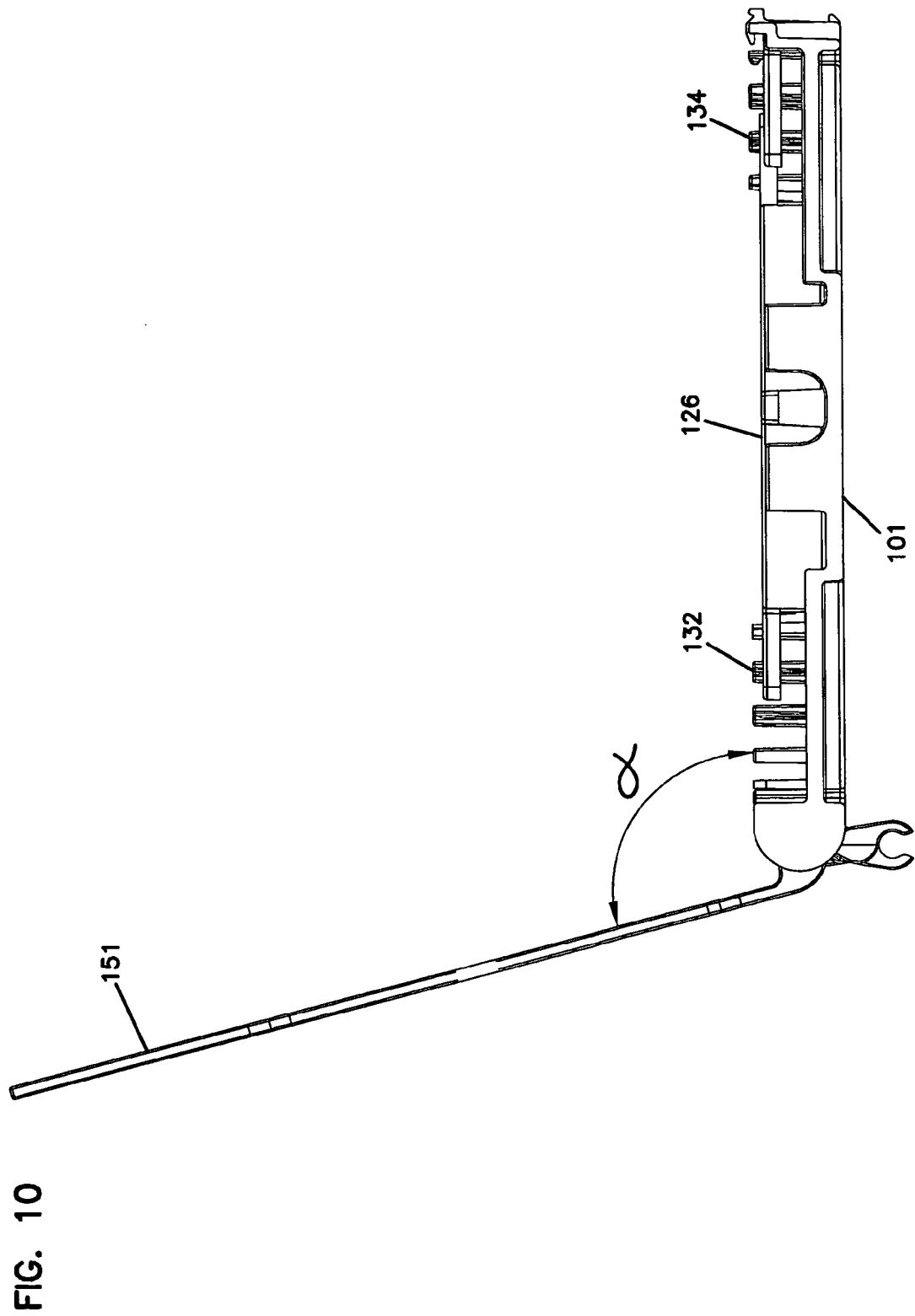
FIG. 10 is a side elevational view of the splice tray of FIG. 9 in accordance with the principles of the present disclosure.
Figure 11:
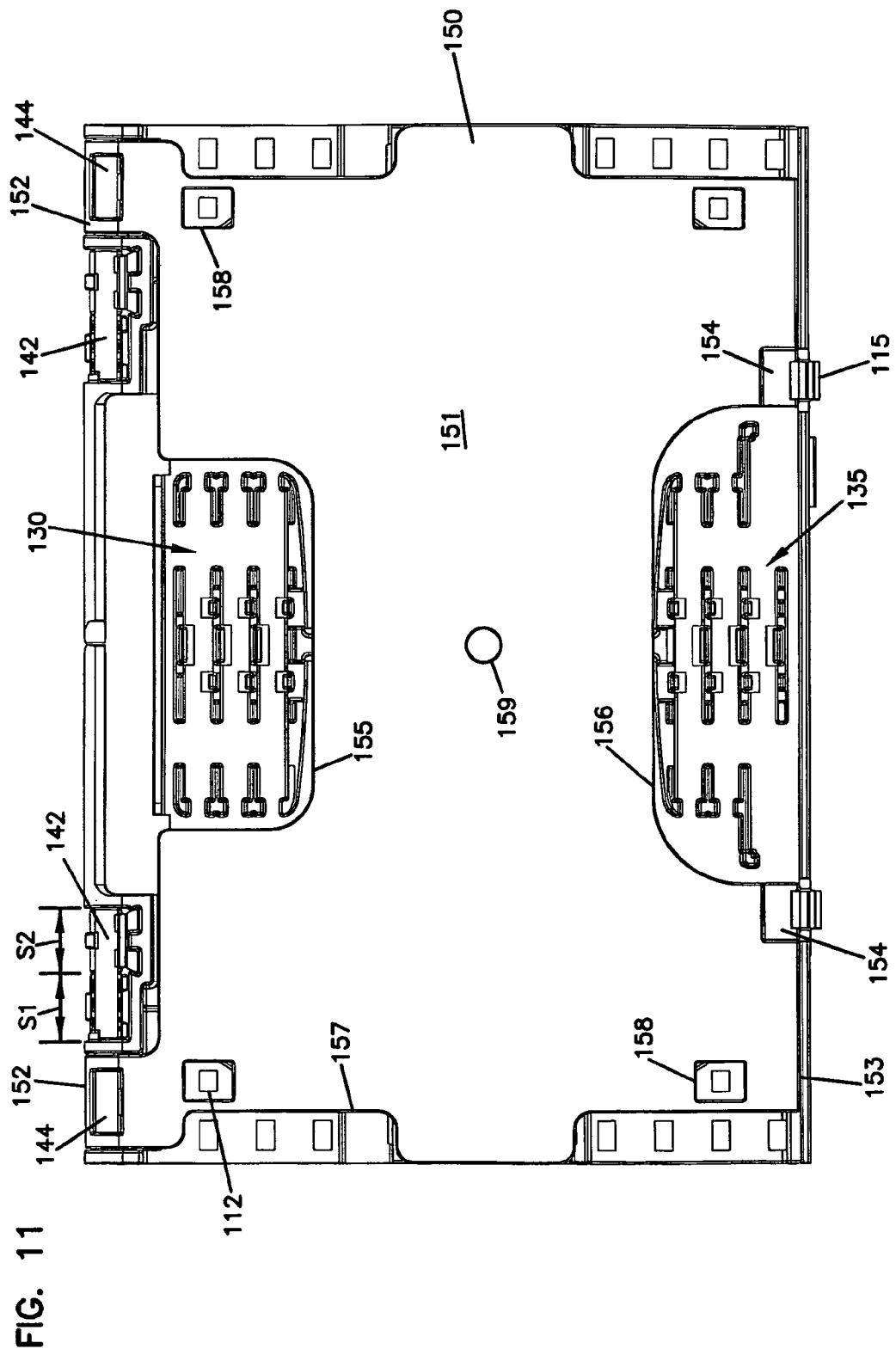
FIG. 11 is a plan view of the splice tray of FIG. 9 with the cover arranged in a closed position in accordance with the principles of the present disclosure.
Figure 12:
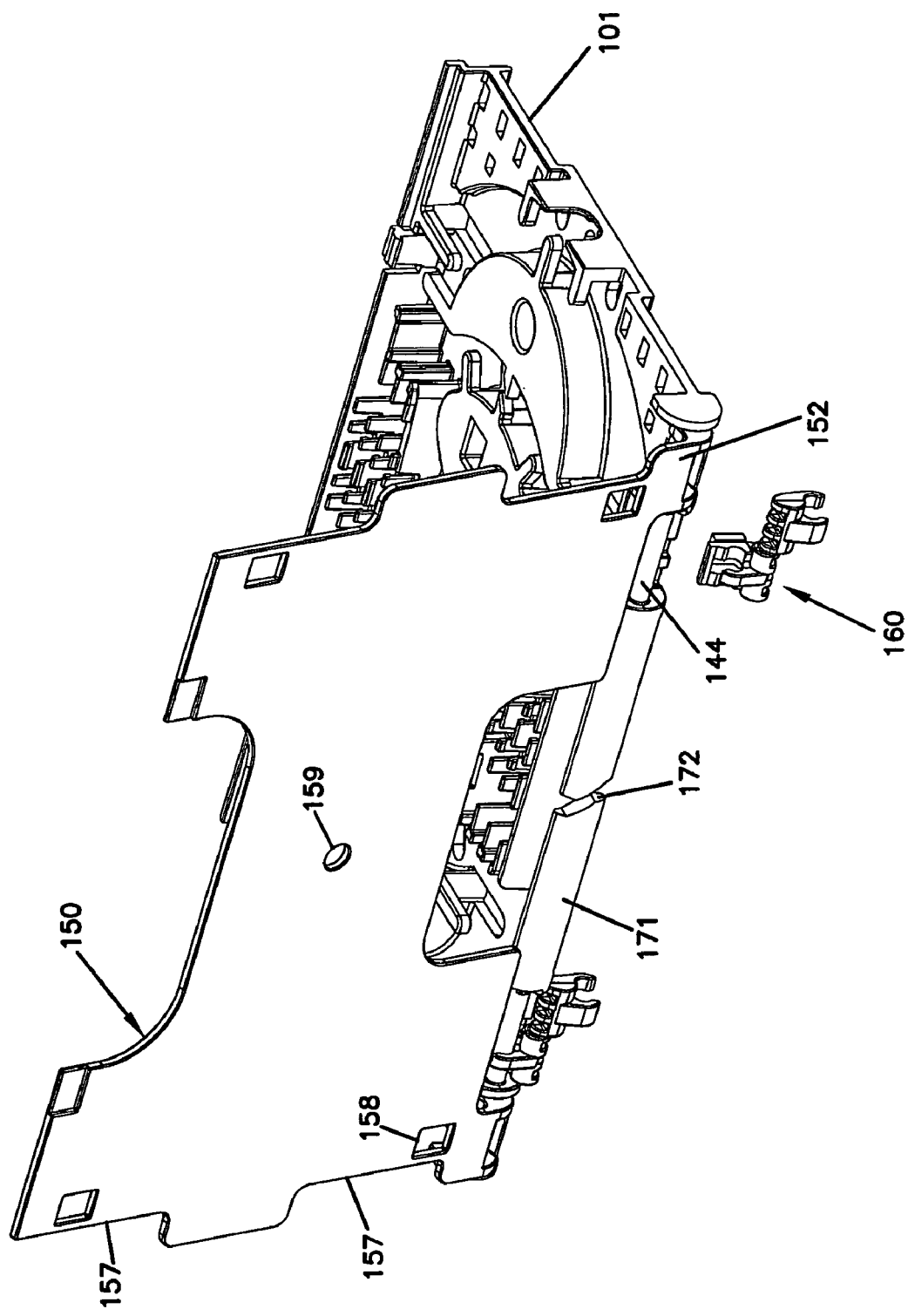
FIG. 12 is a top, rear isometric view of the splice tray of FIG. 9 with a pivot linkage separated from, but aligned with a hinge pin of the splice tray in accordance with the principles of the present disclosure.
Figure 13:
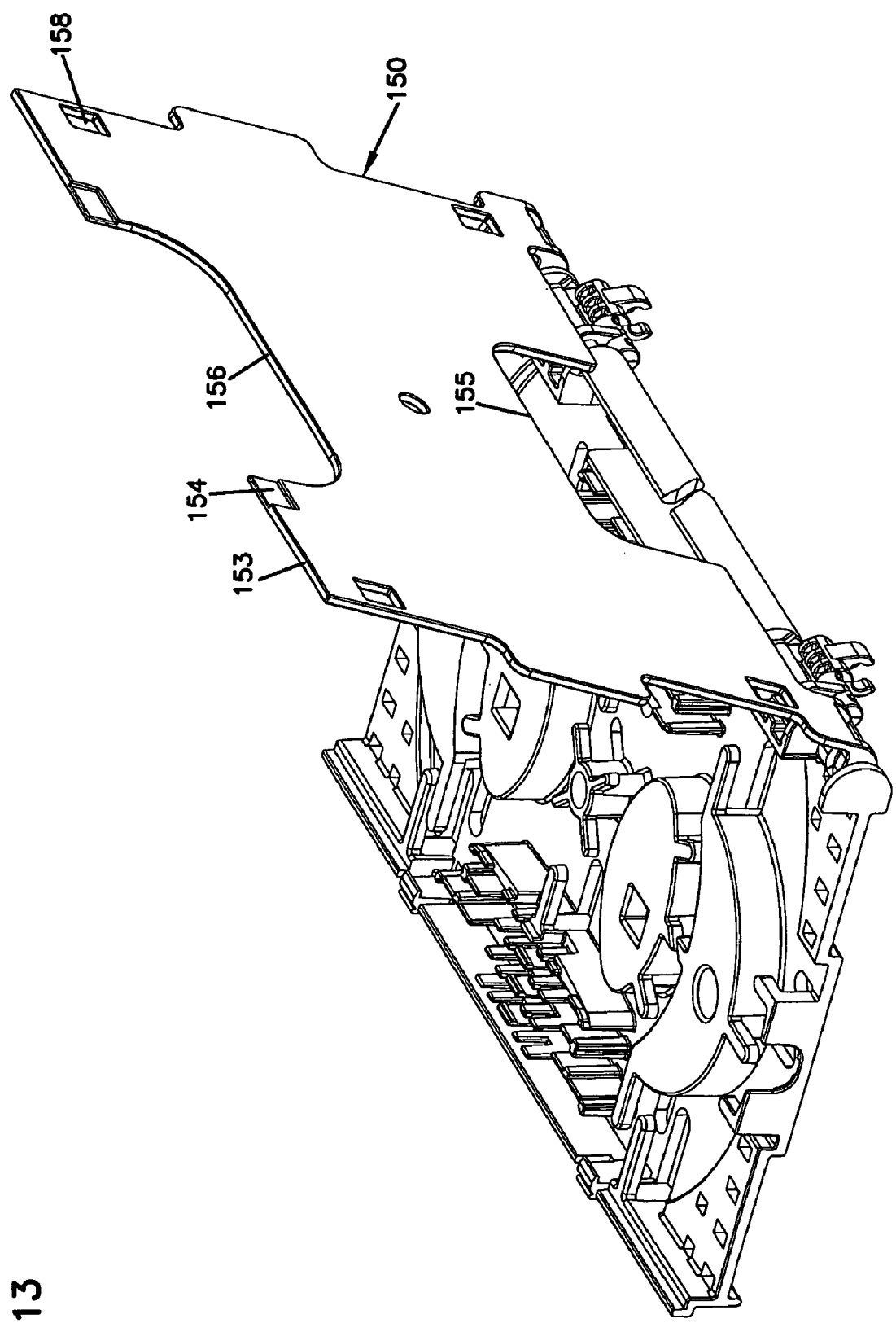
FIG. 13 is a top, rear isometric view of the splice tray of FIG. 9 with the pivot linkage of FIG. 12 attached to the splice tray and with the splice tray rotated about 90° from FIG. 12 in accordance with the principles of the present disclosure.
Figure 14:
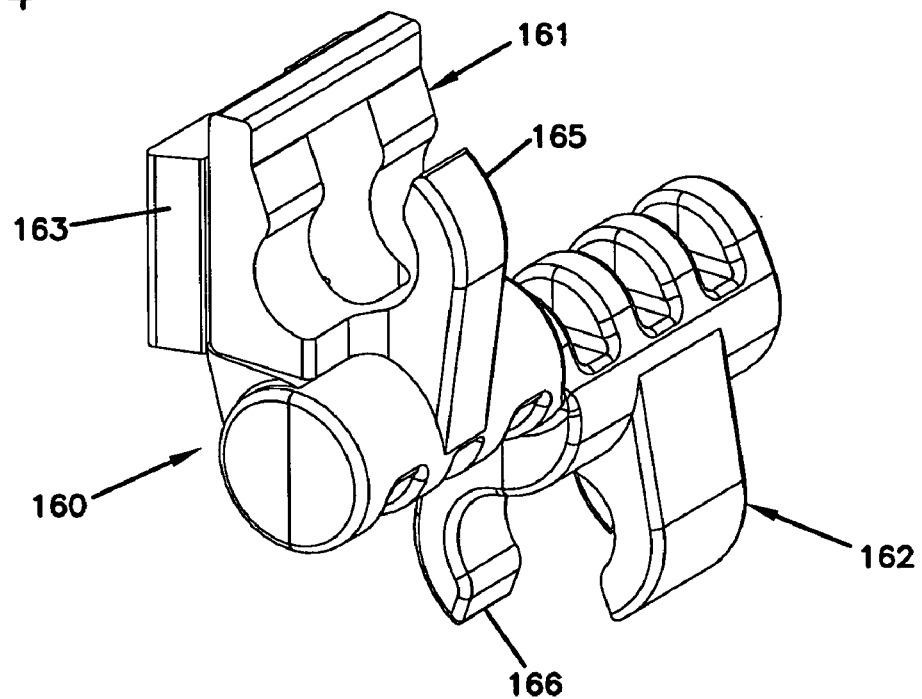
FIG. 14 is a front isometric view of a pivot linkage having features that are examples of inventive aspects of the principles of the present disclosure.
Figure 15:
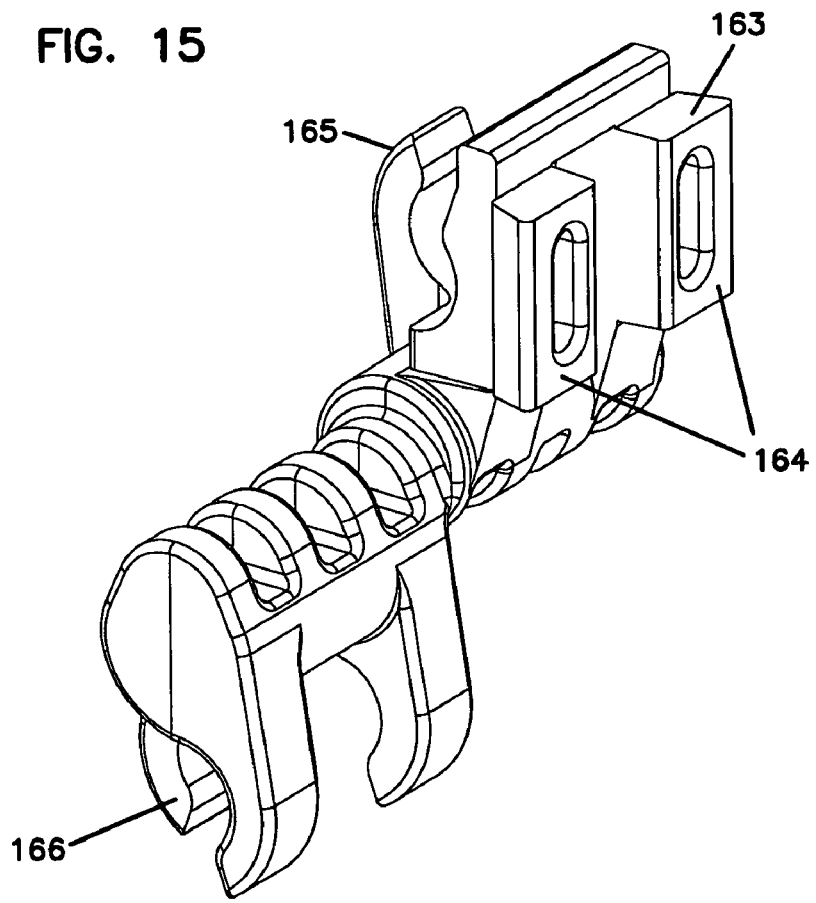
FIG. 15 is a rear isometric view of the pivot linkage of FIG. 15 in accordance with the principles of the present disclosure.
Figure 18:
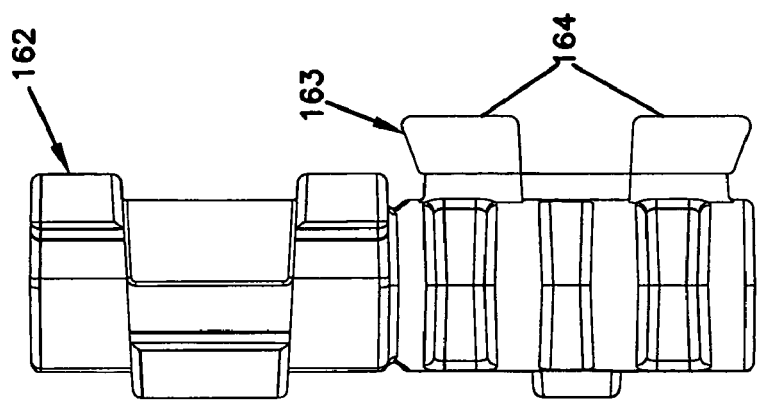
FIG. 18 is a bottom view of the pivot linkage of FIG. 15 in accordance with the principles of the present disclosure.
Figure 16:
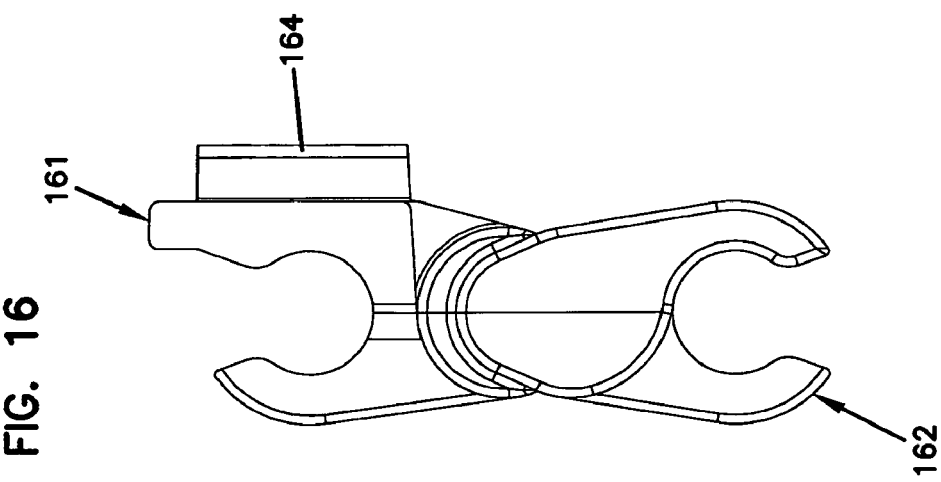
FIG. 16 is a side elevational view of the pivot linkage of FIG. 15 in accordance with the principles of the present disclosure.
Figure 17:
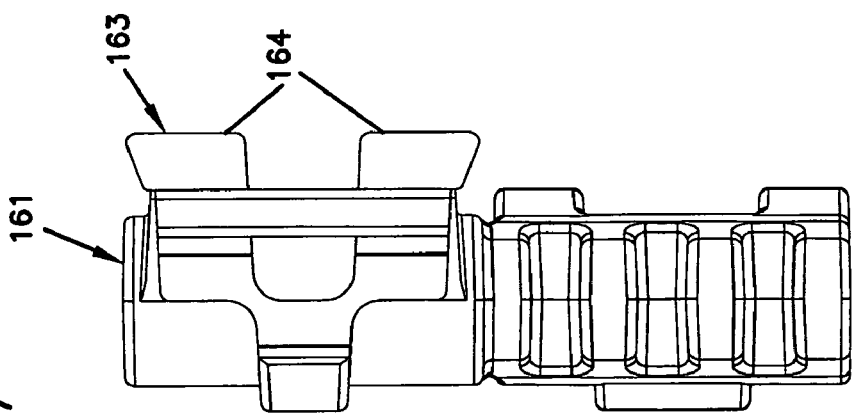
FIG. 17 is a plan view of the pivot linkage of FIG. 15 in accordance with the principles of the present disclosure.

Referring to FIGS. 9-11, the splice tray 100 can include a cover 150 pivotally mounted to the body 101 of the splice tray 100 to provide and inhibit access to interior regions of the splice tray 100. In one embodiment, the splice tray 100 includes at least a first hinge pin 144 coupled to the first side 103 (see FIG. 11) of the tray body 101. In the example shown, the splice tray 100 includes an outer pair of hinge pins 144 arranged at either end of the first side 103 (see FIG. 11). The cover 150 includes one or more mounting receptacles 152 that pivotally couple the cover 150 to the outer hinge pins 144 (see FIGS. 9 and 11).

FIG. 9 is a front, isometric view of the splice tray 100 in which the cover 150 is arranged in an open position to facilitate access to the interior of the splice tray 100. As shown in FIG. 10, the cover 150 can be arranged at a predetermined angle α relative to the top of the retaining structures 132 of the splice region 130. In some embodiments, the predetermined angle α can range from about 70° to about 180°. In one embodiment, the predetermined angle α can range from about 90° to about 120°. In the example shown in FIG. 10, the predetermined angle α is about 105°.

FIG. 11 is a top, planar view of the splice tray 100 with the cover 150 pivoted to a closed position. The cover 150 includes a body 151 that extends over a substantial portion of the splice tray 100 to inhibit access to the interior of the splice tray 100. When arranged in the closed position, the cover 150 seats on the end walls 109 and on a shoulder 108 (FIGS. 3 and 4) defined in the second side wall 107 (e.g., see FIG. 22). In one embodiment, the cover 150 also can seat on one or more of the fiber management structures arranged in the fiber management region 120. Accordingly, the outer surface of the cover 150 is generally flush with the tops of the side walls 107, 114 of the splice tray 100.

The second side wall 107 also includes at least one flexible latch 115 that is configured to engage the cover 150 and secure the cover 150 in the closed position. For example, the side edge 153 of the cover 150 can define a recessed section 154 over which the latch 115 can extend when securing the cover 150 in the closed position. In one embodiment, the portion of the latch 115 extending over the recessed section 154 is sufficiently thin and the recessed section 154 is sufficiently deep that the top of the latch 115 is flush with the outer surface of the cover 150. In the example shown, the splice tray 100 includes first and second flexible latches 115 spaced along the second side wall 107 and configured to latch to recesses 154 spaced along the side edge 153 of the cover 150.

The cover 150 also defines a cut-out portion 155 to accommodate the retaining structure 132 of the splice region 130. In embodiments in which the splice tray 100 includes a second splice region 135, the cover 150 can define a second cut-out portion 156 as shown in FIG. 9 to accommodate the retaining structure 134 of the second splice region 135.

The cover 150 also can include a cut-out portion 157 at the fiber input/output region 110. For example, in one embodiment, the cut-out portion 157 can align with one or more of the openings 112 defined in the base panel 102. The cut-out portion 157 can accommodates one or more securement arrangements (e.g., cable ties) arranged at the fiber input/output region 110, thereby allowing the cover 150 to seat flush with the side walls 114, 107 of the splice tray 100. In one embodiment, the cover 150 can include a cut-out portion 157 at each of multiple fiber input/output regions 110. In the example shown in FIGS. 9 and 10, the cover 150 includes four cut-out portions 157 positioned over the four input/output regions 110 arranged generally at the corners of the splice tray 100.

In one embodiment, the cover 150 also can define an opening 158 extending through the cover 150 adjacent the cut-out portion 157. In one embodiment, the opening 158 aligns with one of the openings 112 defined in the base panel 102 (see FIG. 11). The opening 158 also can facilitate attachment of the securement arrangement 250 to the splice tray 100. For example, the opening 158 can provide clearance to accommodate a head of a cable tie or other securement arrangement 250. Providing the clearance enables the cover 150 to seat flush with the top of the splice tray 100. In the example shown, the cover 150 defines an opening 158 adjacent each of the four cut-out portions 157.

In another embodiment, the cover 150 can define another opening 159 aligned with a channel in the splice tray 100 to enable fastening of the splice tray 100 to a wall or other surface. For example, the cover 150 of FIG. 9 includes a central opening 159 aligned with the central fiber spool 122, which can define a channel 182 (FIG. 29) extending through the base panel 102 of the splice tray 100 (see FIG. 11). A screw or other fastener can be inserted through the cover opening 159 and through the channel defined in the fiber spool 122 to secure the splice tray 100 to a surface.

Referring to FIGS. 12-29, the splice tray 100 can be coupled to one or more additional splice trays to form a splice tray arrangement. Fibers can be routed amongst the coupled splice trays, for example, via the pass-through openings 125 defined in the bottom panel 102 of each splice tray. The outer boundary of each pass-through opening 125 is defined by a surface 171 extending along the first side 103 of each splice tray. Fibers can be routed laterally through a slit 172 defined in the surface 171 or can be threaded through each passthrough opening 125 in the splice tray arrangement.

Figure 25:
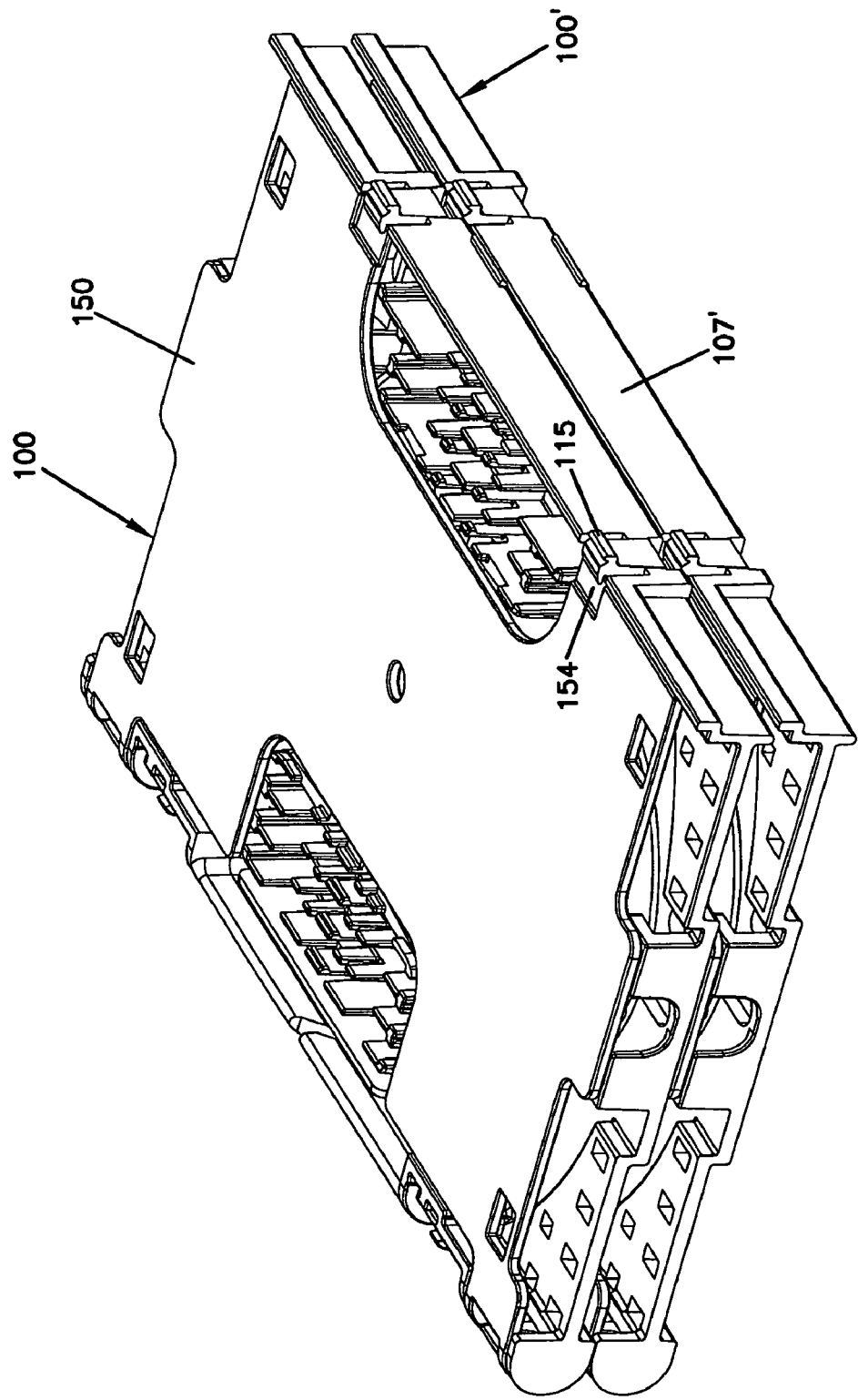
FIG. 25 is a top, front isometric view of the splice tray arrangement of FIG. 22 with the first and second splice trays arranged in a closed position in accordance with the principles of the present disclosure.
Figure 26:
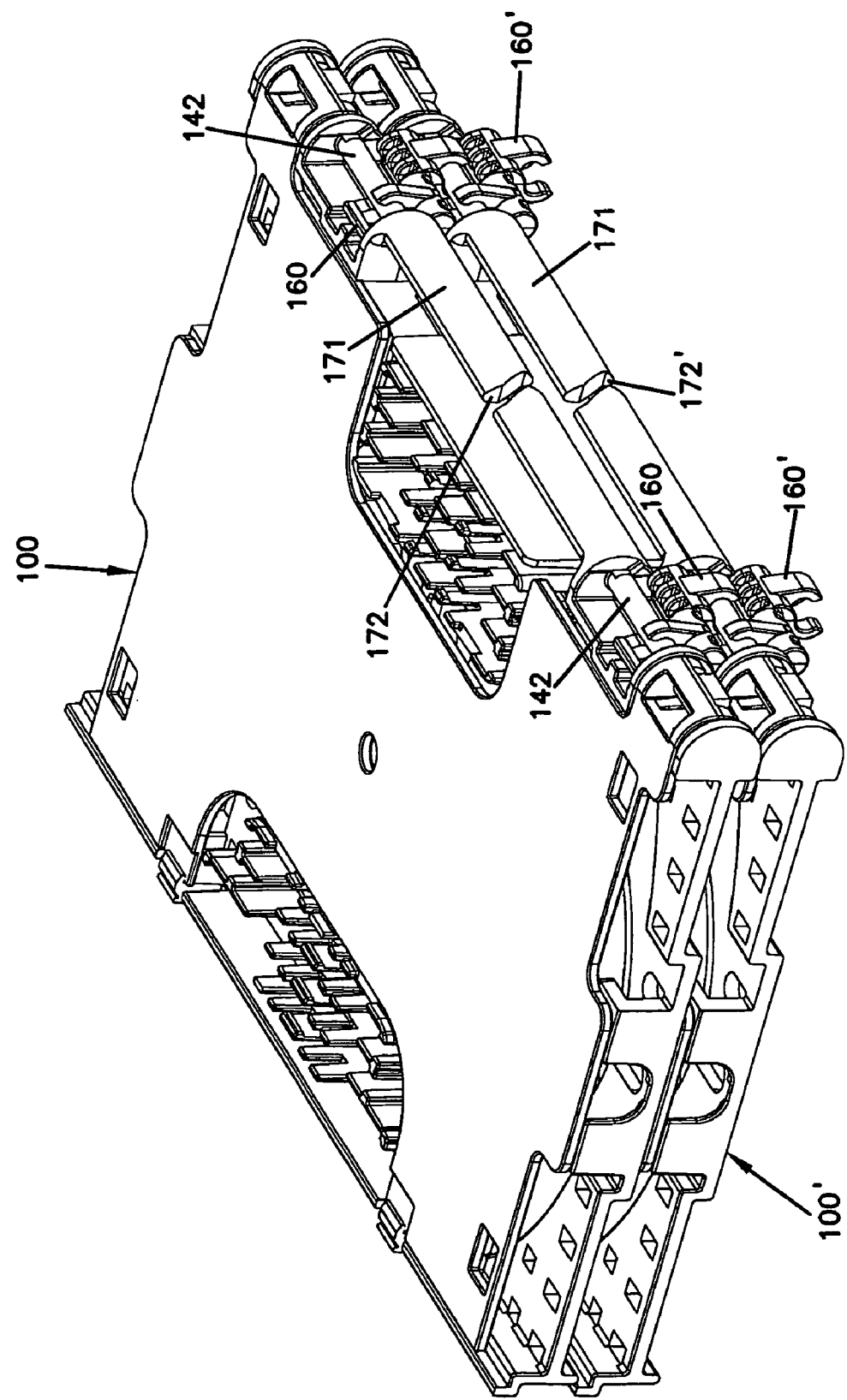
FIG. 26 is a top, rear isometric view of the splice tray arrangement of FIG. 25 in accordance with the principles of the present disclosure.
Figure 27:
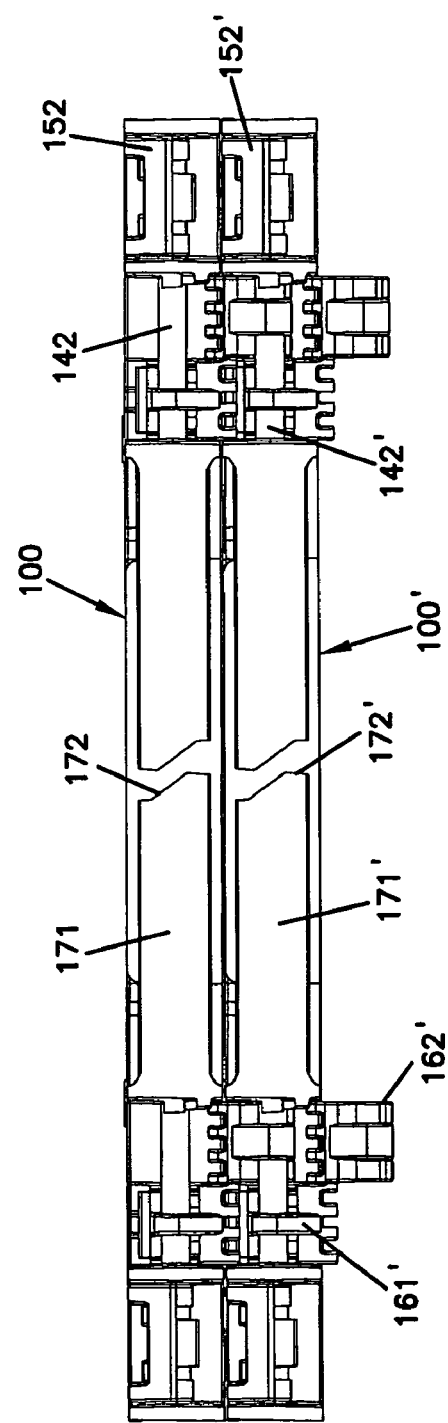
FIG. 27 is a rear view of the splice tray arrangement of FIG. 25 in accordance with the principles of the present disclosure.
Figure 28:
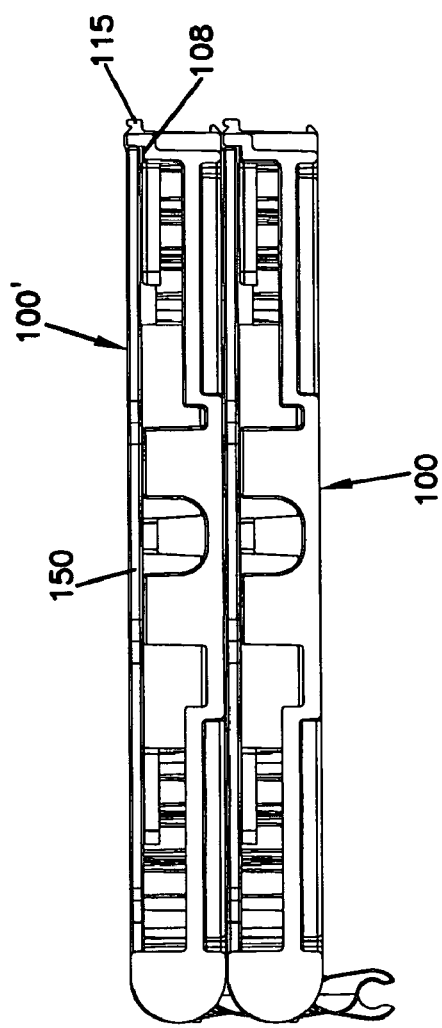
FIG. 28 is a side elevational view of the splice tray arrangement of FIG. 25 in accordance with the principles of the present disclosure.

In some embodiments, the splice trays 100 of the splice tray arrangement are coupled together in a stacked arrangement (e.g., see FIG. 25). In one embodiment, the splice trays 100 are coupled together in a pivoting stacked arrangement that facilitates access to individual splice trays 100 within the stack. In other embodiments, the splice trays 100 are coupled together in any suitable arrangement that enables a user to access a selected splice tray 100. In one embodiment, the splice tray 100 includes a tab 117 (FIG. 1) for securing the tray 100 to a corresponding latch on a mounting surface to inhibit movement of the bottom-most tray.

A first splice tray 100 can be coupled to a second splice tray 100' (FIG. 22) by one or more pivot linkages 160 (FIGS. 14-20). Parts of the splice tray 100' are the same as the splice tray 100 and have been assigned the same reference numbers with the addition of apostrophes. In general, each of the splice trays 100 includes one or more inner hinge pins 142 to which the pivot linkages 160 can mount. The inner hinge pins 142 are arranged between the outer hinge pins 144 on the first side 103 of the splice tray 100 (see FIGS. 2 and 11). In one embodiment, the inner hinge pins 142, 142' of each splice tray 100, 100' have a first width W1 and the outer hinge pins 144, 144' have a second width W2 (e.g., see FIG. 2). Typically, the first width W1 is greater than the second width W2.

With reference to FIGS. 14-20, each of the pivot linkages 160 includes a first coupling section 161 and a second coupling section 162. The first coupling section 161 extends in an opposite direction from the second coupling section 162 (e.g., see FIG. 16). In one embodiment, the first coupling section 161 is fixed relative to the second coupling section 162. For example, the first coupling section 161 can be formed integrally or monolithically with the second coupling section 162.

Figure 20:
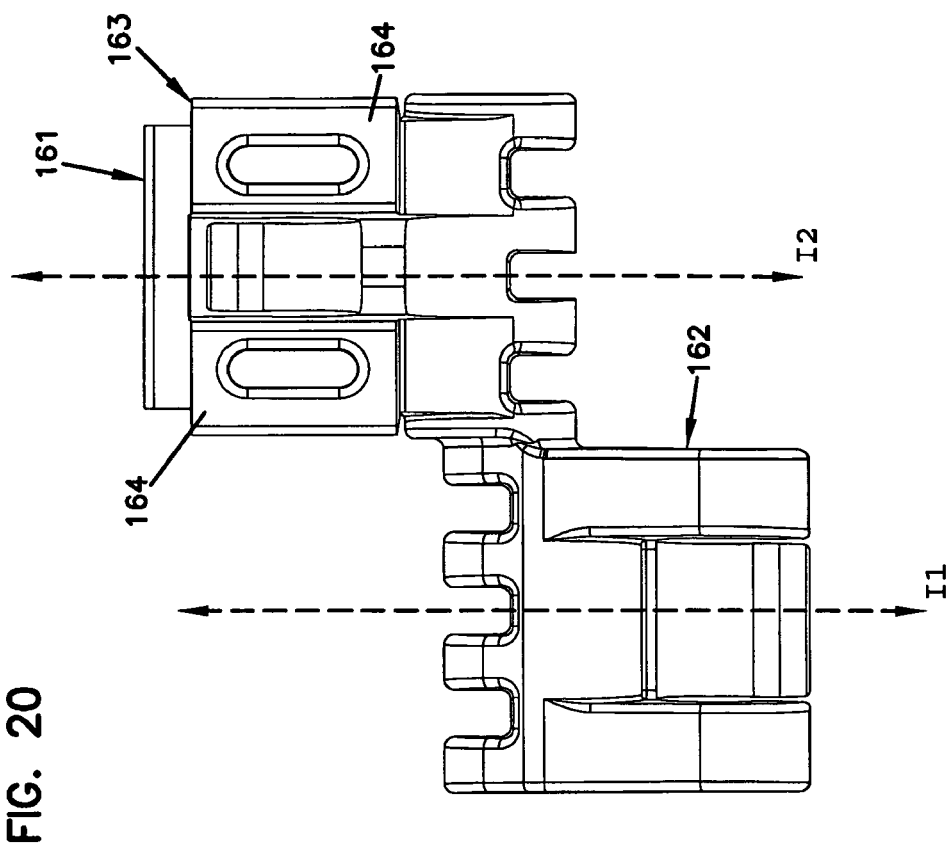
FIG. 20 is a rear view of the pivot linkage of FIG. 15 in accordance with the principles of the present disclosure.
Figure 21:
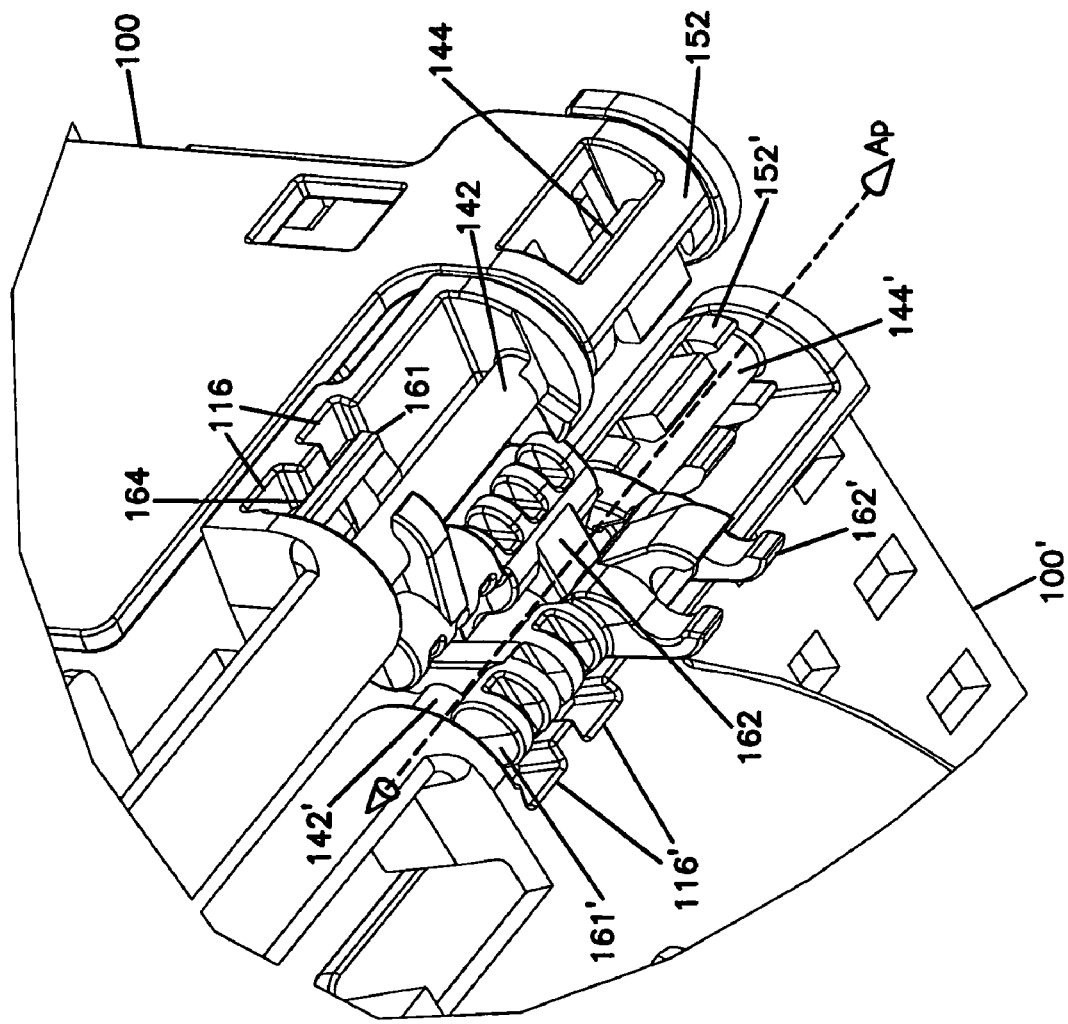
FIG. 21 is a partial view of a first example pivot linkage coupling together a first splice tray and a second splice tray in accordance with the principles of the present disclosure.

The first coupling section 161 is configured to couple to one of the inner hinge pins 142 of the first splice tray 100 and the second coupling section 162 is configured to couple to a corresponding inner hinge pin 142' of the second splice tray 100' (see FIG. 21). The first coupling section 161 has a first insertion axis $I_1$ and the second coupling section 162 has a second insertion axis $I_2$ (see FIG. 20). In the example shown, the first insertion axis $I_1$ is parallel to, but offset from, the second insertion axis $I_2$. In other embodiments, however, the insertion axes $I_1$, $I_2$ of the first and second coupling sections 161, 162 align. In one embodiment, the first and second coupling sections 161, 162 include snap-fit receptacles (see FIGS. 14-16) that mount over the inner hinge pins 142, 142'. In other embodiments, however, the first and second coupling sections 161, 162 can include any suitable structure for attaching the coupling sections 161, 162 to the hinge pins 142, 142'.

In some embodiments, the first coupling section 161 includes a securement structure 163 that enables the first coupling section 161 to couple to the first splice tray 100 at a fixed orientation (see FIG. 21). Accordingly, the first coupling section 161 does not pivot about the hinge pin 142. In one embodiment, the securement structure 163 defines one or more protrusions 164 (FIGS. 15-18) that can be inserted into channels 116 (see FIGS. 2 and 21) defined in the first side wall 114 of the splice tray 100. Dovetailing of the one or more protrusions 164 and the channels 116 inhibits sliding and tilting movements of the pivot linkage 160 with respect to the hinge pin 142 of the first splice tray 100.

The first and second splice trays 100, 100' pivot relative to each other along a pivot axis Ap (FIG. 21) extending longitudinally along the hinge axes 142' of the second splice tray 100'. Because of the securement structure 163 of the pivot linkage 160, the first splice tray 100 is non-pivotally coupled to the first coupling section 161, which is fixedly coupled to the second coupling section 162, which is pivotally coupled to the second splice tray 100'. Accordingly, when the first splice tray 100 is pivoted to an open position relative to the second splice tray 100', as shown at FIGS. 21 and 22, this pivotal movement is implemented by pivoting the second coupling section 162 of the pivot linkages 160 about the inner hinge pins 142' of the second splice tray 100'.

Figure 22:
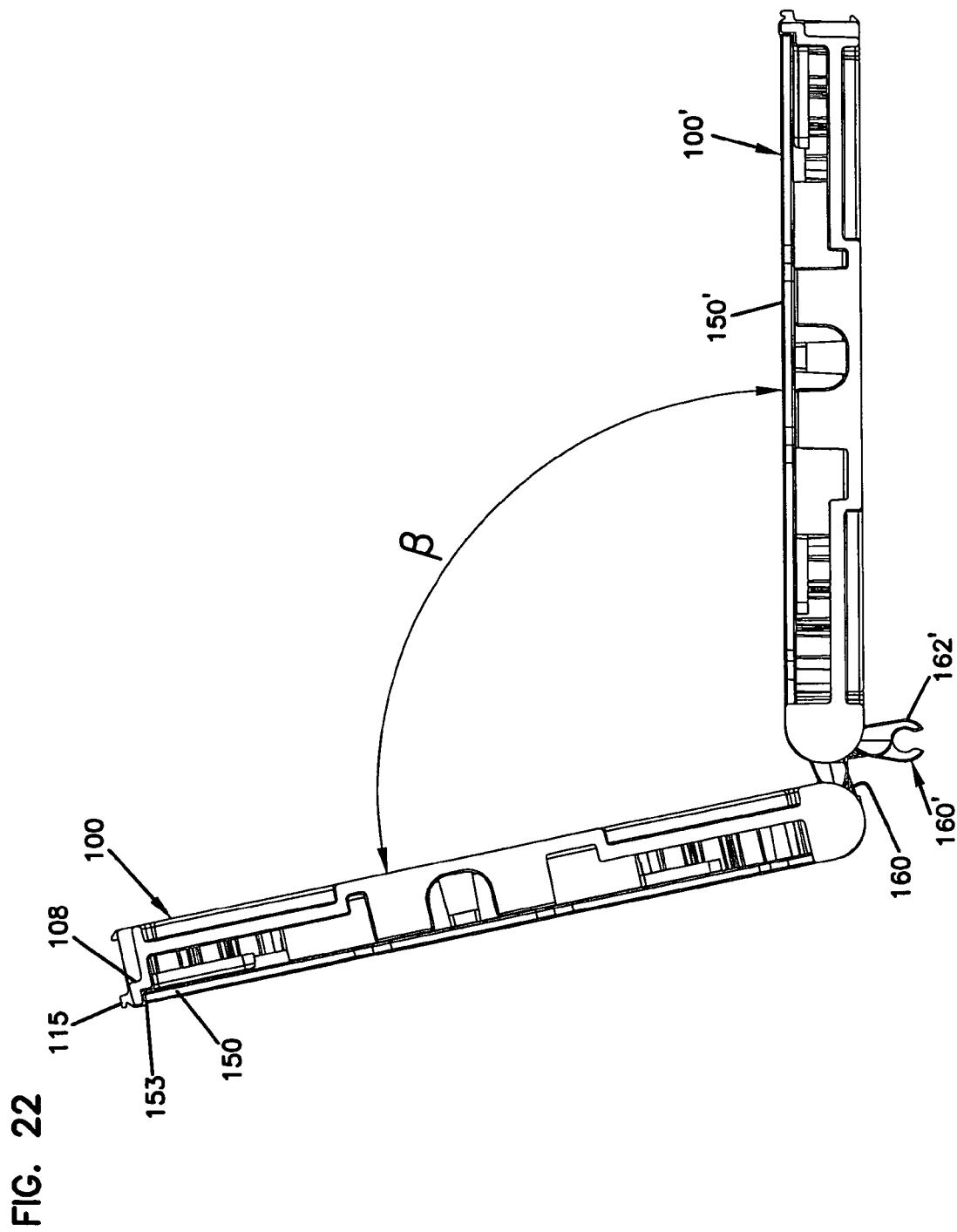
FIG. 22 is a side elevational view of a splice tray arrangement including a first splice tray pivotally coupled to a second splice tray and arranged in an open position providing access to the second (bottom) splice tray in accordance with the principles of the present disclosure.
Figure 23:
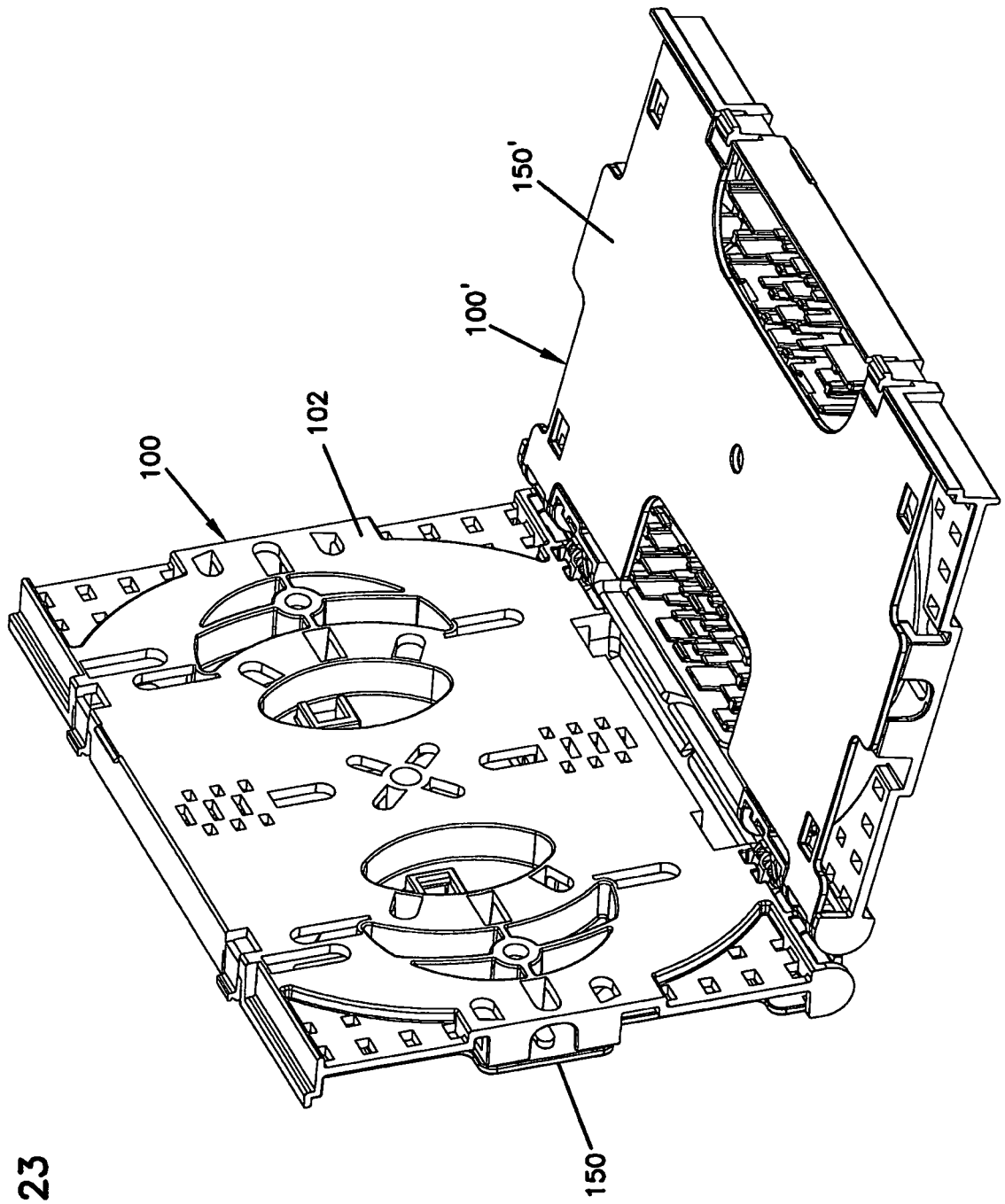
FIG. 23 is a front isometric view of the splice tray arrangement of FIG. 22 in accordance with the principles of the present disclosure.
Figure 24:
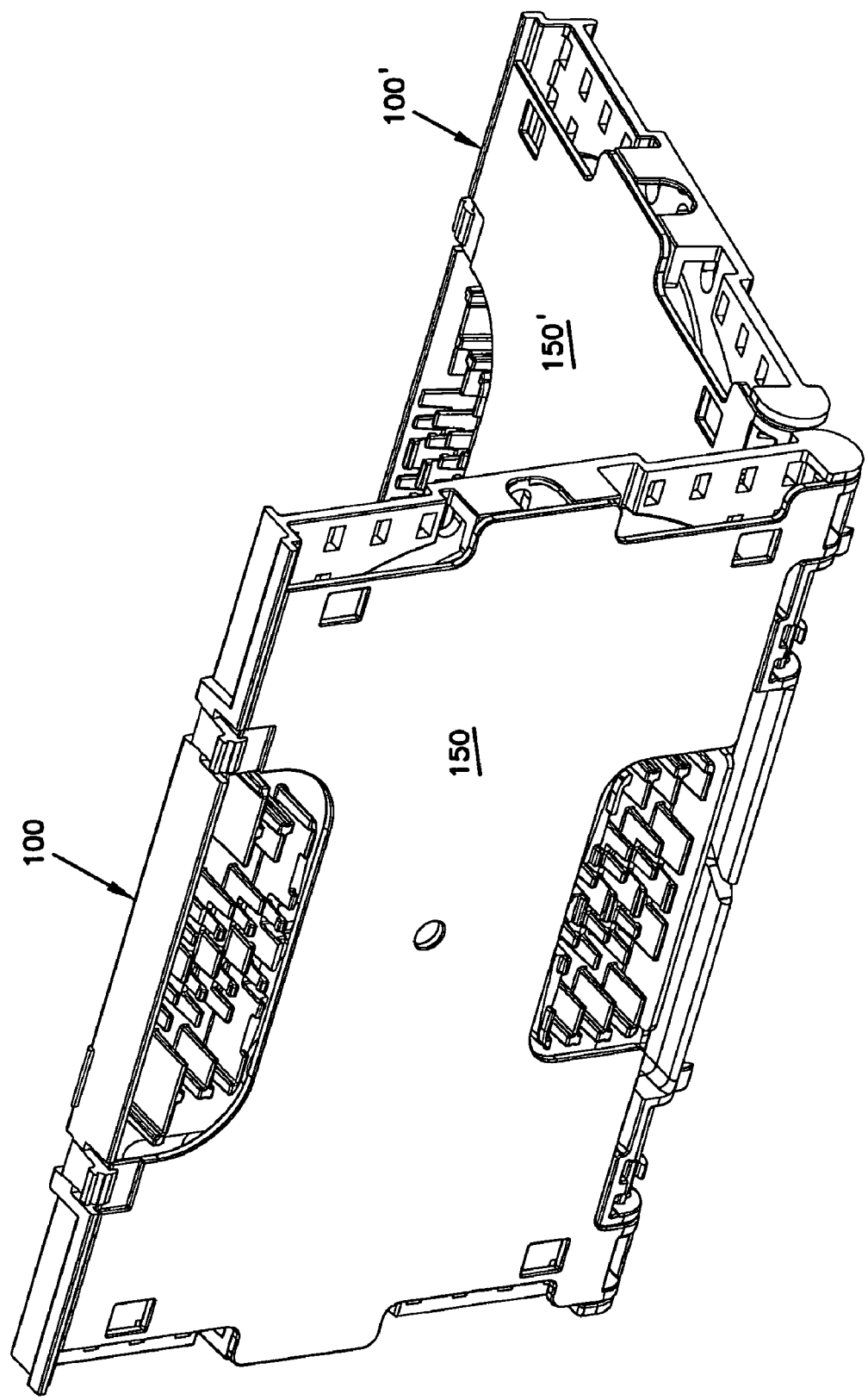
FIG. 24 is a rear isometric view of the splice tray arrangement of FIG. 22 in accordance with the principles of the present disclosure.

As shown in FIG. 22, the first splice tray 100 can be arranged relative to the cover 150' of the second splice tray 100' at a predetermined angle β. In some embodiments, the predetermined angle β between the cover 150' and the first splice tray 100 can range from about 70° to about 180°. In one embodiment, the predetermined angle β between the cover 150' and the first splice tray 100 can range from about 90° to about 120°. In the example shown in FIG. 22, the predetermined angle β is about 102°.

Figure 19:
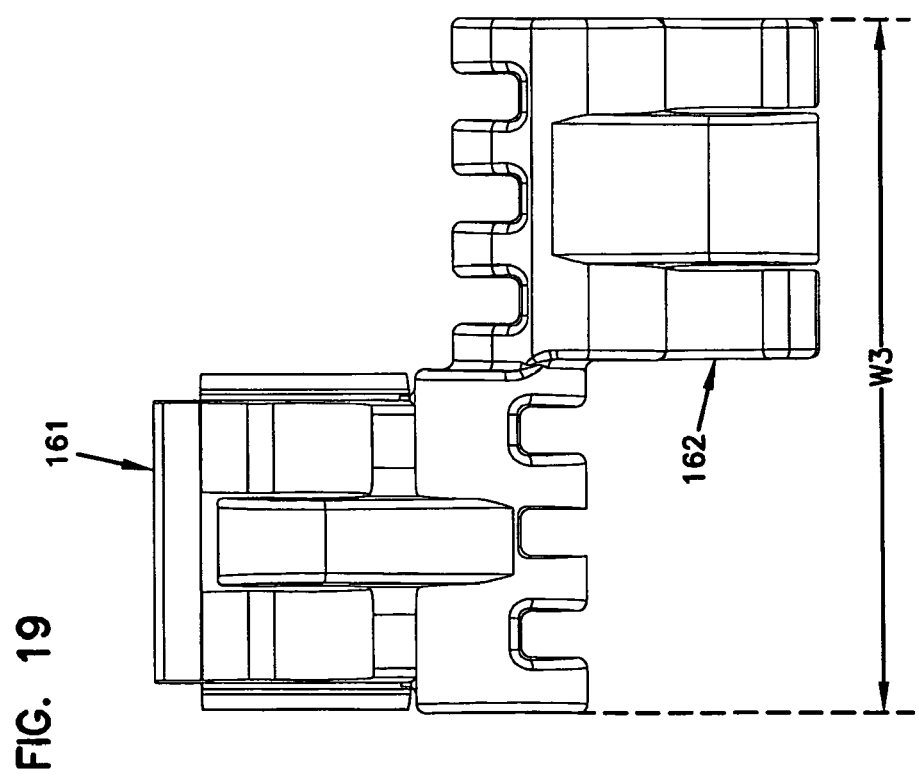
FIG. 19 is a front view of the pivot linkage of FIG. 15 in accordance with the principles of the present disclosure.

As shown in FIG. 19, the pivot linkages 160 have a third width W3 that is less than or equal to the first width W1 of the inner hinge pins 142. As shown in FIG. 11, in certain embodiments, each inner hinge pin 142 can be divided into a first section S1 and a second section S2. Each section S1, S2 has a length sufficient to accommodate a coupling section of a pivot linkage. Accordingly, each inner hinge pin of a splice tray can accommodate a first coupling section of one pivot linkage and a second coupling section of another pivot linkage.

For example, in FIG. 21, the second coupling section 162 of the first pivot linkage and the first coupling section 161' of the second pivot linkage 160' are mounted to the same inner hinge pin 142' of the second splice tray 100'. The second coupling section 162' of the second pivot linkage 160' in FIG. 21 is configured to mount to an inner hinge pin of a third splice tray (not shown) to mount the third splice tray to the splice tray arrangement shown in FIG. 21. The inner hinge pin 142 of the first splice tray 100 of FIG. 21 has an outer section free to receive a second coupling section of another pivot linkage in order to add another splice tray to the splice tray arrangement of FIG. 21.

In the examples shown in FIGS. 14-21, the coupling sections 161, 162 of each pivot linkage 160 are arranged offset from each other (see FIG. 20). Accordingly, the pivot linkages in the splice tray arrangement are positioned in the same orientation. For example, the first coupling section of each pivot linkage is arranged closer to the pass-through opening 125 of the splice tray 100 and the second coupling section of each pivot linkage is arranged closer to the input/output region 110 of the splice tray 100.

In other embodiments, however, the coupling sections of each pivot linkage can be arranged in alignment with each other. In such embodiments, the pivot linkages can be arranged in an alternating configuration to couple together multiple splice trays. For example, a first pivot linkage can link together two splice trays using a left side of the inner hinge pins on both splice trays. A third splice tray can be coupled to the second splice tray using a second pivot linkage coupled to the right side of the inner hinge pins on both the second and third splice trays. Similarly, a fourth splice tray can be coupled to the first splice tray using a third pivot linkage coupled to the right side of the inner hinge pins on both the first and fourth splice trays.

Referring to FIGS. 23-29, the splice trays in a splice tray arrangement can be releasably secured to each another using a coupling arrangement. When a user elects to access one of the splice trays of the splice tray arrangement, the user releases the coupling arrangement on the selected splice tray, pivots the splice tray to allow access to the respective cover, opens the cover, and accesses the interior of the selected splice tray. For example, in some embodiments, the splice trays can be latched to each other using a latching tab and corresponding notch that can be arranged on each tray.

Figure 30:
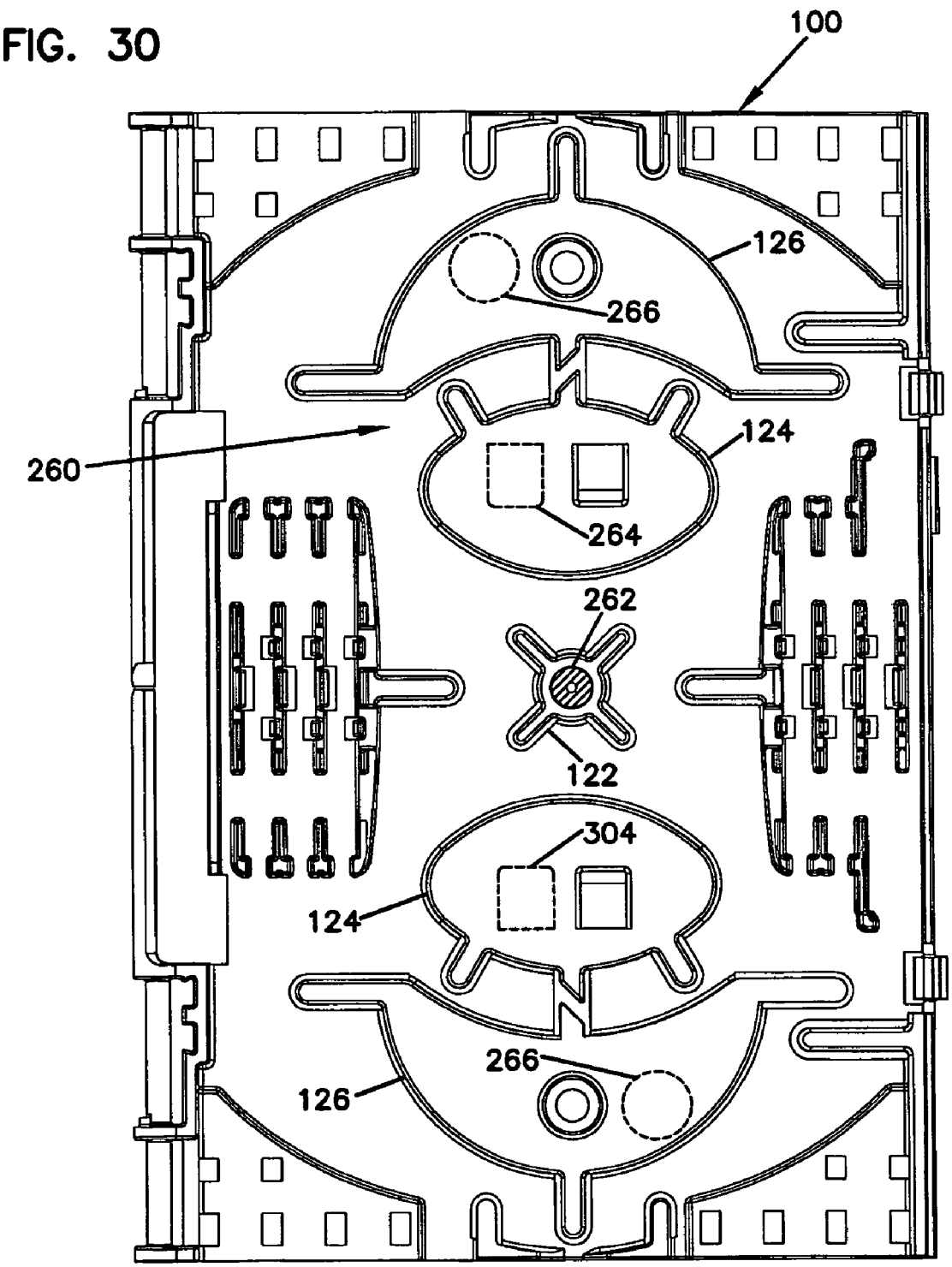
FIG. 30 is a plan view of an example splice tray including a magnet arrangement in accordance with the principles of the present disclosure.

In other embodiments, the splice trays can be coupled together using a magnetic arrangement 260 (FIG. 30). The magnetic arrangement 260 is configured so that the force of the magnetic attraction between the splice trays is sufficiently strong to inhibit relative movement of the trays until application of a predetermined force by the user. In one embodiment, the magnetic arrangement 260 can include a disc magnet (e.g., see magnet 262 of FIG. 30). In another embodiment, the magnetic arrangement 260 can include a flat magnet (e.g., see magnets 264, 266 of FIG. 30). In another embodiment, the magnetic arrangement 260 can include a snap-in cylinder magnet. In another embodiment, the magnet arrangement can include multiple magnets.

In one embodiment, each splice tray of the splice tray arrangement can include one or more magnets that are attracted to one or more magnets arranged in an adjacent splice tray. For example, the magnet of each splice tray can be arranged within the cavities 182, 184, 186 provided within the fiber management structures 122, 124, 126, respectively (e.g., see FIG. 29). In other embodiments, however, magnets can be provided in any suitable locations within the splice trays. In another embodiment, some splice trays include magnets and other splice trays include metal or metallized features fabricated to be attracted to the magnets.

Figure 31:
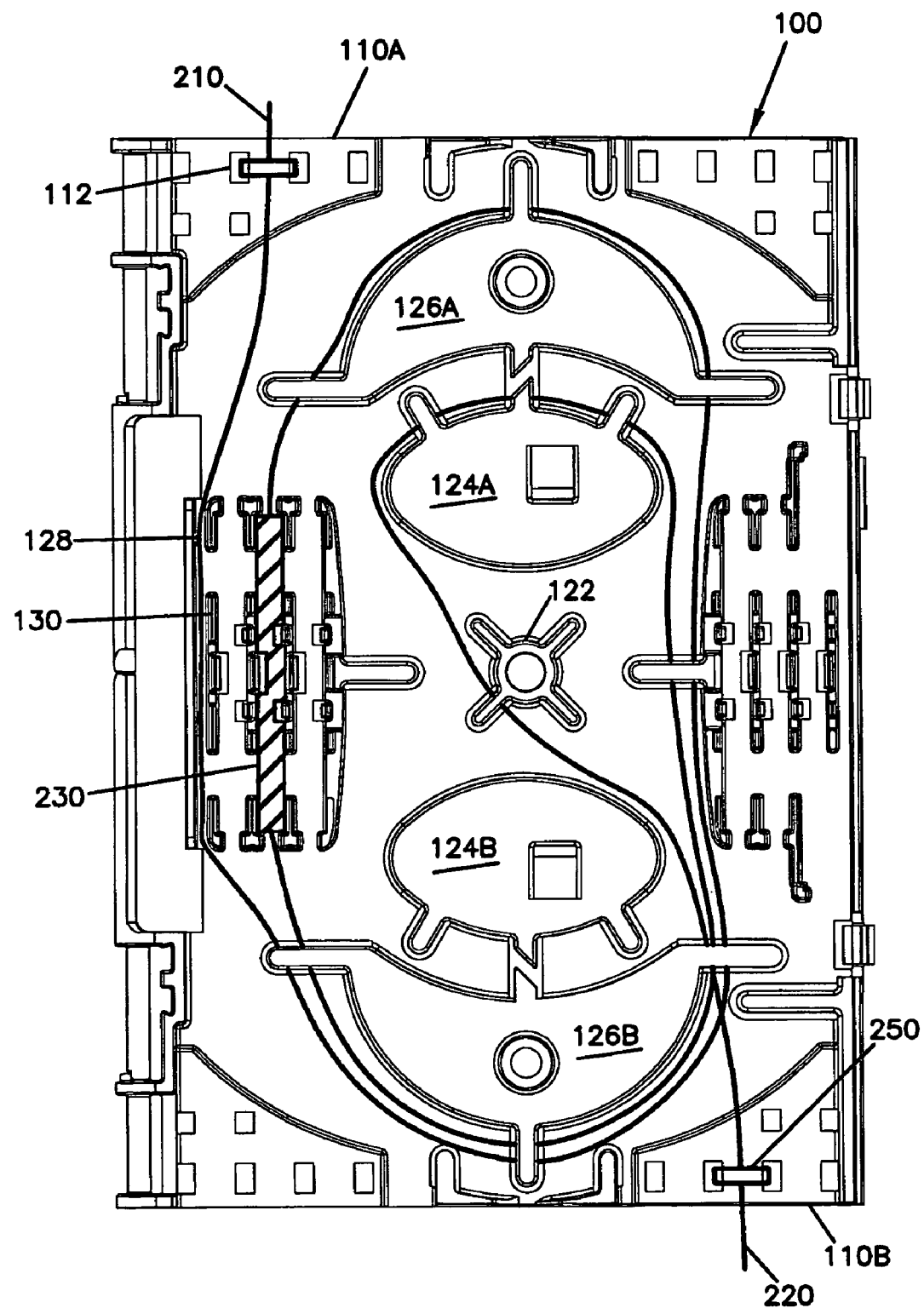
FIGS. 31 and 32 are schematic diagrams of example fiber routing layouts in accordance with the principles of the present disclosure.
Figure 32:
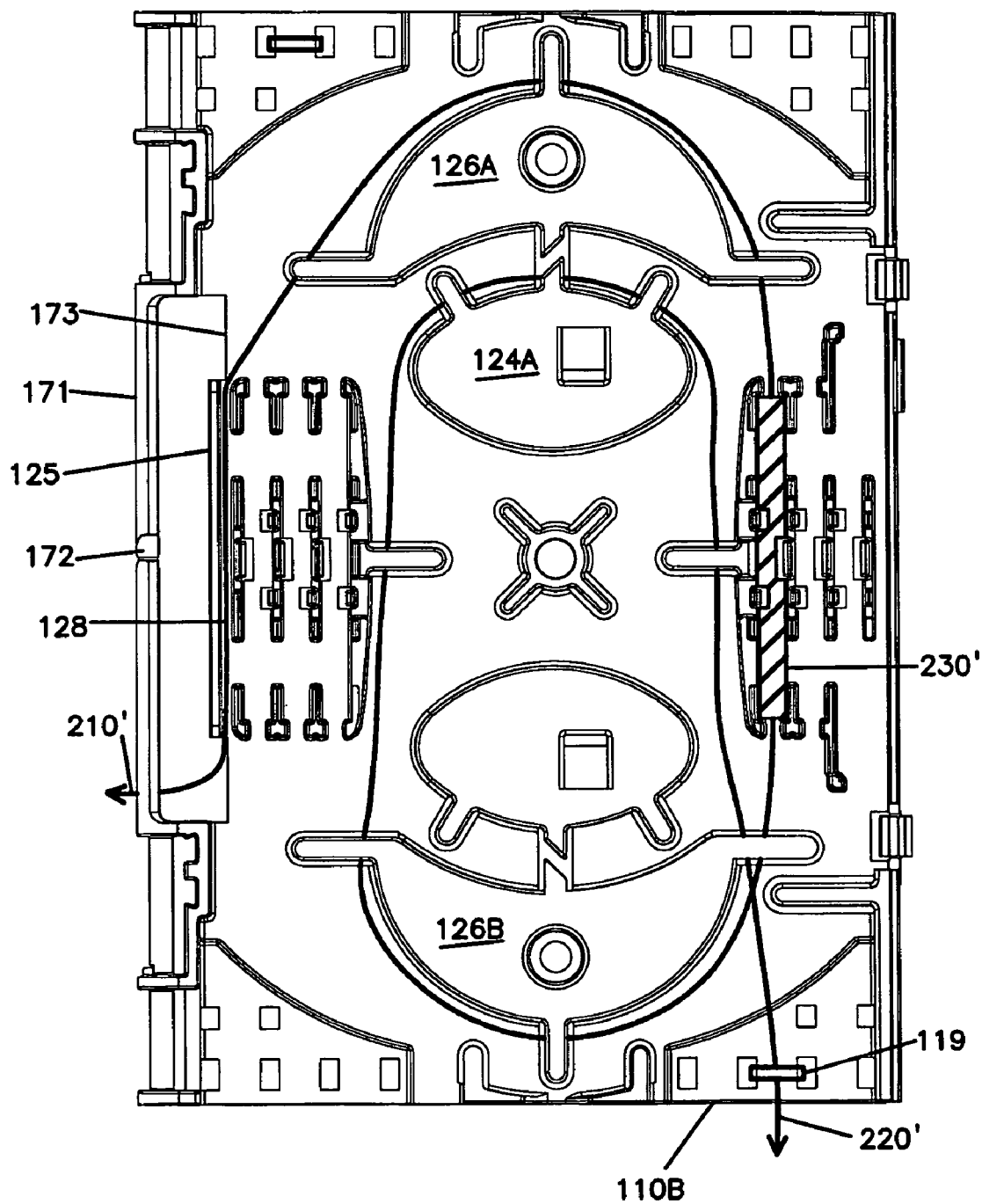
Figure 33:
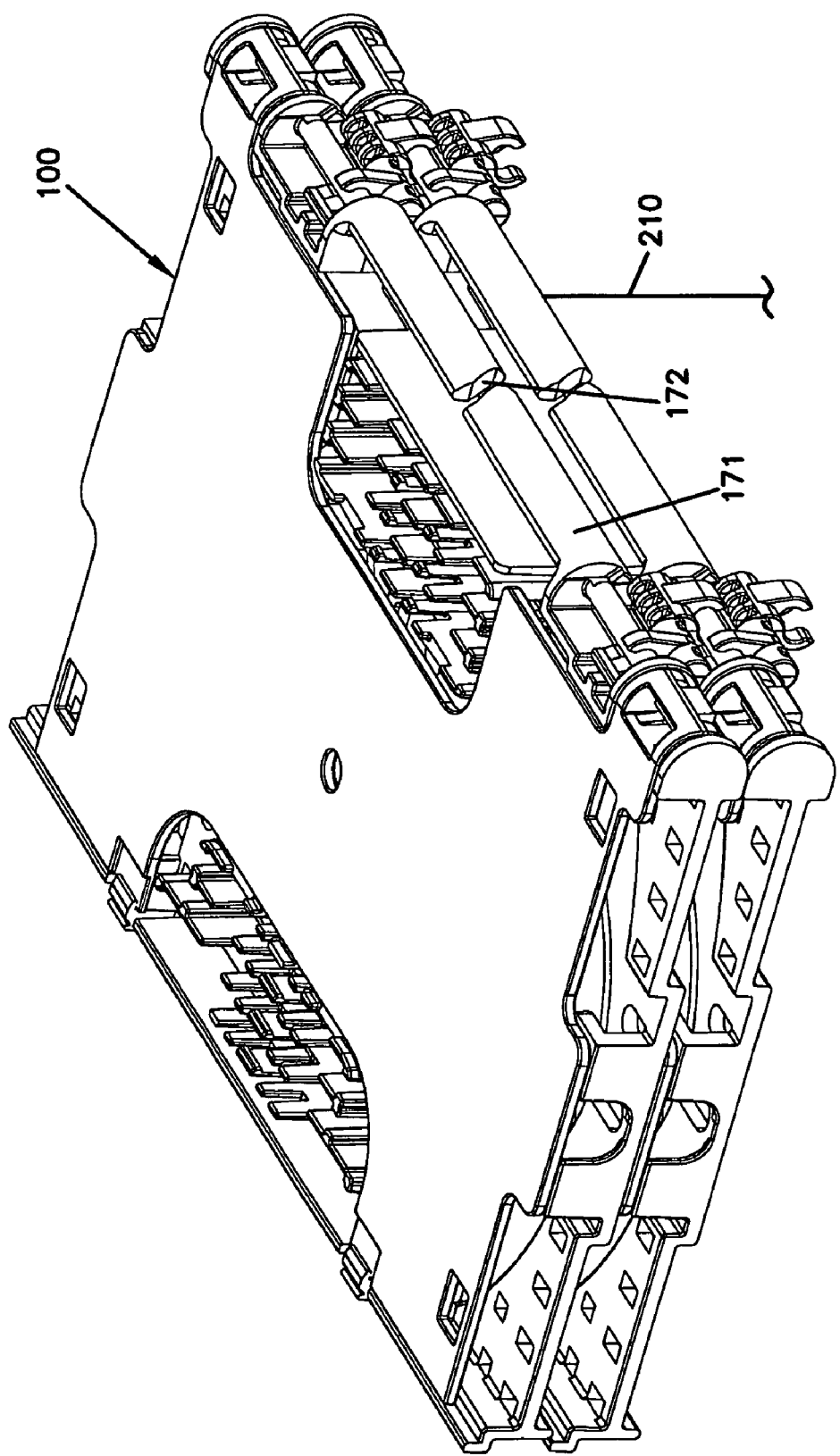
FIG. 33 is a top, rear isometric view of the splice tray arrangement of FIG. 25 in accordance with the principles of the present disclosure.

Non-limiting examples of fiber-routing layouts are provided herein with respect to FIGS. 31-33. As shown at FIG. 31, a pre-terminated fiber 210 from a trunk cable (not shown) enters the splice tray 100 through a first fiber input/output region 110A in a first fiber routing layout. In the example shown, a securement arrangement (e.g., cable tie) 250 secures the fiber 210 to openings 112 at the input/output region 110A. The fiber 210 is typically either loose or tight buffered. Upon entering the splice tray 100, excess length of the fiber 210 is routed through the channel 128, which extends along the storage path P3 on the outer side of splice region 130. The fiber 210 also is routed around each of the half-spools 126B, 126A along the second storage path P2 to a splice sleeve 230 arranged at the first splice region 130 of the splice tray 100.

The fiber 210 is spliced to a fiber 220, which corresponding to a drop cable (not shown), at the splice region 130. The drop cable fiber 220 is routed from the splice sleeve 230 around one of the half-spools 126B along the second storage path P2, routed in front of the central spool 122 to reverse direction, and routed around the full spool 124A along the first storage path P1 to a second fiber input/output region 110B. In the example shown, a cable tie 250 secures the fiber 220 to openings 112 at the input/output region 110B. In other embodiments, the fiber 220 can exit the splice tray 100 at any of the input/output regions or through the pass-through opening 125.

As shown at FIG. 32, a fiber 210' from another tray (e.g., another splice tray, a splitter tray, a cable management tray, etc.) enters the splice tray 100 through the pass-through opening 125 in a second fiber routing layout. For example, the fiber 210' can be threaded up through the pass-through 125 or can be inserted through the slot 172 defined in the surface 171 of the splice tray 100 (see FIG. 33). The fiber 210' is typically either loose or tight buffered. After being routed into the splice tray 100 in FIG. 32, excess length of the fiber 210' is routed along the channel 128 of the storage path P3, around one of the half spools 126A, to a splice sleeve 230' arranged at the second splice region 135.

The fiber 210' is spliced to a fiber 220' corresponding to a drop cable at the second splice region 135. The drop cable fiber 220' leaves the splice sleeve 230' following the second storage path P2, curves along the second half-spool 126B, and winds around one of the full spools 124A as the fiber 220' extends along storage path P1. The fiber 220' leaves the fiber splice tray 100 at the input/output region 110B. As shown in FIG. 32, the fiber 220' is secured to the input/output region 110B using a securement arrangement 250, such as a cable tie. The fiber 220' is typically loose or tight buffered.

In other embodiments, the excess length of any of the fibers 210, 220 can be stored within the cable management region 120 of the splice tray 100 in other configurations. For example, excess length of the fibers 210, 220 can be routed in a full loop around the first path P1, in a full loop around the second path P2, in a full loop around the third path P3, in a figure-8 configuration about the full spools 124 or about the half-spools 126, or some combination thereof. In some embodiments, one or both fibers 210, 220 can enter the splice tray 100 through the pass-through opening 125. In another embodiment, one or both fibers 210, 220 can enter through the pass-through 125 and be routed directly to a cable management structure without being routed through the channel 128. In another embodiment, the fibers 210, 220 can enter the splice tray 100 through the same input/output region 110.

Figure 34:
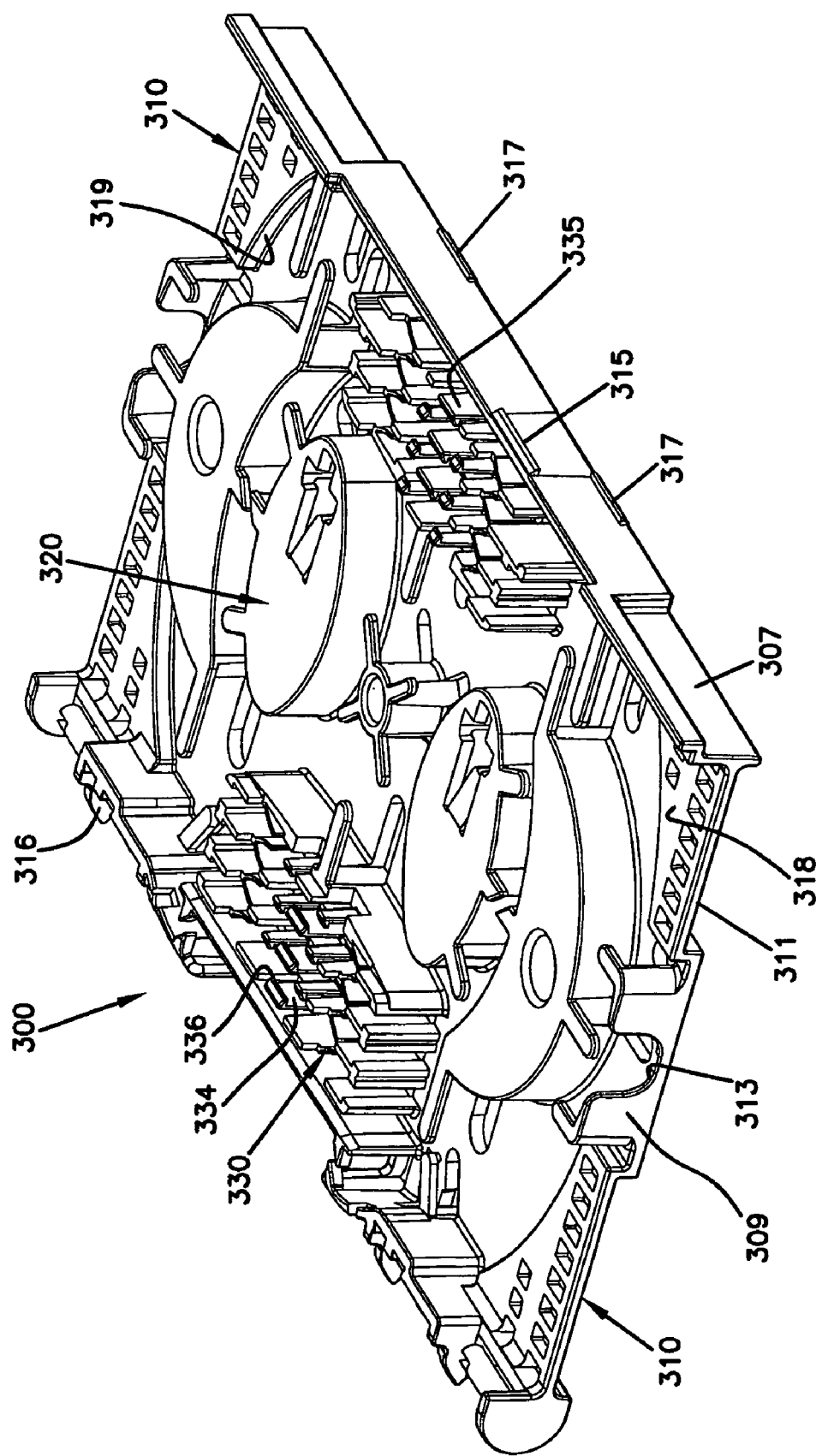
FIG. 34 is a top, front perspective view of another example splice tray in accordance with the principles of the present disclosure.
Figure 35:
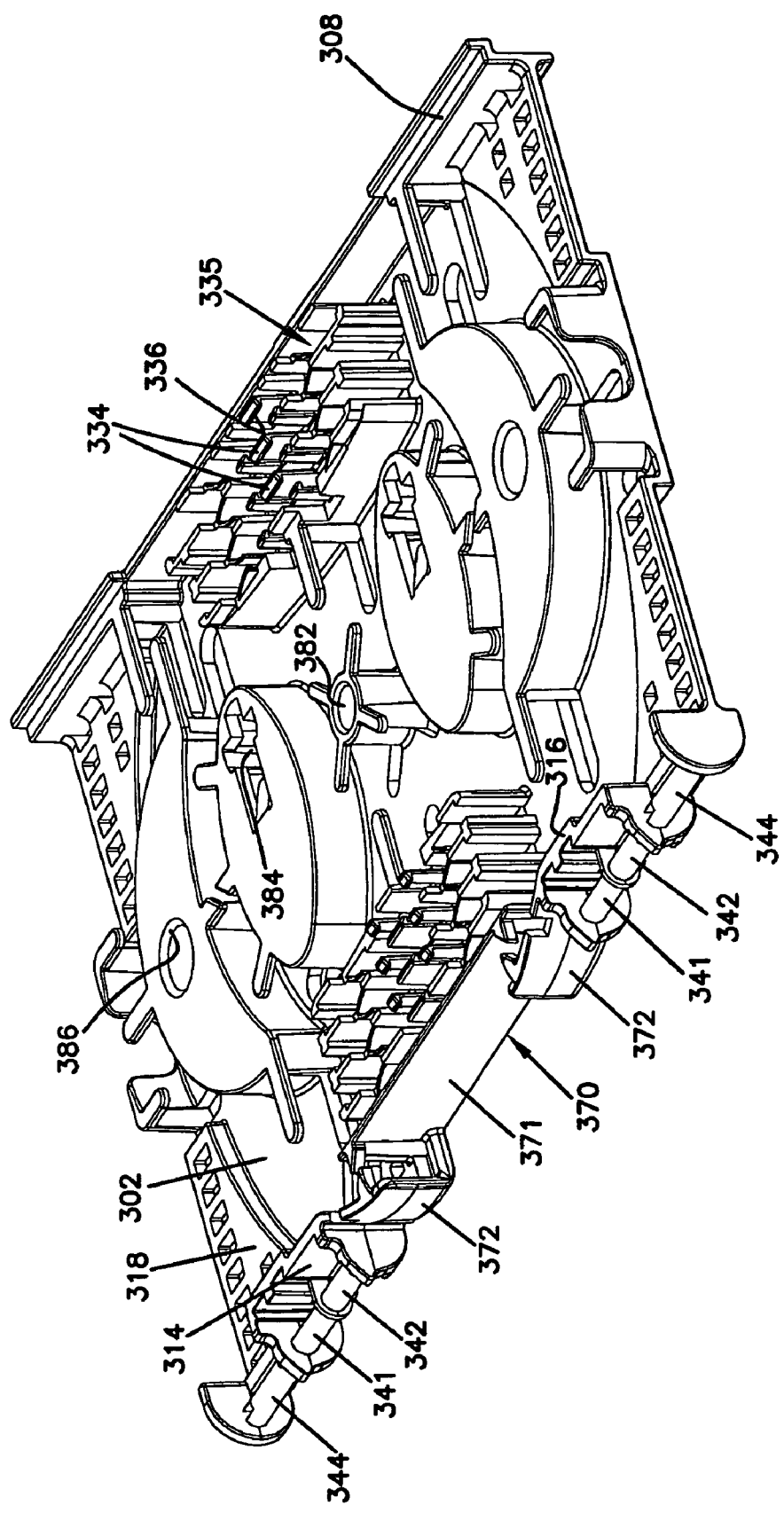
FIG. 35 is a top, rear perspective view of the splice tray of FIG. 34 in accordance with the principles of the present disclosure.
Figure 36:
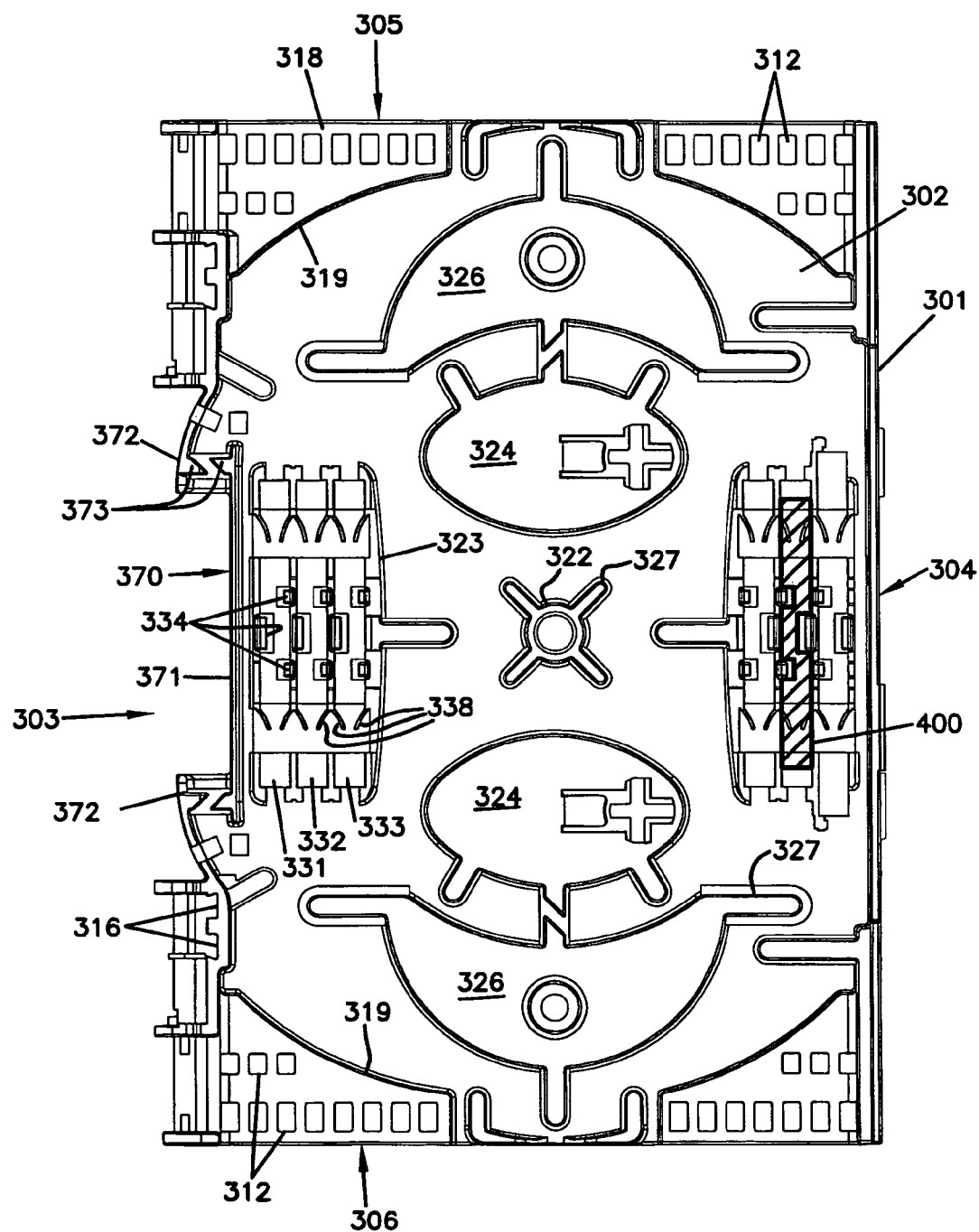
FIG. 36 is a plan view of the splice tray of FIG. 34 in accordance with the principles of the present disclosure.

FIGS. 34-65 show another example embodiment of a splice tray 300 configured in accordance with the principles of the present disclosure. The tray 300 includes at least a first fiber input/output region 310, a fiber management region 320, and at least a first optical component holding region 330. Fibers can be routed on or off the tray 300 at one of the fiber input/output regions 310. Fibers also can be routed on or off the splice tray 300 through a side entrance 370 (FIGS. 35 and 36). The fibers are optically coupled (e.g., spliced), protected (e.g., with a splice sleeve), and secured to the optical component holding region 330 of the splice tray 300. Any excess length of the fiber is routed through the fiber management region 320.

The optical component holding region 330 is capable of securely holding optical components, such as mechanical splicing components, fusion splicing components, splitting components, or other components, to the splice tray 300. In certain embodiment, the splice tray 300 also includes a second optical component holding region 335 configured to hold optical components that optically couple fibers. In one embodiment, the second optical component holding region 335 is arranged on an opposite side of the tray 300 from the first optical component holding region 330.

As shown in FIG. 36, the splice tray 300 includes a body 301 including a base panel 302 having opposite sides 303, 304 extending between opposite ends 305, 306. The base panel 302 defines a plane. A first side member 314 (FIG. 35) extends upwardly from the plane of the base panel 302 and along at least a portion of the first side 303. In one embodiment, the first side member 314 includes two side members arranged on opposite ends of the side entrance 370. A second side member 307 (FIG. 34) extends upwardly from the plane of the base panel 302 and along at least a portion of the second side 304. The base panel 302, first side member 314, and second side member 307 define an interior of the splice tray 300.

The fiber input/output regions 310 can be arranged at the opposite ends 305, 306 of the tray 300. At each of the fiber input/output regions 310, a stepped-up section 318 of the tray 300 defines a plane parallel to, but offset from, the plane of the base panel 302. In the example shown, the stepped-up section 318 is offset upwardly from the base panel 302 into the interior of the splice tray 300. The stepped-up section 318 of the tray 300 is connected to the base panel 302 by a shoulder 319 (FIG. 34).

The base panel 302 terminates at the shoulder 319 to define a recess 311 beneath the stepped-up section 318 (FIG. 34) of the tray 300. In one embodiment, the recess 311 provides clearance to accommodate a securement arrangement, such as one or more cable ties. The stepped-up section 318 of the tray 300 at each fiber input/output region 310 also defines one or more openings 312 at which the securement arrangement can be coupled to the splice tray 300 when arranged within the recess 311. In certain embodiments, each stepped-up section 318 defines one or more rows of openings 312. In the example shown, each stepped-up section 318 defines two rows of openings 312.

As indicated above, the body 301 of the splice tray 300 can define a side entrance 370 along a portion of the first side 303. For example, the base 302 of the tray 300 can define an open sided notch forming the side entrance 370. In the example shown, the side entrance 370 is located adjacent to the first optical component holding region 330. A side wall 371 extends along the length of the notched region to define a boundary of the splice tray 300. Flared entrance passages 372 are positioned at opposite ends of the notched region 370. Flange members 373 aid in routing fibers through the flared entrance passages 372 and onto the tray 300.

In general, the fiber management region 320 is the same as the fiber management region 120 of the first example splice tray 100 of FIGS. 1-33. The fiber management region 320 includes one or more fiber management spools protruding upwardly from the base panel 302 of the splice tray 300. In the example shown, the fiber management region 320 includes a first fiber spool 322 arranged at a generally central location of the tray 300, a pair of intermediate spools 324 arranged on opposite ends of the first fiber spool 322, and a pair of outer spools 326 arranged adjacent the opposite ends 305, 306 of the body 301 of the splice tray 300. In certain embodiments, one or more of the fiber management structures within the fiber management region 320 define cavities (see FIGS. 35, 40, and 60). One or more fasteners can be inserted through the base panel 302 and through the cavities to fasten the splice tray 300 to a mounting surface.

In certain embodiments, each of the optical component holding regions 330, 335 of the splice tray 300 has a universal configuration that allows the component holder to hold optical components of various sizes and shapes. Referring to FIG. 36, each component holding region 330, 335 includes three component holding channels 331, 332, and 333. Each of the channels 331-333 is configured for holding an optical component. The channels 331-333 have elements adapted for securely holding optical components. For example, each of the channels 331-333 includes two cantilever shaped latches 334 spaced apart from one another along the length of each of the channels. The latches 334 have base ends integrally formed with the base 302 of the tray 300 and top ends having catches 336 (e.g., stops, lips, tabs, etc.) adapted to extend partially over the tops of the channels 331-333.

When an optical component is inserted vertically into one of the channels 331-333, ramp surfaces at the top ends of the corresponding latches 334 cause the latches 334 to flex away from the channel so as to allow the optical component to be inserted therein. Once the optical component has been inserted downwardly into the desired channel, the latches 334 resiliently return back to their unbiased position in which the catches 336 overhang the optical component within the channel to inhibit the optical component from moving vertically out of the channel. To remove the optical component from the channel, the latches 334 can be flexed (e.g., manually) away from the channel so as to provide clearance for lifting the optical component from the corresponding channel.

Each of the channels 331-333 also includes two securement features spaced apart from one another along the lengths of the channels for engaging optical components inserted within the channels. Each of the securement features has a chevron shape formed by two resilient retaining members 338. Each resilient member 338 has a base end that is integrally formed with a wall of one of the channels and a free end extending at least partially along the length of the channel. The free ends of the resilient members 338 are positioned adjacent to one another near mid-lines (e.g. longitudinal axes) of the channels 331-333. The resilient retaining members 338 are angled relative to the walls of the channels 331-333 and relative to one another so that, when viewed from above the splice tray, the resilient retaining members 338 form a v-shape with a slight gap defined between the resilient retaining members 338.

In certain embodiments, the securement features of each channel 331-333 define chevron shapes that face in the same direction. When an optical component is inserted within one of the channels, the optical component is inserted between the resilient retaining members 338 causing the resilient retaining members 338 to flex apart. Once the optical component has been fully inserted between the resilient retaining members 338, each of the resilient retaining members 338 is biased against the outer surface of the optical component, thereby frictionally holding the optical component in place so as to limit both axial movement and vertical movement of the optical component. FIG. 36 shows the tray 300 with an optical component 400 mounted in a channel of the second component holding region 335.

Figure 39:
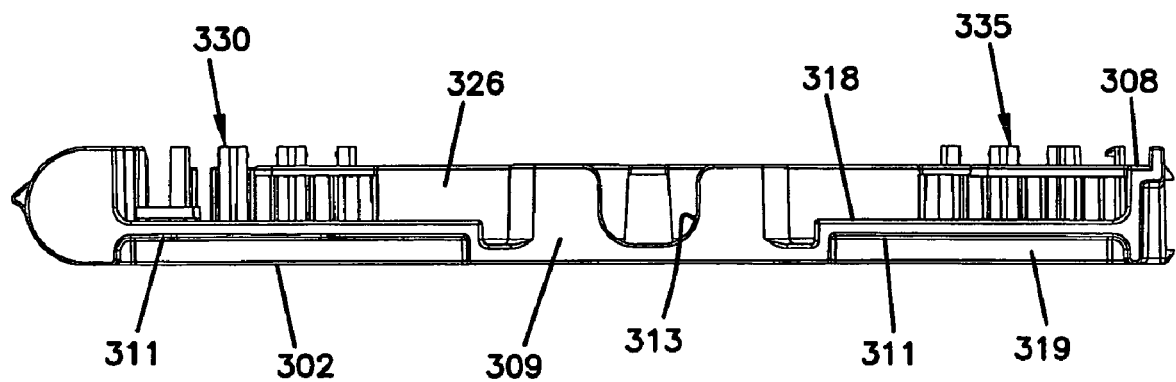
FIG. 39 is a first end view of the splice tray of FIG. 34 in accordance with the principles of the present disclosure.
Figure 40:
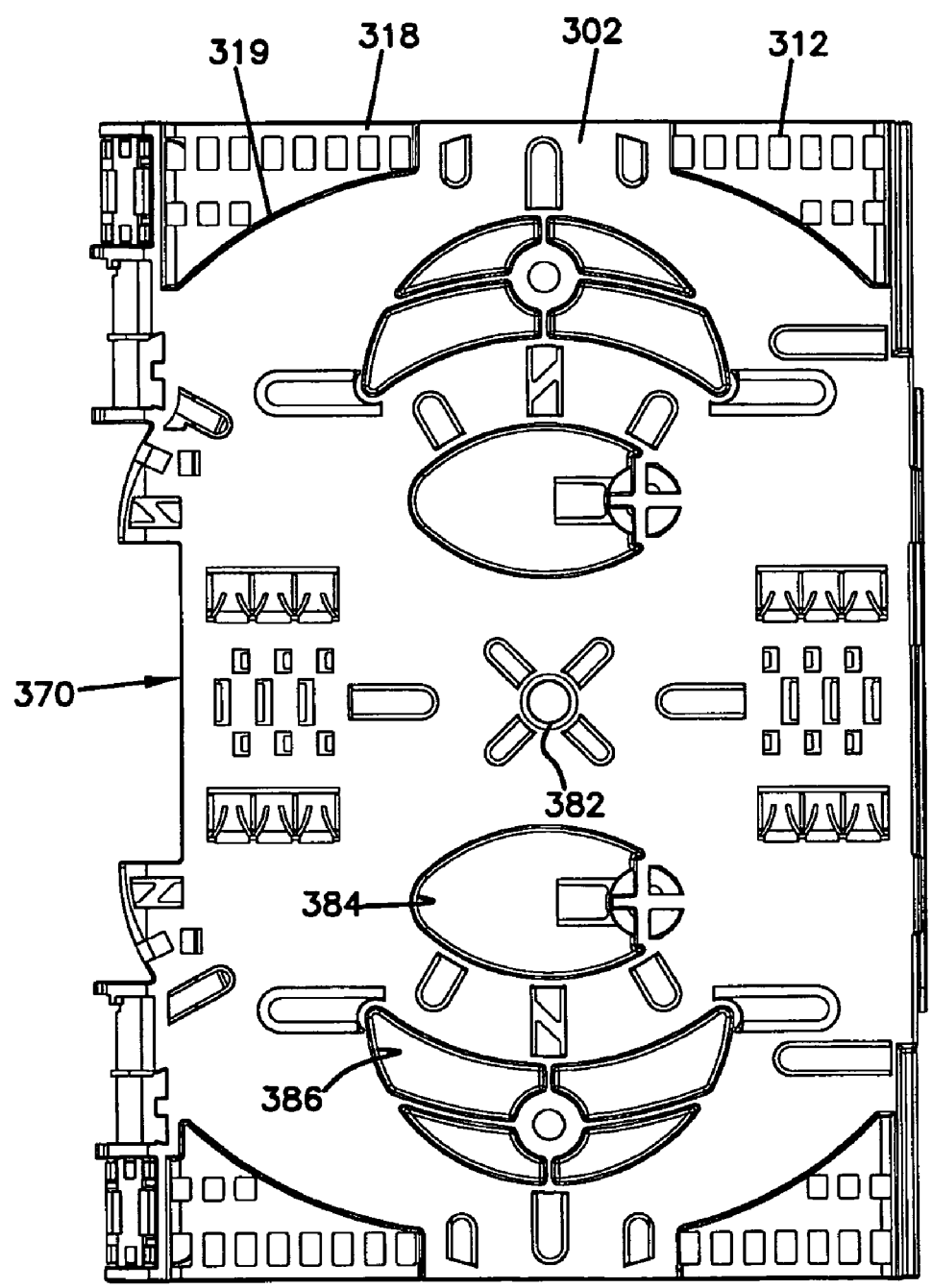
FIG. 40 is a bottom plan view of the splice tray of FIG. 34 in accordance with the principles of the present disclosure.

As shown in FIG. 39, the tops of the channels 331-333 of the component holding regions 330, 335 are approximately flush with the tops of the first and second side walls 314, 307. End walls 309 and the cable spools 322, 324, 326 of the cable management region 320 typically do not protrude upwardly from the base panel 302 as far as the side walls 314, 307. In some embodiments, end walls 309 extend only partially between the sides 303, 304 of the splice tray body 301. Each end wall 309 defines a notch 313 configured to facilitate routing one or more fibers around the cable management spools.

Referring to FIGS. 41-45, the splice tray 300 can include a cover 350 pivotally mounted to the body 301 of the splice tray 300 to provide and inhibit access to interior regions of the splice tray 300. In one embodiment, the splice tray 300 includes at least a first hinge pin 344 coupled to the first side 303 (see FIGS. 35 and 36) of the tray body 301. In the example shown, the splice tray 300 includes an outer pair of hinge pins 344 arranged at either end of the first side 303 (see FIG. 36). The cover 350 includes one or more mounting receptacles 352 that pivotally couple the cover 350 to the outer hinge pins 344.

Figure 41:
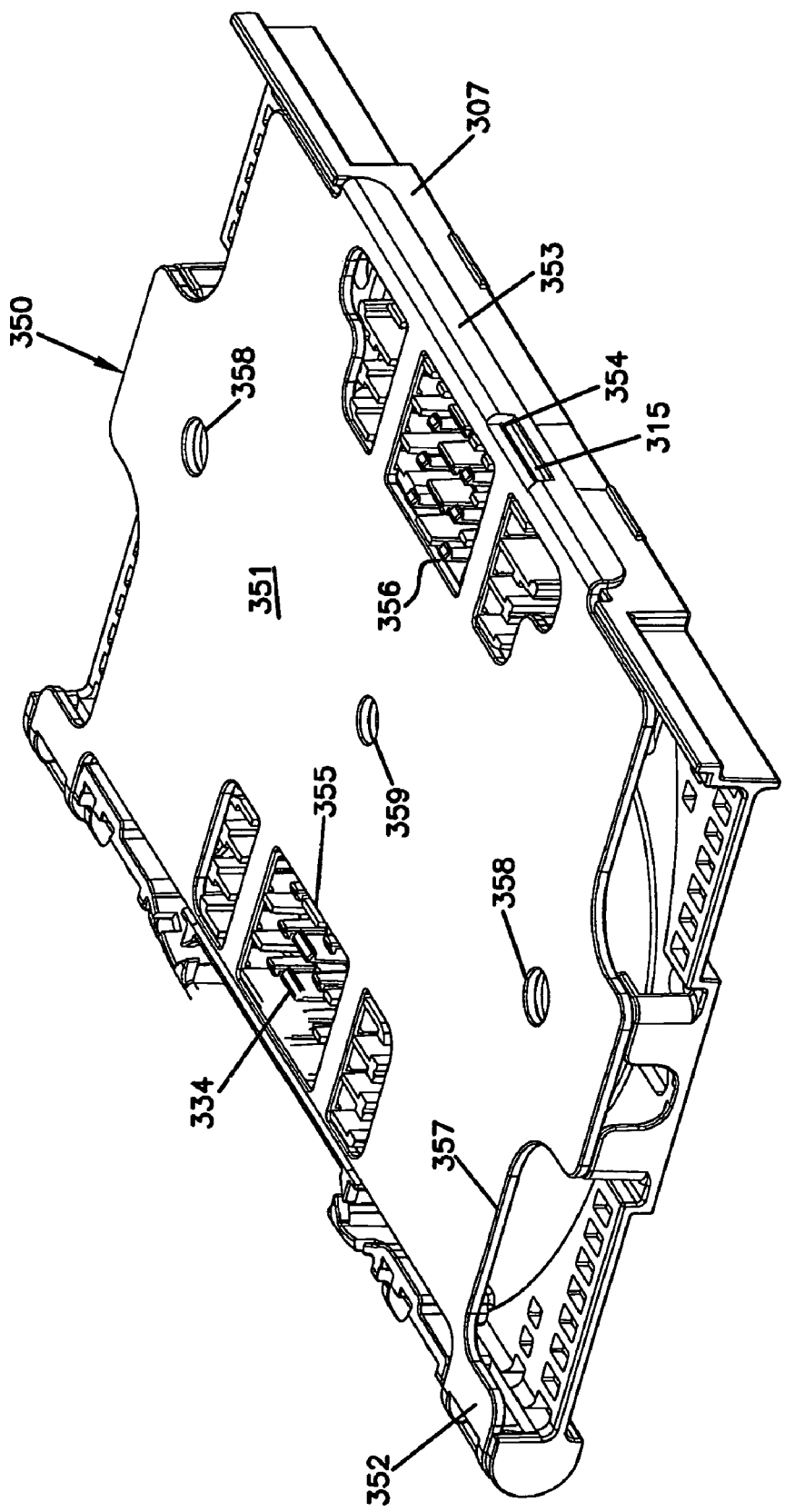
FIG. 41 is a top, front perspective view of a cover pivotally mounted to the splice tray of FIG. 34 and arranged in a closed position in accordance with the principles of the present disclosure.
Figure 44:
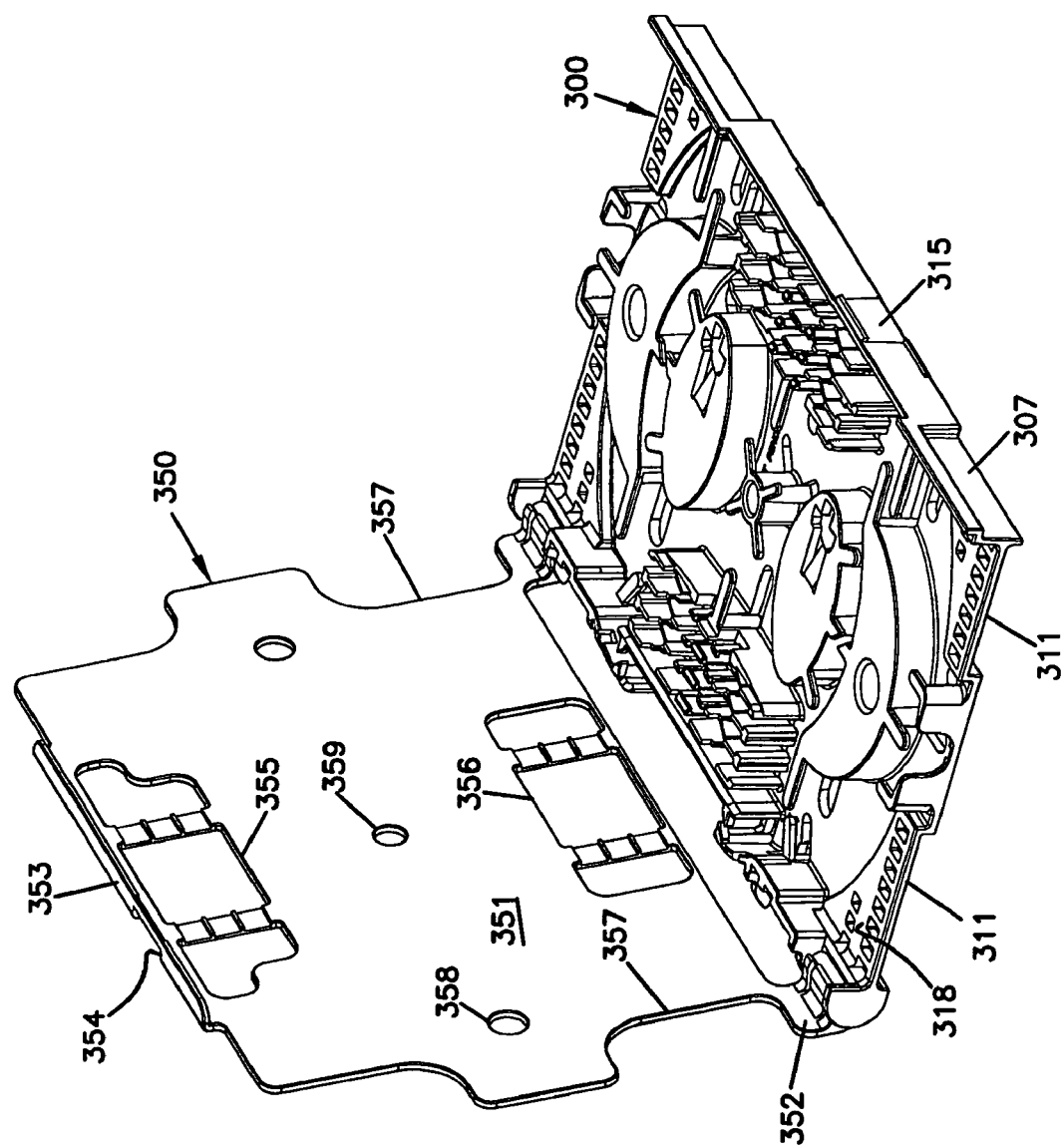
FIG. 44 is a top, front perspective view of the cover pivotally mounted to the splice tray of FIG. 34 and arranged in an open position in accordance with the principles of the present disclosure.
Figure 45:
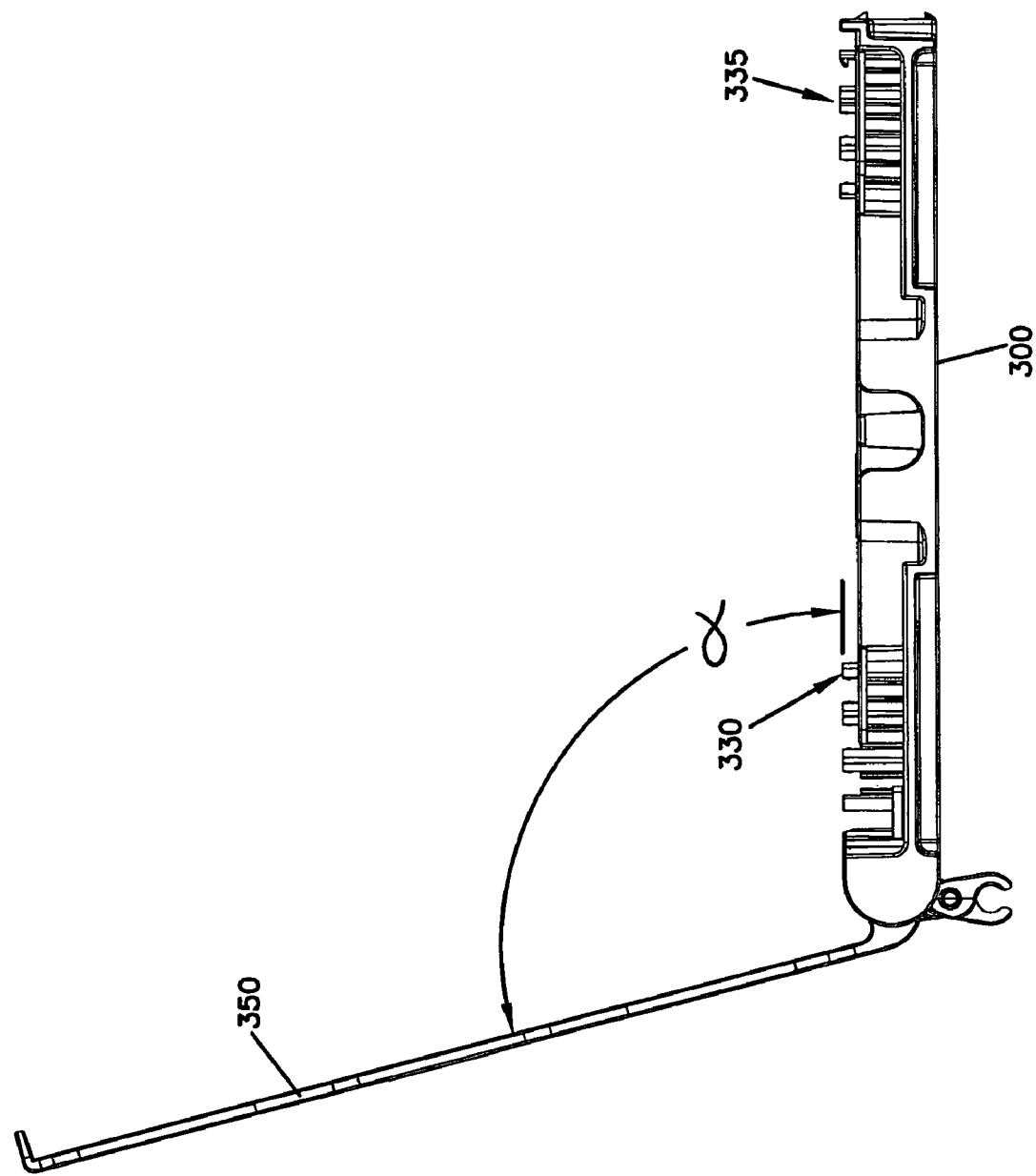
FIG. 45 is a side elevational view of a splice tray arrangement including a first splice tray pivotally coupled to a second splice tray and arranged in an open position providing access to the second (bottom) splice tray in accordance with the principles of the present disclosure.
Figure 46:
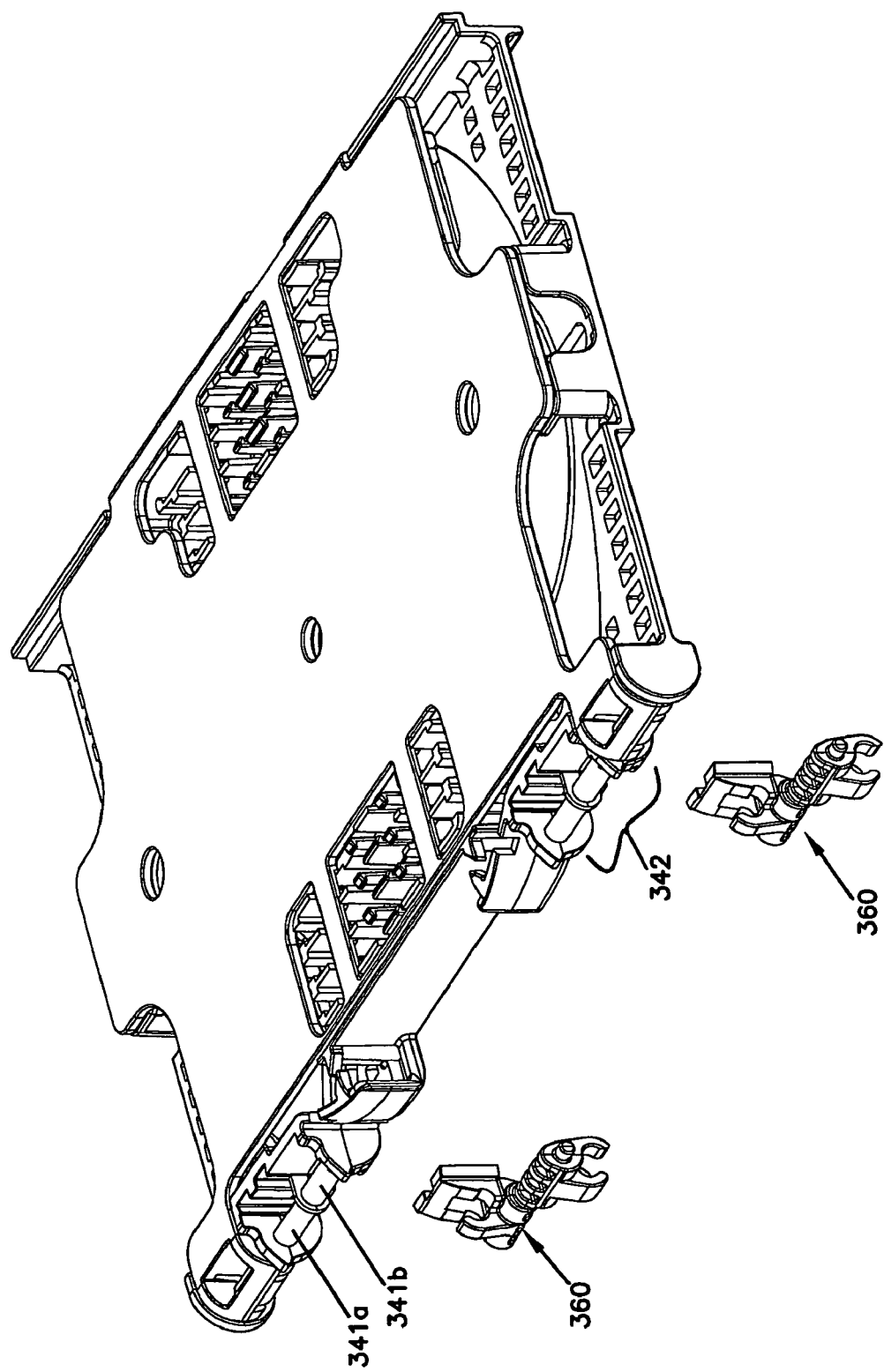
FIG. 46 is a top, rear perspective view of the splice tray of FIG. 34 with pivot linkages separated from, but aligned with, hinge pin arrangements of the splice tray in accordance with the principles of the present disclosure.
Figure 47:
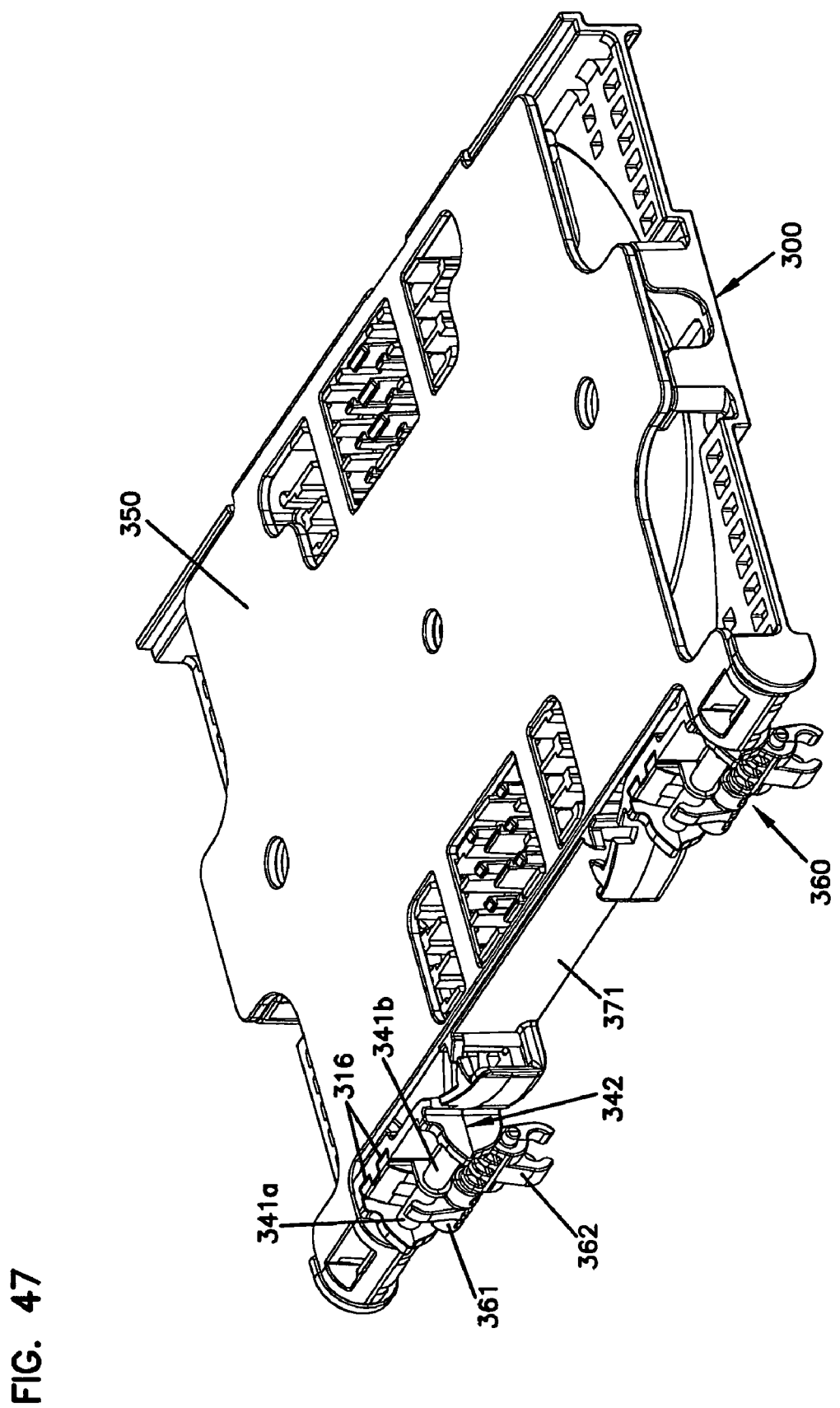
FIG. 47 is a top, rear perspective view of the splice tray of FIG. 46 with the pivot linkages mounted to the hinge pin arrangements of the splice tray in accordance with the principles of the present disclosure.
Figure 48:
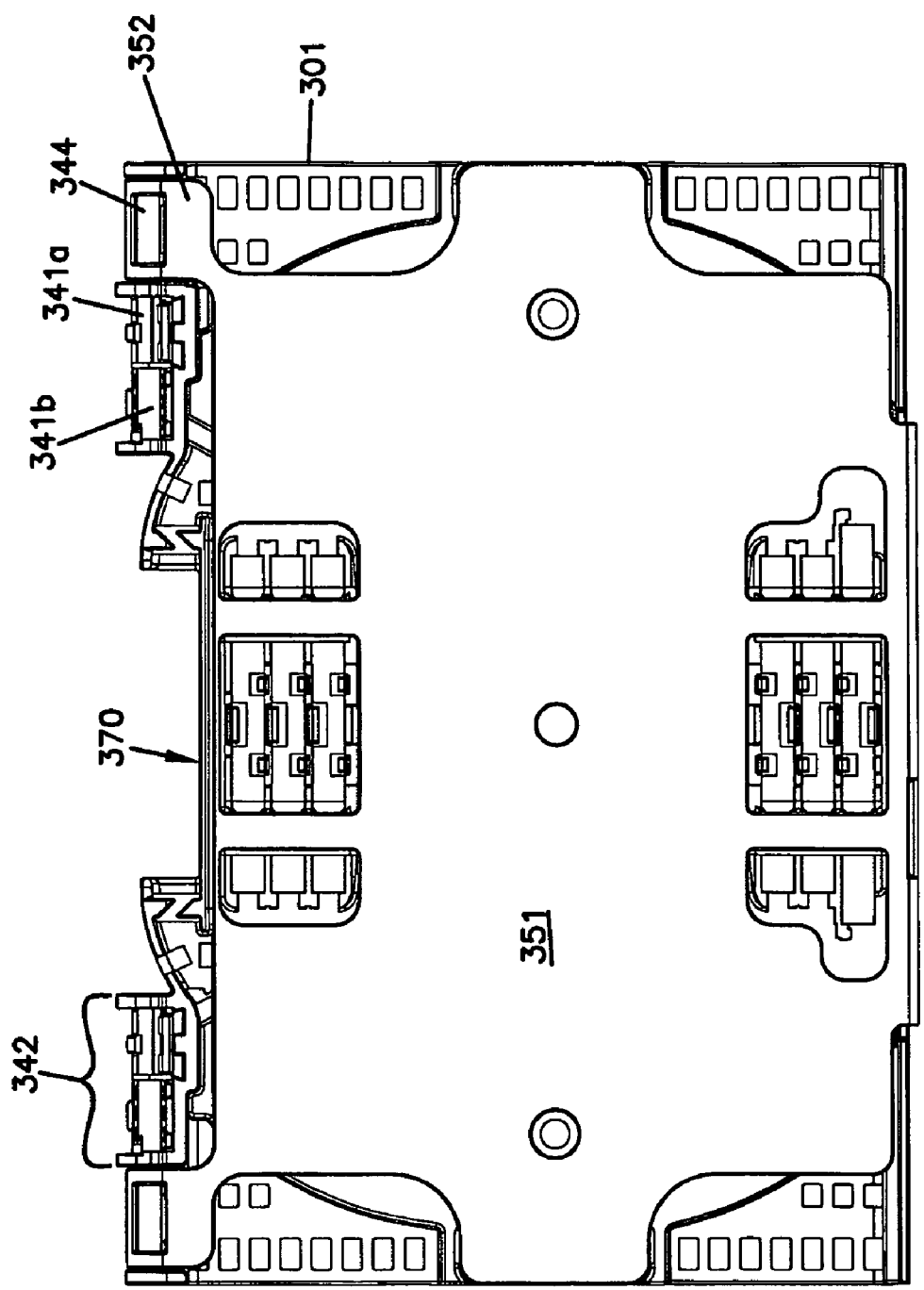
FIG. 48 is a top plan view of the splice tray of FIG. 47 in accordance with the principles of the present disclosure.
Figure 49:
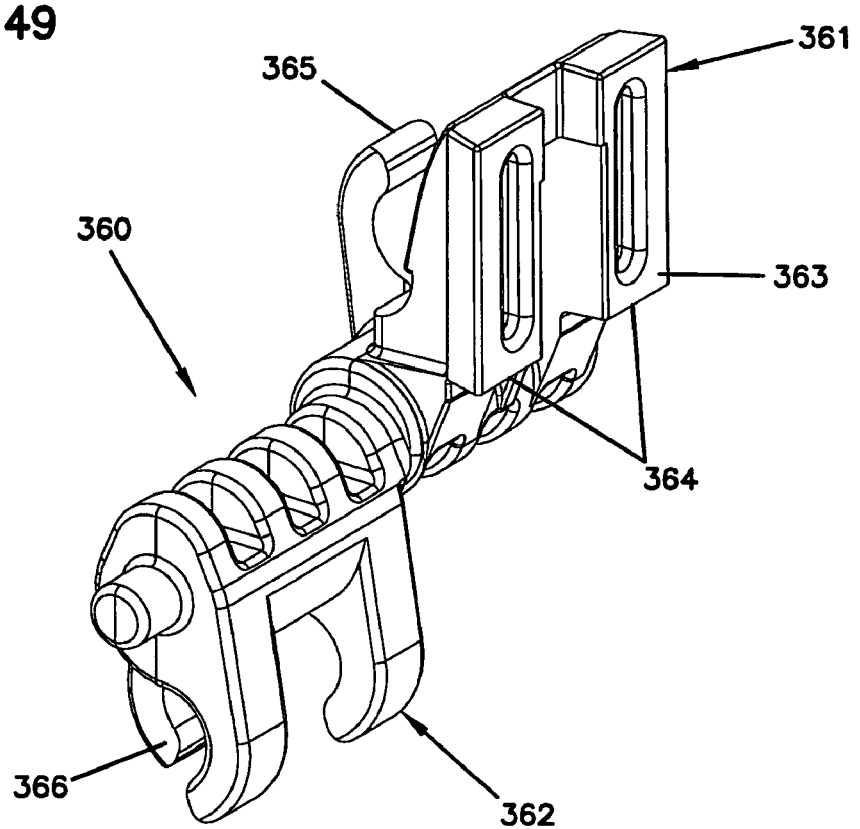
FIG. 49 is a rear isometric view of a pivot linkage having features that are examples of inventive aspects of the principles of the present disclosure.
Figure 50:
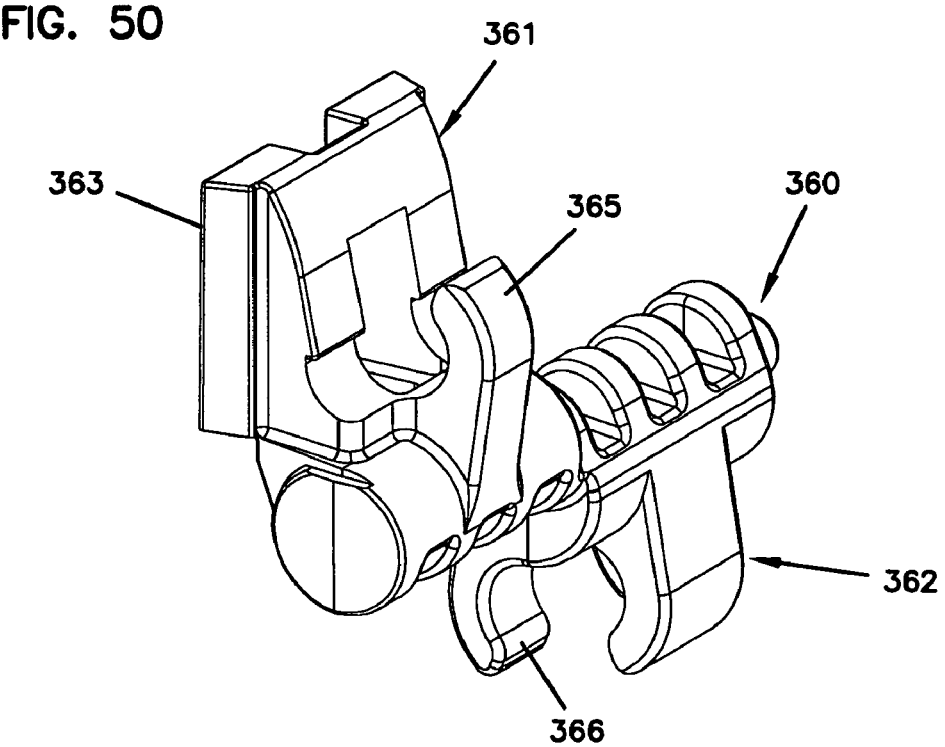
FIG. 50 is a front isometric view of the pivot linkage of FIG. 49 in accordance with the principles of the present disclosure.

The cover is configured to pivot between a closed position and an open position. FIG. 41 is a front, isometric view of the splice tray 300 in which the cover 350 is arranged in a closed position to inhibit access to the interior of the splice tray 300 and to protect components held in the interior. FIG. 44 is a front, isometric view of the splice tray 300 in which the cover 350 is arranged in an open position to facilitate access to the interior of the splice tray 300. As shown in FIG. 45, the cover 350 can be arranged at a predetermined angle $\alpha$ relative to the top of the retaining structures 332 of the splice region 330. In some embodiments, the predetermined angle $\alpha$ can range from about 70° to about 180°. In one embodiment, the predetermined angle α can range from about 90° to about 120°. In the example shown in FIG. 45, the predetermined angle α is about 105°.

Figure 42:
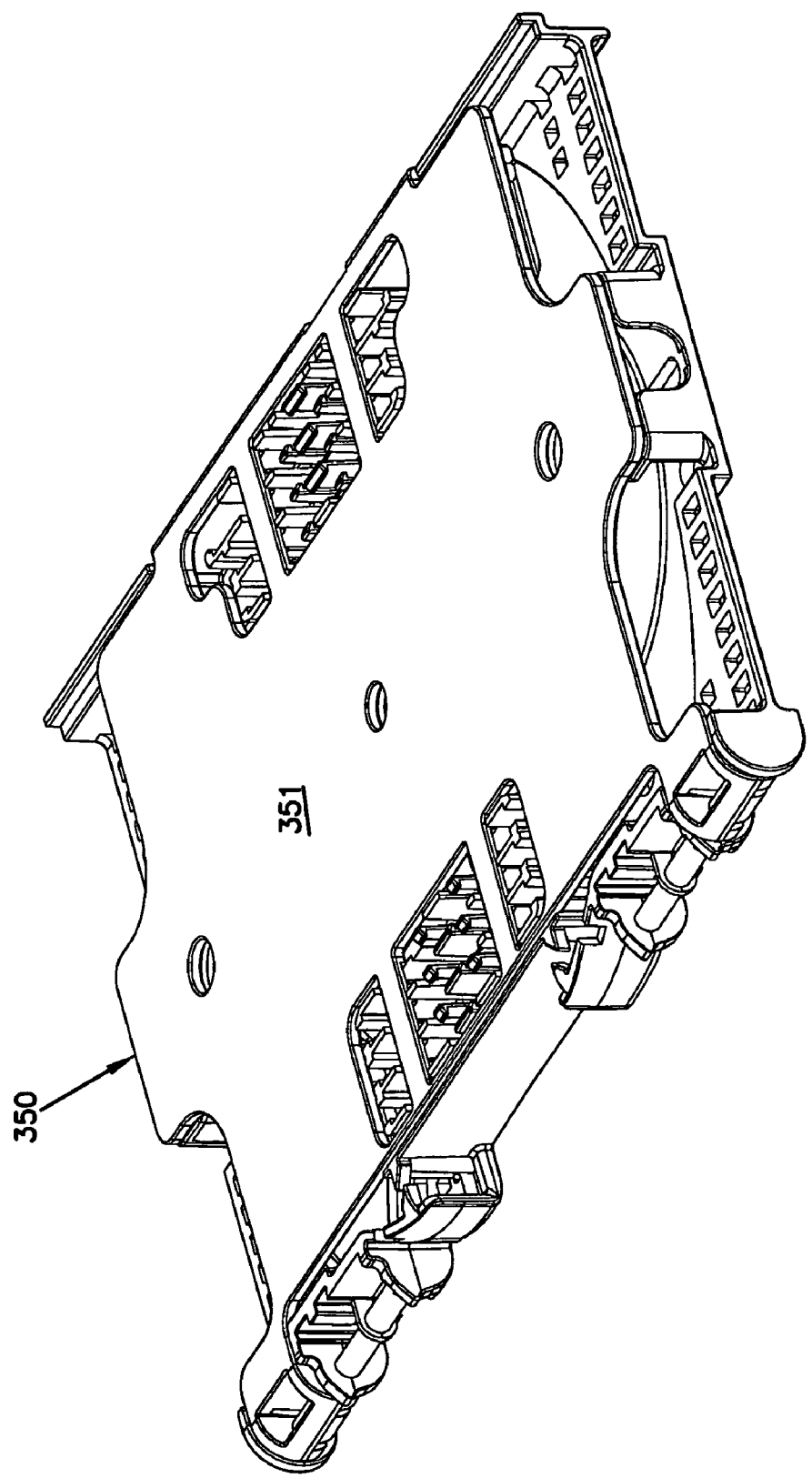
FIG. 42 is a top, rear perspective view of the cover pivotally mounted to the splice tray of FIG. 34 and arranged in a closed position in accordance with the principles of the present disclosure.
Figure 43:
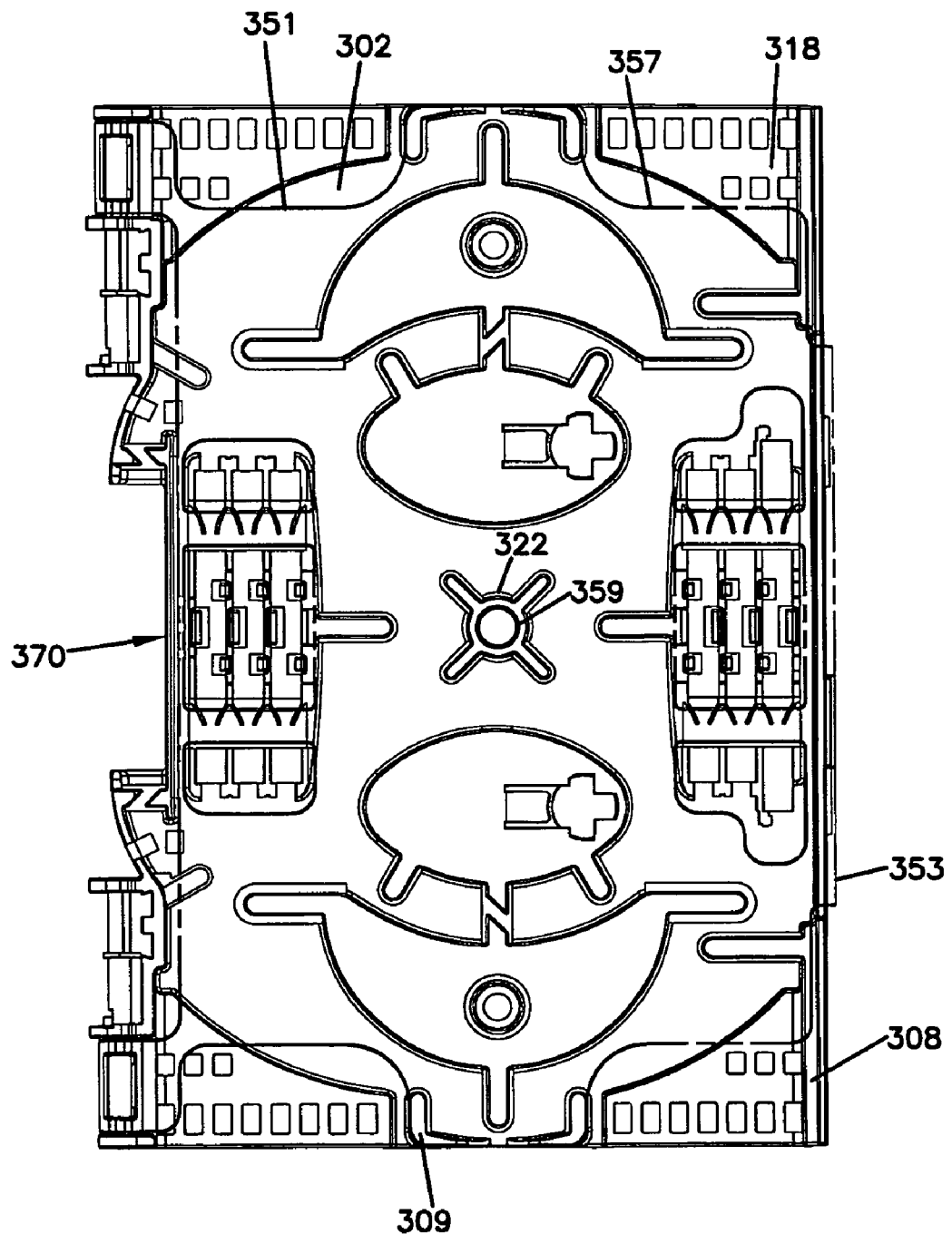
FIG. 43 is a top, planar view of the splice tray over which an outline of the cover is shown to illustrate the relationship between the cover and the splice tray in accordance with the principles of the present disclosure.

The cover 350 includes a body 351 that extends over a substantial portion of the splice tray 300 when arranged in the closed position. The cover 350 also defines a cut-out arrangement 355 to accommodate the optical component holding region 330 when the cover 350 is closed. In certain embodiments, the cut-out arrangement includes multiple openings defined in the body 351 of the cover 350. In the example shown, the cut-out arrangement 355 includes three openings defined in the body 351 to accommodate latches 334 of the optical component holding region 330. In embodiments in which the splice tray 300 includes a second optical component holding region 335, the cover 350 also can define a second cut-out portion 356 as shown in FIGS. 41 and 42 to accommodate the a second optical component holding region 335 when the cover 350 is closed.

When closed, the cover 350 seats on the end walls 309 and on a shoulder 308 (see FIGS. 35, 41, 42, and 58) defined in the second side wall 307 of the splice tray 300. In one embodiment, the cover 350 also can seat on one or more of the fiber management structures arranged in the fiber management region 320. Accordingly, the outer surface of the cover 350 is generally flush with the tops of the side walls 307, 314 of the splice tray 300 when closed (see FIG. 58). The cover 350 also includes a lip 353 that extends transversely from an edge of the cover body 351 to wrap around an upper edge of the second side wall 307. The second side wall 307 includes at least one flexible latch 315 that is configured to engage an opening 354 defined in the lip 353 to secure the cover 350 in the closed position. In other embodiments, the second side wall 307 can include additional latches to secure the cover 350 in a closed position.

The cover 350 also can define a cut-out portion 357 at the fiber input/output region 310. For example, in one embodiment, the cut-out portion 357 can align with one or more of the openings 312 defined in the stepped-up section 318 of the tray 300. The cut-out portion 357 can provide clearance to accommodate a head of a cable tie or other securement arrangement positioned at the fiber input/output region 310, thereby allowing the cover 350 to seat flush with the side walls 314, 307 of the splice tray 300. In one embodiment, the cover 350 can define a cut-out portion 357 at each of multiple fiber input/output regions 310. In the example shown in FIGS. 41-43, the cover 350 includes four cut-out portions 357 positioned over the four input/output regions 310 arranged generally at the corners of the splice tray 300.

In another embodiment, the cover 350 can define one or more openings 359 each aligned with a channel defined in the splice tray 300 to enable fastening of the splice tray 300 to a wall or other surface. For example, the cover 350 of FIG. 43 includes a central opening 359 aligned with the channel 382 extending through the central fiber spool 322, and two outer openings 358 aligned with the channels 386 extending through the outer fiber spools 326. A screw or other fastener can be inserted through the cover openings 358, 359 and through the respective channels 386, 382 to secure the splice tray 300 to a surface.

Referring to FIGS. 46-65, the splice tray 300 can be coupled to one or more additional splice trays to form a splice tray arrangement 400. In some embodiments, the splice trays 300 of the splice tray arrangement 400 are coupled together in a stacked arrangement (e.g., see FIG. 46). In one embodiment, the splice trays 300 are coupled together in a pivoting stacked arrangement that facilitates access to individual splice trays 300 within the stack. In other embodiments, the splice trays 300 are coupled together in any suitable arrangement that enables a user to access a selected splice tray 300. In one embodiment, the splice tray 300 includes a tab 317 (FIG. 34) for securing the bottom-most tray 300 of the stack to a corresponding latch on a mounting surface to inhibit movement of the bottom-most tray.

Figure 55:
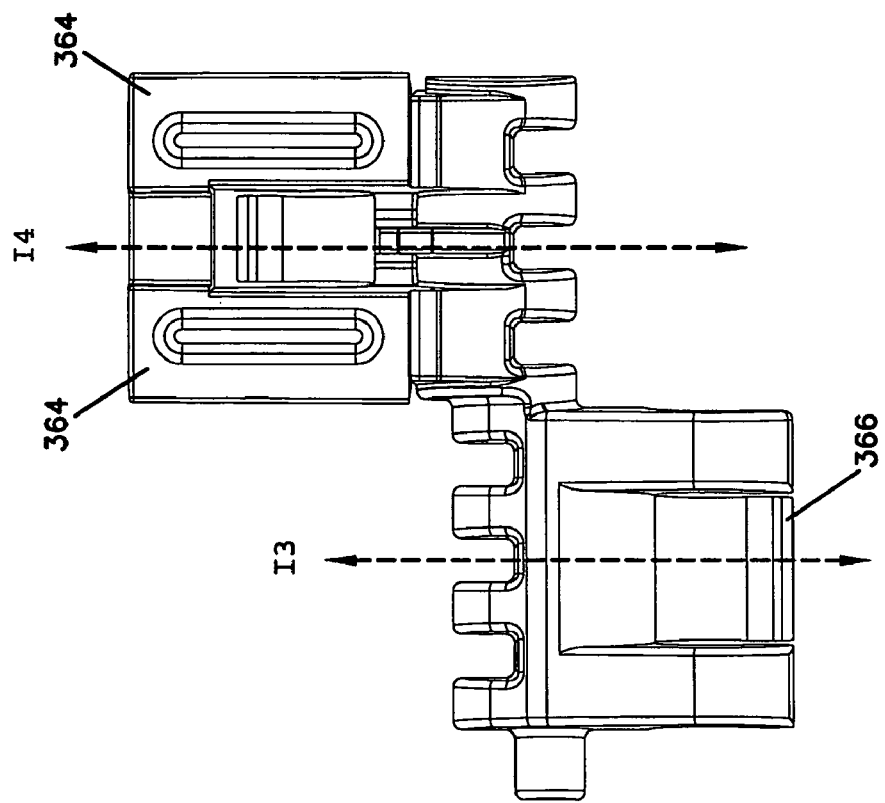
FIG. 55 is a rear view of the pivot linkage of FIG. 49 in accordance with the principles of the present disclosure.
Figure 54:
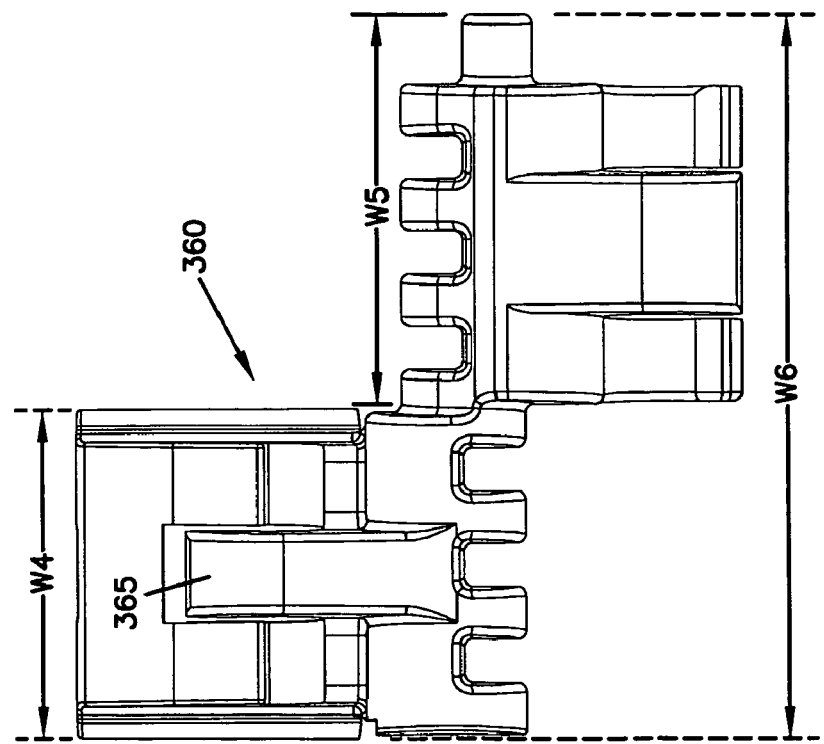
FIG. 54 is a front view of the pivot linkage of FIG. 49 in accordance with the principles of the present disclosure.

A first splice tray 300 can be coupled to a second splice tray 300' by one or more pivot linkages 360 (see FIG. 55). In general, each of the splice trays 300 includes one or more inner hinge pin arrangements 342 to which the pivot linkages 360 can mount. In the example shown, two hinge pin arrangements 342 are arranged on opposite ends of the side entrance 370. In certain embodiments, each inner hinge pin arrangement 342 can include one or more hinge pins 341. In the example shown in FIGS. 46-48, each inner hinge pin arrangement 342 includes a first hinge pin 341a and a second hinge pin 341b.

With reference to FIGS. 49-55, each of the pivot linkages 360 includes a first coupling section 361 and a second coupling section 362. The first coupling section 361 extends in a different direction from the second coupling section 362. In the example shown, the first coupling section 361 extends in an opposite direction from the second coupling section 362 (e.g., see FIG. 51). In one embodiment, the first coupling section 361 is fixed relative to the second coupling section 362. For example, the first coupling section 361 can be formed integrally or monolithically with the second coupling section 362.

Figure 56:
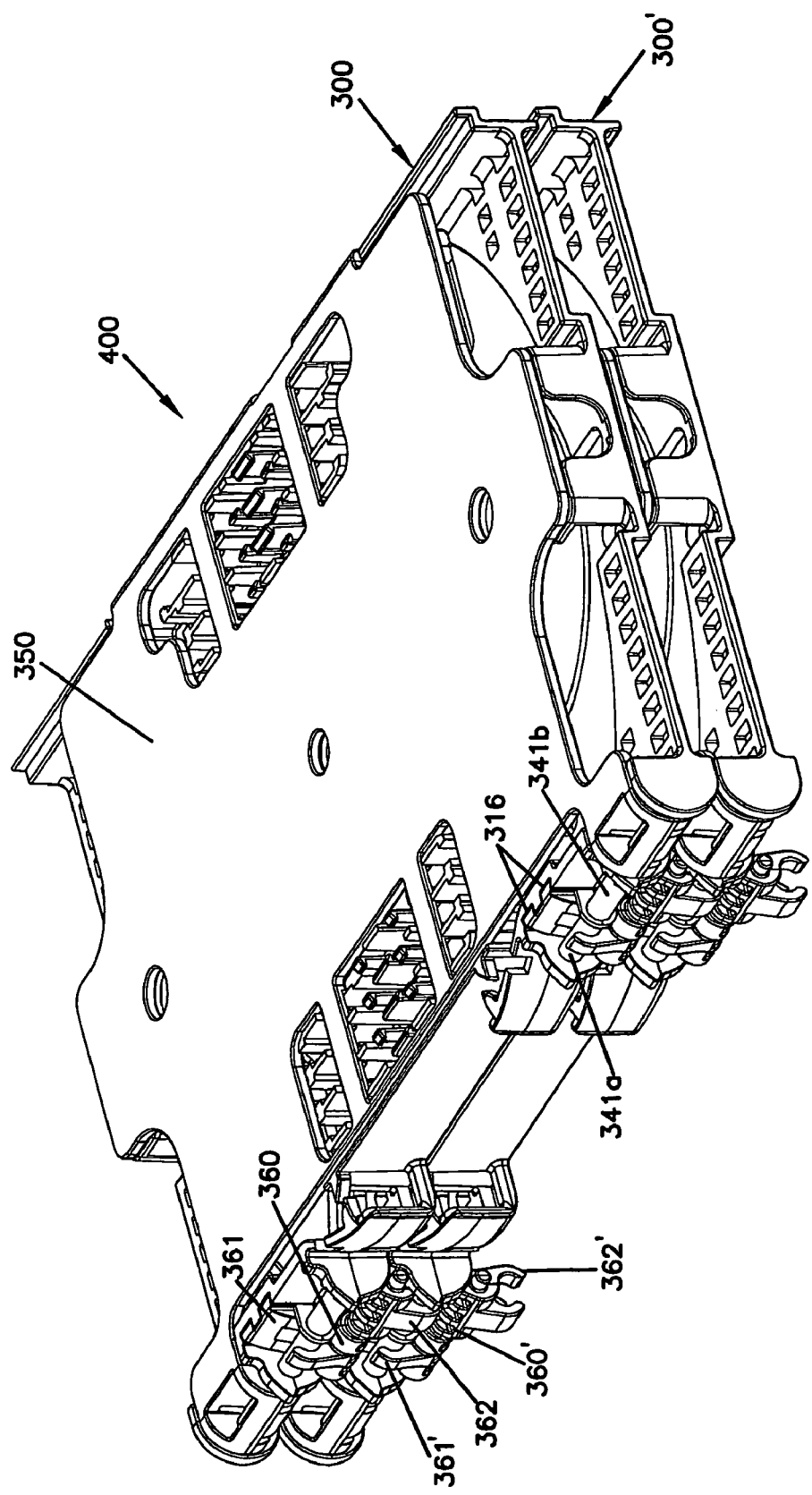
FIG. 56 is a top, rear perspective view of a splice tray arrangement including a first splice tray pivotally coupled to a second splice tray via two pivot linkages and arranged in a closed position in accordance with the principles of the present disclosure.
Figure 57:
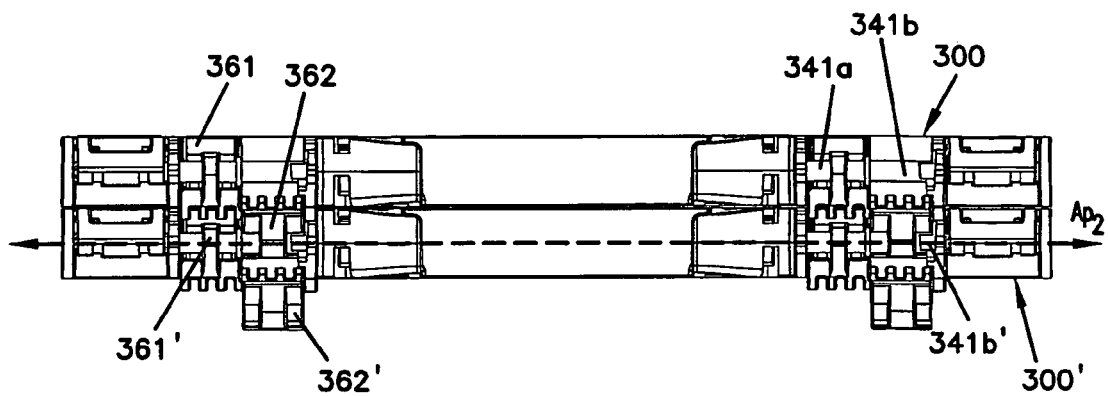
FIG. 57 is a rear view of the splice tray arrangement of FIG. 56 in accordance with the principles of the present disclosure.
Figure 58:
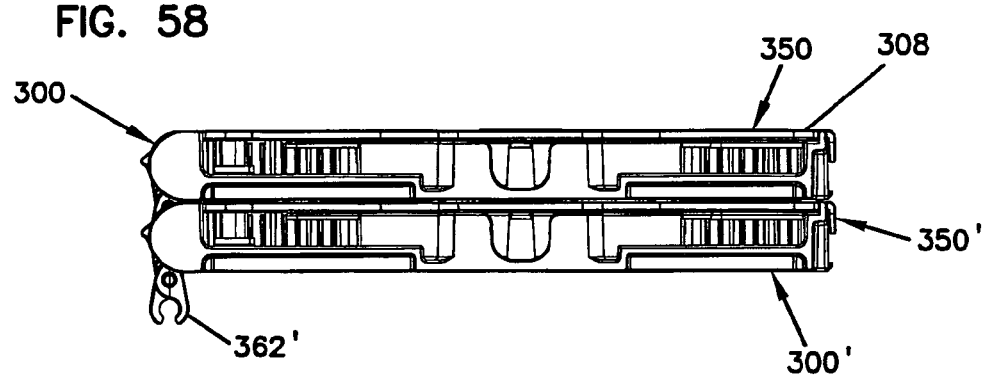
FIG. 58 is a first end view of the splice tray arrangement of FIG. 56 in accordance with the principles of the present disclosure.
Figure 59:
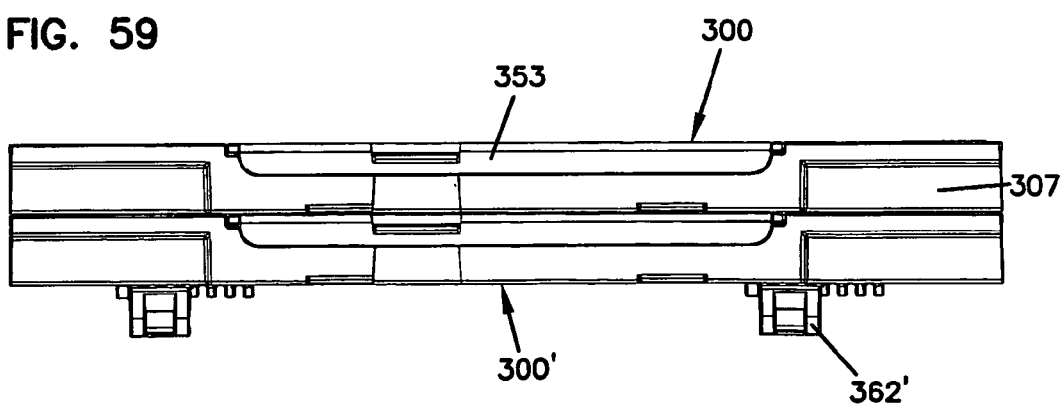
FIG. 59 is a front view of the splice tray arrangement of FIG. 56 in accordance with the principles of the present disclosure.
Figure 60:
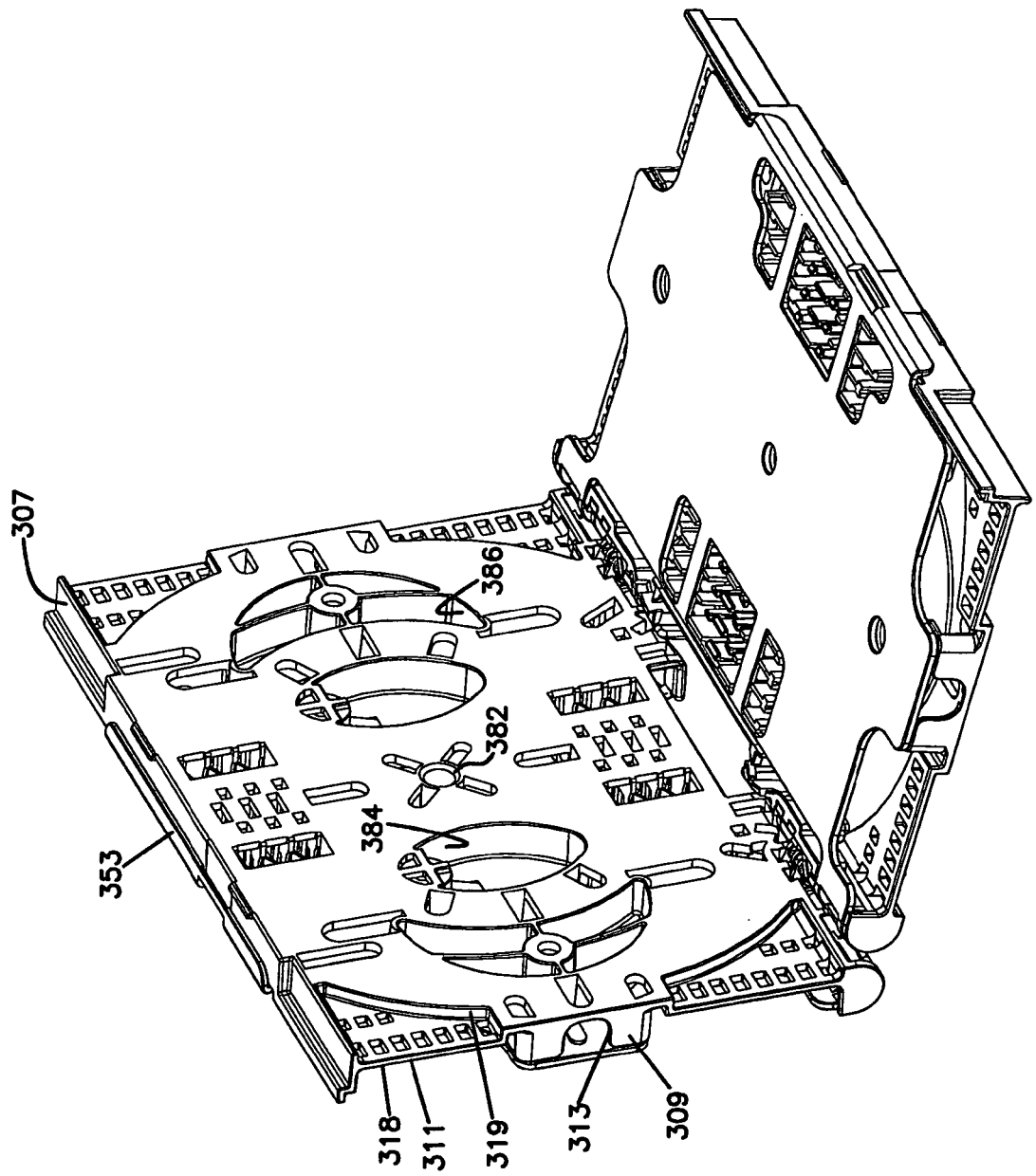
FIG. 60 is a top, front perspective view of the splice tray arrangement of FIG. 56 arranged in an open position that provides access to the bottom splice tray in accordance with the principles of the present disclosure.
Figure 61:
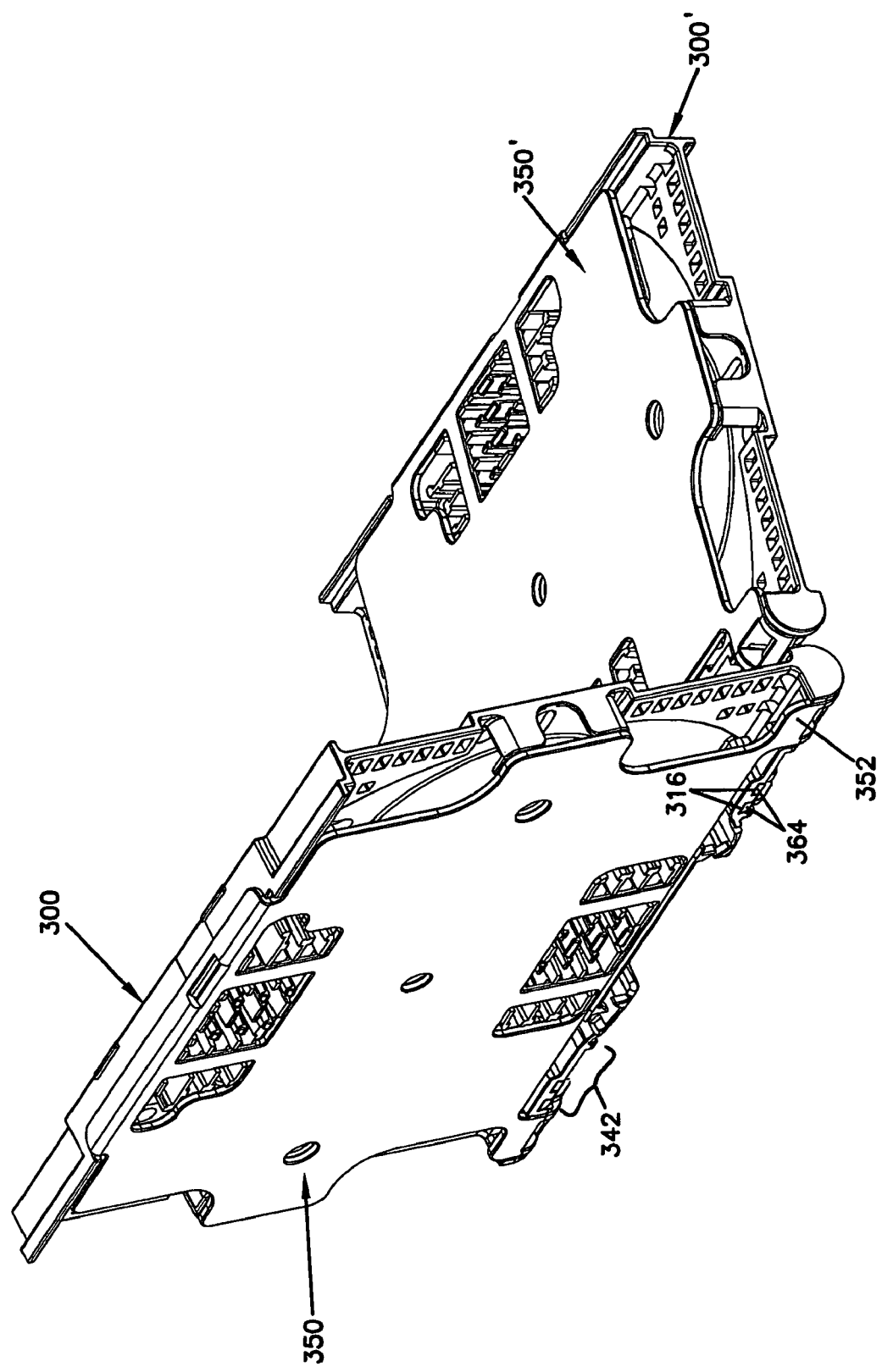
FIG. 61 is a top, rear perspective view of the splice tray arrangement of FIG. 60 in accordance with the principles of the present disclosure.

The first coupling section 361 is configured to couple to one of the inner hinge pin arrangements 342 of the first splice tray 300 and the second coupling section 362 is configured to couple to a corresponding inner hinge pin arrangement 342' of the second splice tray 300' (see FIG. 56). In the example shown, the first coupling section 361 of each pivot linkage 360 couples to the first hinge pin 341a of the respective hinge pin arrangement 342 of the first tray 300. The second coupling section 362 of each pivot linkage 360 couples to the second hinge pin 341b' of each respective hinge pin arrangement 342' of the second tray 300'.

The first coupling section 361 has a first insertion axis $I_3$ and the second coupling section 362 has a second insertion axis $I_4$ (see FIG. 55). In the example shown, the first insertion axis $I_3$ is parallel to, but offset from, the second insertion axis $I_4$. In other embodiments, however, the insertion axes $I_3$, $I_4$ of the first and second coupling sections 361, 362 align. In one embodiment, the first and second coupling sections 361, 362 include snap-fit receptacles (see FIGS. 49-51) that mount over the inner hinge pins of the hinge pin arrangements. In other embodiments, however, the first and second coupling sections 361, 362 can include any suitable structure for attaching the coupling sections 361, 362 to the hinge pins.

In some embodiments, the first coupling section 361 includes a securement structure 363 that enables the first coupling section 361 to couple to the first splice tray 300 at a fixed orientation (see FIG. 56). Accordingly, the first coupling section 361 of the pivot linkage 360 does not pivot about the hinge pin 341 of the first splice tray 300. In one embodiment, the securement structure 363 defines one or more protrusions 364 (FIGS. 49, 52, and 53) that can be inserted into channels 316 (see FIGS. 36 and 56) defined in the hinge pin arrangements 342. Dovetailing of the one or more protrusions 364 and the channels 316 inhibits sliding and tilting movements of the pivot linkage 360 with respect to the hinge pin 342 of the first splice tray 300.

The first and second splice trays 300, 300' pivot relative to each other along a pivot axis $Ap_2$ (FIG. 57) extending longitudinally along the hinge axes of the hinge pins 341' of the second splice tray 300'. Because of the securement structure 363 of the pivot linkage 360, the first splice tray 300 is non-pivotally coupled to the first coupling section 361, which is fixedly coupled to the second coupling section 362, which is pivotally coupled to the second splice tray 300'. Accordingly, when the first splice tray 300 is pivoted to an open position relative to the second splice tray 300', as shown at FIGS. 60-63, this pivotal movement is implemented by pivoting the second coupling section 362 of the pivot linkages 360 about the inner hinge pins 341b' (FIG. 57) of the second splice tray 300'.

Figure 62:
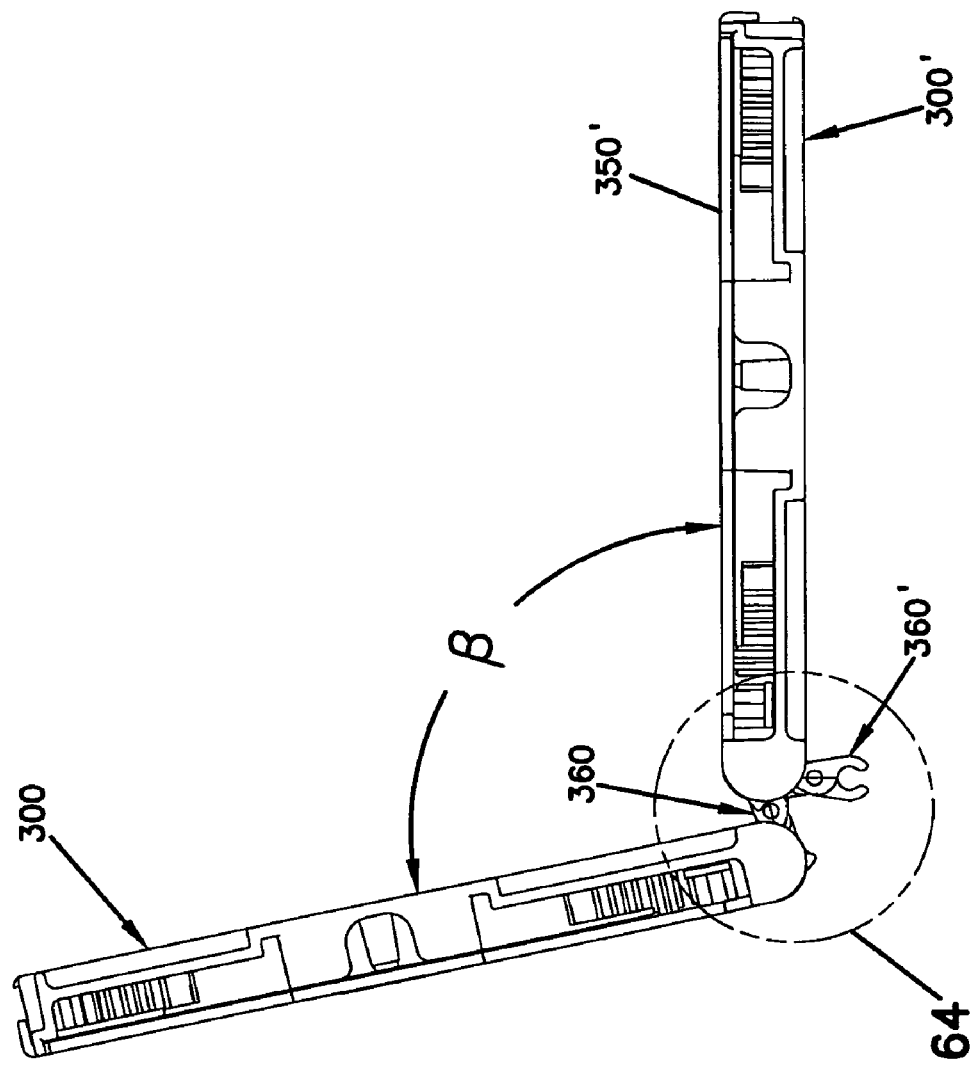
FIG. 62 is a side elevational view of the splice tray arrangement of FIG. 61 in accordance with the principles of the present disclosure.
Figure 63:
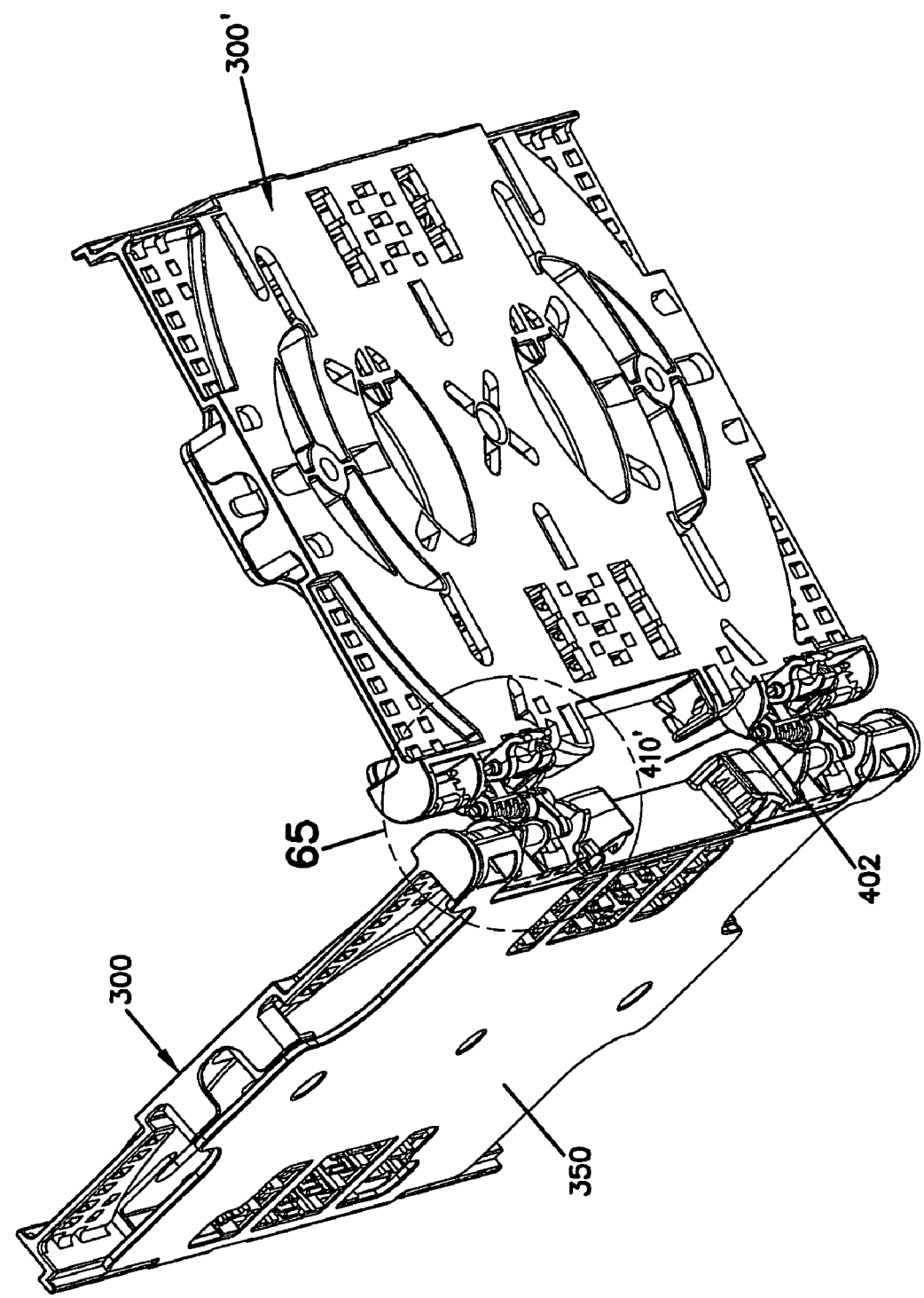
FIG. 63 is a bottom, rear perspective view of the splice tray arrangement of FIG. 61 in accordance with the principles of the present disclosure.

As shown in FIG. 62, the first splice tray 300 can be arranged (e.g., pivoted) relative to the cover 350' of the second splice tray 300' at a predetermined angle β. In some embodiments, the predetermined angle β between the cover 350' and the first splice tray 300 can range from about 70° to about 180°. In one embodiment, the predetermined angle β between the cover 350' and the first splice tray 300 can range from about 90° to about 120°. In the example shown in FIG. 62, the predetermined angle β is about 102°. The splice trays in a splice tray arrangement 400 can be releasably secured to each another using any of the coupling arrangements discussed above with respect to splice trays 100.

Figure 65:
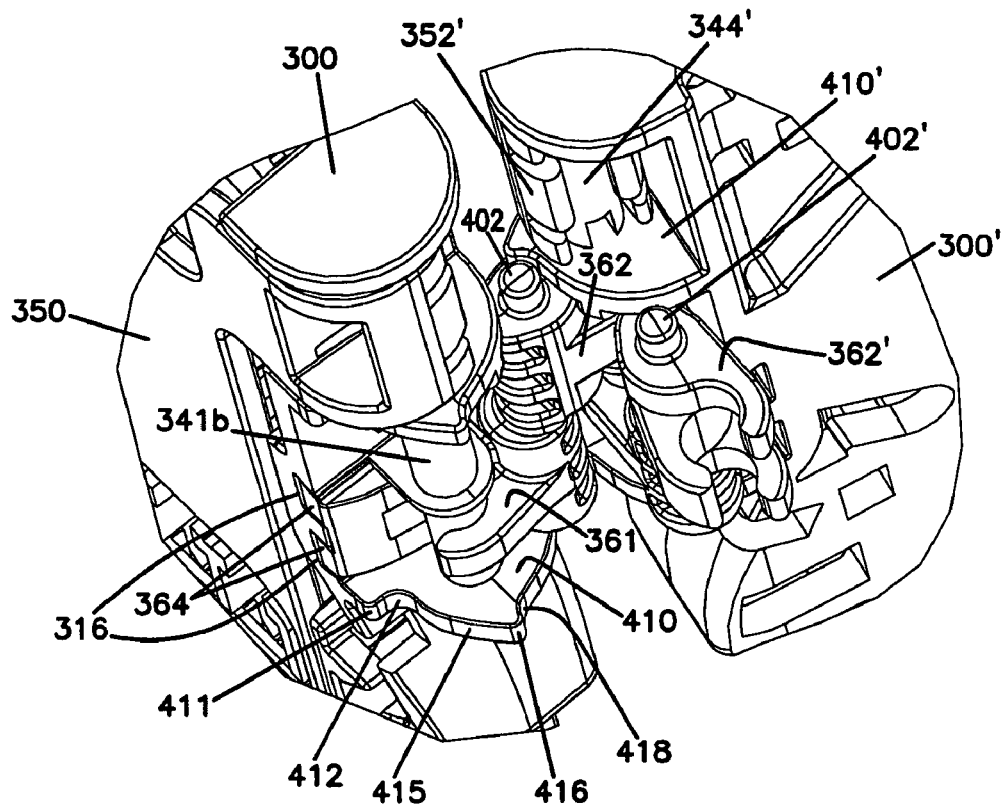
FIG. 65 is a detailed view of the section indicated by circle 65 in FIG. 63 in accordance with the principles of the present disclosure.
Figure 64:
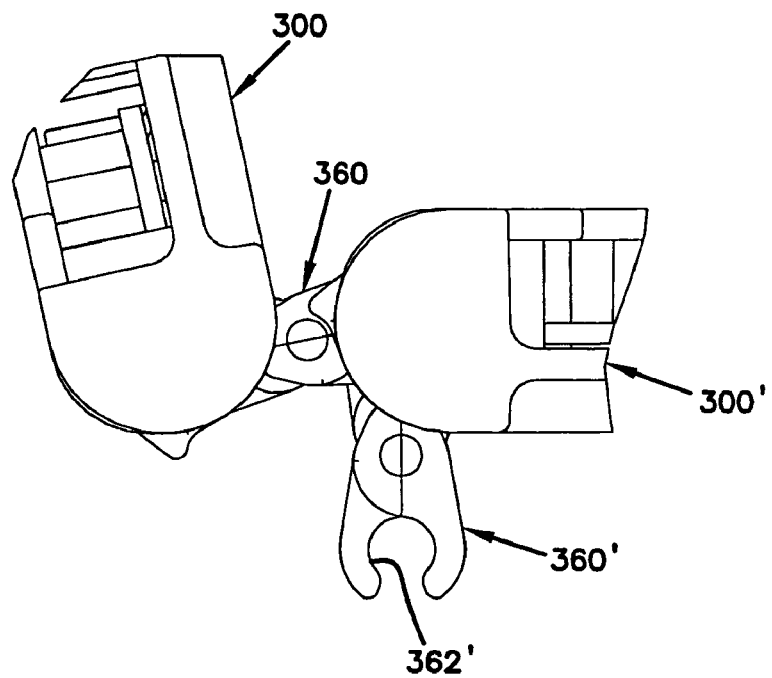
FIG. 64 is a detailed view of the section indicated by circle 64 in FIG. 62 in accordance with the principles of the present disclosure.

In certain embodiments, the hinge pin arrangement 342, 342' of each splice tray 300, 300' defines a camming arrangement 410, 410', respectively. In such embodiments, each pivot linkage 360, 360' defines a nub 402, 402' that can slide along the camming arrangements 410, 410' as one splice tray is pivoted relative to the other. The camming arrangements 410, 410' of the first and second splice trays 300, 300' are best seen in FIG. 65. In the example shown, the nub 402 of the first pivot linkage 360 slides along the camming arrangement 410' of the second splice tray 300'. The nub 402' of the second pivot linkage 360' is configured to slide on a camming arrangement of a third splice tray (not shown) when the third splice tray is mounted to the second splice tray 300'.

The camming arrangement 410' of the second splice tray 300' is the same as the camming arrangement 410 of the first splice tray 300. For the sake of clarity, features of only camming arrangement 410 are called out in FIG. 65. The same features also can be found on camming arrangement 410'. The camming arrangement 410 defines a first shoulder 411 and a second shoulder 416 spaced from the first shoulder 411. The camming arrangement 410 also defines a first position detent 412 at the first shoulder 411 and a second position detent 418 at the second shoulder 416. A curved surface 415 extends between the first detent 412 and the second shoulder 416.

In general, the interaction between the nub 402 and the camming arrangement 410' selectively maintains the splice trays 300, 300' in the open and closed positions until sufficient force is applied to reposition the splice trays 300, 300'. In the example shown, the nub 402 of the first pivot linkage 360 seats in the first detent of the camming arrangement 410' and abuts against the first shoulder when the first and second splice trays 300, 300' are arranged in the closed position. The nub 402 seats in the second detect of the camming arrangement 410' and abuts against the second shoulder when the first and second splice trays 300, 300' are arranged in the open position. The nub 402 of the pivot linkage 360' cams over the curved surface of the camming arrangement 410' between the detents when sufficient force is applied to release the nub 402 from one of the detents and to snap the nub 402 over the second shoulder of the camming arrangement 410' and into the other detent.

Each hinge pin arrangement 342 of a splice tray 300 can accommodate two pivot linkages 360. For example, the first hinge pin 341a of the hinge pin arrangement 342 can accommodate a first coupling section of one pivot linkage and a second hinge pin 341b of the arrangement 342 can accommodate a second coupling section of another pivot linkage. For example, in FIG. 56, the second coupling section 362 of the first pivot linkage 360 and the first coupling section 361' of the second pivot linkage 360' are mounted to the same inner hinge pin arrangement 342' of the second splice tray 300'. Accordingly, each splice tray can be connected to two splice trays (e.g., one above and one below). For example, the second coupling section 362' of the second pivot linkage 360' in FIG. 56 is configured to mount to an inner hinge pin of a third splice tray (not shown) to pivotally couple the third splice tray to the second splice tray 300'.

Any of the fiber-routing layouts discussed above with respect to splice tray 100 can be implemented with splice tray 300. For example, a pre-terminated fiber (e.g., from a trunk cable, from another splice tray, from a splitter tray, from a cable management tray, etc.) can enter the splice tray 300 through any of the fiber input/output regions 310 or through the side entrance 370. Excess length of the fiber can be routed around cable routing paths of the cable management region 320 to an optical component holding region 330. The incoming fiber can be spliced to an outgoing fiber (e.g., of a drop cable) at the optical component holding region 330. The outgoing fiber can be routed from the optical component holding region 330 around cable routing paths of the cable management region 320 to another of the fiber input/output regions 310 or side entrance 370.

The above specification provides examples of how certain aspects can be put into practice. It will be appreciated that the aspects can be practiced in other ways than those specifically shown and described herein without departing from the spirit and scope of the disclosure.

What is claimed is:

1. A splice tray arrangement comprising:
a first splice tray including a first hinge pin extending at least partially along a first side of the first splice tray;
a second splice tray including a second hinge pin; and
a pivot linkage including a first coupling section configured to couple to the first hinge pin and a second coupling section configured to couple to the second hinge pin, the second coupling section being laterally spaced from the first coupling section along the first side of the first splice tray, wherein the first splice tray is coupled to the pivot linkage at only the first coupling section and the second splice tray is coupled to the pivot linkage at only the second coupling section.

2. The splice tray arrangement of claim 1, wherein the first coupling section of the pivot linkage snap-fits to the first hinge pin and wherein the second coupling section of the pivot linkage snap-fits to the second hinge pin.

3. The splice tray arrangement of claim 1, wherein the first and second coupling sections of the pivot linkage are monolithically formed.

4. The splice tray arrangement of claim 1, wherein the first and second coupling sections face in opposite directions.

5. The splice tray arrangement of claim 1, wherein the first coupling section also includes a securement structure that enables the first coupling section to couple to the first splice tray at a fixed orientation.

6. The splice tray arrangement of claim 1, wherein the first coupling section has a first width and the second coupling section has a second width that is at least substantially equal to the first width.

7. The splice tray arrangement of claim 1, wherein the first splice tray includes a third hinge pin spaced along the first side of the first splice tray from the first hinge pin and the second splice tray includes a fourth hinge pin spaced from the second hinge pin.

8. The splice tray arrangement of claim 7, further comprising a second pivot linkage including a first coupling section and a second coupling section, the first coupling section of the second pivot linkage being configured to couple to the third hinge pin, the second coupling section of the second pivot linkage being configured to couple to the fourth hinge pin, and the second coupling section of the second pivot linkage being laterally spaced from the first coupling section along the first side of the first splice tray.

9. A pivot linkage for connecting two trays comprising:
a first coupling section configured to mount to a first splice tray, the first coupling section having a first insertion axis; and
a second coupling section coupled to the first coupling section, the second coupling section being configured to mount to a second splice tray, the second coupling section having a second insertion axis that is parallel to and offset from the first insertion axis, the second coupling section extending in a different direction from the first coupling section, wherein only one coupling section extends in each direction.

10. The pivot linkage of claim 9, wherein the second coupling section extends in an opposite direction from the first coupling section.

11. The pivot linkage of claim 9, wherein the first coupling section is fixed relative to the second coupling section.

12. The pivot linkage of claim 11, wherein the first and second coupling sections are monolithically formed.

13. The pivot linkage of claim 9, wherein each of the first and second coupling sections define a snap-fit receptacle.

14. A splice tray comprising:
a fiber input/output region configured to secure at least one fiber to the splice tray;
a fiber management region including at least one fiber spool configured to accommodate excess length of any fiber entering the splice tray at the fiber input/output region, the fiber spool defining a cavity;
a base panel extending between first and second end walls and between first and second side walls to define the splice tray, the base panel having a first side and an opposite second side that extend between the first and second end walls and the first and second side walls, the base panel including at least a first stepped-up portion protruding from the first side of the base panel at the fiber input/output region to define a recess in the second side of the base panel, the recess being configured to provide clearance to accommodate a securement arrangement for coupling at least a first optical fiber to the base panel, wherein the first stepped-up portion of the base panel defines at least one opening configured to facilitate coupling of the securement arrangement to the base panel, and wherein the fiber spool of the fiber management region extends upwardly from the base panel;
a fiber splice region at which the fiber can be optically coupled to a second fiber; and
a magnet arranged within the cavity defined in the fiber spool.

15. The splice tray of claim 14, further comprising a cover pivotally mounted to the first side wall of the splice tray, the cover being configured to pivot between an open position and a closed position.

16. The splice tray of claim 14, wherein the base panel defines an opening forming a side entrance to the splice tray.

17. A splice tray comprising:
a fiber input/output region configured to secure at least one fiber to the splice tray;
a fiber management region including at least one fiber spool configured to accommodate excess length of any fiber entering the splice tray at the fiber input/output region, the fiber spool defining a cavity;
a base panel extending between first and second end walls and between first and second side walls to define the splice tray, the base panel having a first side and an opposite second side that extend between the first and second end walls and the first and second side walls, the base panel including at least a first stepped-up portion protruding from the first side of the base panel at the fiber input/output region to define a recess in the second side of the base panel, the recess being configured to provide clearance to accommodate a securement arrangement for coupling at least a first optical fiber to the base panel, wherein the stepped-up portion of the base panel defines a plurality of openings configured to facilitate coupling of the securement arrangement to the base panel, and wherein the fiber spool of the fiber management region extends upwardly from the base panel;
a fiber splice region at which the fiber can be optically coupled to a second fiber; and
a magnet arranged within the cavity defined in the fiber spool.

18. A splice tray arrangement comprising:
a first splice tray;
a second splice tray vertically offset from the first splice tray;
a first pivot linkage including a first coupling section laterally offset from a second coupling section, the first coupling section of the first pivot linkage being coupled to the first splice tray and the second coupling section of the first pivot linkage being coupled to the second splice tray to enable the first and second splice trays to rotate relative to each other; and
a second pivot linkage including a first coupling section laterally offset from a second coupling section, the first coupling section of the second pivot linkage being coupled to the second splice tray and the second coupling section of the second pivot linkage being configured to couple to a third splice tray to enable the second and third splice trays to rotate relative to each other, the first coupling section of the second pivot linkage being vertically aligned with the first coupling section of the first pivot linkage and the second coupling section of the second pivot linkage being vertically aligned with the second coupling section of the first pivot linkage.

19. The splice tray arrangement of claim 18, wherein the coupling sections of the pivot linkages mount to hinge pins of the respective splice trays.

* * * * *